(12) United States Patent
Shah et al.

(10) Patent No.: US 8,688,623 B2
(45) Date of Patent: Apr. 1, 2014

(54) METHOD AND SYSTEM TO IDENTIFY A PREFERRED DOMAIN OF A PLURALITY OF DOMAINS

(75) Inventors: Seema Shah, San Francisco, CA (US); Adam Nash, Sunnyvale, CA (US); Raghav Gupta, Sunnyvale, CA (US); Aditya Arora, Pleasanton, CA (US); Benjamin David Foster, Arlington, VA (US); Srikanth Subramaniam, San Jose, CA (US); Suhail Ansari, Sunnyvale, CA (US); Xavier Stonestreet, Aptos, CA (US); Vijay Raman, Santa Clara, CA (US); Jean-Michel Leon, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 110 days.

(21) Appl. No.: 13/152,862

(22) Filed: Jun. 3, 2011
(Under 37 CFR 1.47)

(65) Prior Publication Data
US 2012/0290550 A1    Nov. 15, 2012

Related U.S. Application Data

(63) Continuation of application No. 12/961,465, filed on Dec. 6, 2010, now abandoned, which is a continuation of application No. 11/703,485, filed on Feb. 7, 2007, now Pat. No. 7,849,047.

(60) Provisional application No. 60/743,256, filed on Feb. 9, 2006, provisional application No. 60/781,521, filed on Mar. 10, 2006, provisional application No. 60/745,347, filed on Apr. 21, 2006.

(51) Int. Cl.
*G06F 7/00* (2006.01)
*G06F 17/00* (2006.01)

(52) U.S. Cl.
USPC .......................................................... 707/600

(58) Field of Classification Search
None
See application file for complete search history.

(56) References Cited

U.S. PATENT DOCUMENTS

| 5,297,039 A | 3/1994 | Kanaegami et al. |
| 5,428,778 A | 6/1995 | Brookes |

(Continued)

FOREIGN PATENT DOCUMENTS

| WO | WO-2004025391 A2 | 3/2004 |
| WO | WO-2004070626 A2 | 8/2004 |

(Continued)

OTHER PUBLICATIONS

"U.S. Appl. No. 11/478,666, Advisory Action mailed Feb. 18, 2010", 10 pgs.

(Continued)

*Primary Examiner* — Uyen Le
(74) *Attorney, Agent, or Firm* — Schwegman Lundberg & Woessner, P.A.

(57) ABSTRACT

There is provided methods and systems to identify a preferred domain of a plurality of domains corresponding to a query. First, the system receives the query. Second, the system accesses demand information corresponding to the query, the demand information including navigation information associated with the query. Third, the system accesses supply information corresponding to the query, the supply information including a count of data items in each of the plurality of domains that match the query. Fourth, the system identifies the preferred domain based on the demand information and the supply information.

20 Claims, 47 Drawing Sheets

(56) References Cited

U.S. PATENT DOCUMENTS

| | | |
|---|---|---|
| 5,752,025 A | 5/1998 | Shakib et al. |
| 5,778,357 A | 7/1998 | Kolton et al. |
| 5,787,421 A | 7/1998 | Nomiyama |
| 5,845,278 A | 12/1998 | Kirsch et al. |
| 5,864,846 A | 1/1999 | Voorhees |
| 5,918,214 A | 6/1999 | Perkowski |
| 5,987,470 A | 11/1999 | Meyers et al. |
| 6,009,422 A | 12/1999 | Ciccarelli |
| 6,182,029 B1 | 1/2001 | Friedman |
| 6,185,558 B1 | 2/2001 | Bowman et al. |
| 6,336,112 B2 | 1/2002 | Chakrabarti et al. |
| 6,336,910 B1 | 1/2002 | Ohta et al. |
| 6,532,427 B1 | 3/2003 | Joshi et al. |
| 6,574,616 B1 | 6/2003 | Saghir |
| 6,714,934 B1 | 3/2004 | Fordham |
| 6,751,606 B1 | 6/2004 | Fries et al. |
| 6,816,611 B1 | 11/2004 | Hagiwara et al. |
| 6,832,205 B1 | 12/2004 | Aragones et al. |
| 6,847,960 B1 | 1/2005 | Li et al. |
| 6,963,867 B2 | 11/2005 | Ford et al. |
| 6,983,449 B2 | 1/2006 | Newman |
| 7,051,017 B2 | 5/2006 | Marchisio |
| 7,051,023 B2 | 5/2006 | Kapur et al. |
| 7,058,599 B2 | 6/2006 | Hanks et al. |
| 7,124,125 B2 | 10/2006 | Cook et al. |
| 7,240,049 B2 | 7/2007 | Kapur |
| 7,290,007 B2 | 10/2007 | Farber et al. |
| 7,293,033 B1 | 11/2007 | Tormasov et al. |
| 7,346,629 B2 | 3/2008 | Kapur et al. |
| 7,370,023 B1 | 5/2008 | Forsythe et al. |
| 7,389,283 B2 | 6/2008 | Adler |
| 7,395,259 B2 | 7/2008 | Bailey et al. |
| 7,587,357 B1 | 9/2009 | Buck |
| 7,640,234 B2 | 12/2009 | Shah et al. |
| 7,725,417 B2 | 5/2010 | Loftus et al. |
| 7,739,225 B2 | 6/2010 | Loftus et al. |
| 7,739,226 B2 | 6/2010 | Loftus et al. |
| 7,849,047 B2 | 12/2010 | Loftus et al. |
| 8,046,321 B2 | 10/2011 | Loftus et al. |
| 8,244,666 B2 | 8/2012 | Loftus et al. |
| 8,380,698 B2 | 2/2013 | Sundaranatha |
| 8,396,892 B2 | 3/2013 | Loftus et al. |
| 8,521,712 B2 | 8/2013 | Shah et al. |
| 2002/0004735 A1 | 1/2002 | Gross |
| 2002/0027567 A1 | 3/2002 | Niamir |
| 2002/0152199 A1 | 10/2002 | Teng et al. |
| 2002/0174089 A1 | 11/2002 | Tenorio |
| 2002/0198962 A1 | 12/2002 | Horn et al. |
| 2003/0018621 A1 | 1/2003 | Steiner et al. |
| 2003/0078860 A1* | 4/2003 | Hoffman et al. ............ 705/28 |
| 2003/0078915 A1 | 4/2003 | Chaudhuri et al. |
| 2003/0115438 A1 | 6/2003 | Mahalingam et al. |
| 2003/0126117 A1 | 7/2003 | Megiddo et al. |
| 2003/0158839 A1 | 8/2003 | Faybishenko et al. |
| 2003/0167252 A1 | 9/2003 | Odom et al. |
| 2004/0019588 A1 | 1/2004 | Doganata et al. |
| 2004/0030690 A1 | 2/2004 | Teng et al. |
| 2004/0039657 A1 | 2/2004 | Behrens et al. |
| 2004/0039731 A1 | 2/2004 | Levy |
| 2004/0049514 A1 | 3/2004 | Burkov |
| 2004/0068460 A1 | 4/2004 | Feeley et al. |
| 2004/0068697 A1 | 4/2004 | Harik et al. |
| 2004/0090472 A1 | 5/2004 | Risch et al. |
| 2004/0117189 A1 | 6/2004 | Bennett |
| 2004/0163043 A1 | 8/2004 | Baudin et al. |
| 2004/0199498 A1 | 10/2004 | Kapur et al. |
| 2004/0243501 A1 | 12/2004 | Duffey |
| 2004/0243565 A1 | 12/2004 | Elbaz et al. |
| 2004/0249801 A1 | 12/2004 | Kapur |
| 2004/0254920 A1 | 12/2004 | Brill et al. |
| 2005/0060320 A1 | 3/2005 | Bostrom |
| 2005/0080769 A1 | 4/2005 | Gemmell et al. |
| 2005/0080775 A1 | 4/2005 | Colledge et al. |
| 2005/0080776 A1 | 4/2005 | Colledge et al. |
| 2005/0080795 A1 | 4/2005 | Kapur et al. |
| 2005/0086210 A1 | 4/2005 | Kita et al. |
| 2005/0102259 A1 | 5/2005 | Kapur |
| 2005/0144086 A1 | 6/2005 | Speiser et al. |
| 2005/0177561 A1 | 8/2005 | Ramanathan et al. |
| 2005/0198105 A1 | 9/2005 | Schmitz et al. |
| 2006/0041521 A1 | 2/2006 | Oral et al. |
| 2006/0064411 A1 | 3/2006 | Gross et al. |
| 2006/0072830 A1 | 4/2006 | Nagarajan et al. |
| 2006/0106793 A1 | 5/2006 | Liang |
| 2006/0122979 A1 | 6/2006 | Kapur et al. |
| 2006/0129529 A1 | 6/2006 | Adler |
| 2006/0159356 A1 | 7/2006 | Bruna et al. |
| 2006/0176479 A1 | 8/2006 | Laurence et al. |
| 2006/0195428 A1 | 8/2006 | Peckover |
| 2006/0212142 A1 | 9/2006 | Madani et al. |
| 2006/0248074 A1 | 11/2006 | Carmel et al. |
| 2006/0287980 A1 | 12/2006 | Liu et al. |
| 2007/0106499 A1 | 5/2007 | Dahlgren et al. |
| 2007/0174270 A1 | 7/2007 | Goodwin et al. |
| 2007/0185839 A1 | 8/2007 | Shah et al. |
| 2007/0198496 A1 | 8/2007 | Loftus et al. |
| 2007/0198497 A1 | 8/2007 | Loftus et al. |
| 2007/0198498 A1 | 8/2007 | Loftus et al. |
| 2007/0198501 A1 | 8/2007 | Sundaranatha |
| 2007/0200850 A1 | 8/2007 | Shah et al. |
| 2007/0260598 A1 | 11/2007 | Odom |
| 2008/0016019 A1 | 1/2008 | Loftus et al. |
| 2008/0162424 A1 | 7/2008 | Adler |
| 2008/0276125 A1 | 11/2008 | Akelbein et al. |
| 2008/0276201 A1 | 11/2008 | Risch et al. |
| 2010/0145928 A1 | 6/2010 | Shah et al. |
| 2010/0217741 A1 | 8/2010 | Loftus et al. |
| 2010/0250535 A1 | 9/2010 | Loftus et al. |
| 2011/0082872 A1 | 4/2011 | Loftus |
| 2011/0106785 A1 | 5/2011 | Loftus et al. |
| 2012/0150832 A1 | 6/2012 | Shah et al. |
| 2012/0310946 A1 | 12/2012 | Loftus et al. |

FOREIGN PATENT DOCUMENTS

| | | |
|---|---|---|
| WO | WO-2007095075 A2 | 8/2007 |
| WO | WO-2007095075 A3 | 8/2007 |
| WO | WO-2007106401 A2 | 9/2007 |
| WO | WO-2007106401 A3 | 9/2007 |
| WO | WO-2007106403 A2 | 9/2007 |
| WO | WO-2007106403 A3 | 9/2007 |

OTHER PUBLICATIONS

"U.S. Appl. No. 11/478,666, Decision on Pre-Appeal Brief Request mailed Apr. 2, 2010", 2 pgs.

"U.S. Appl. No. 11/478,666, Final Office Action mailed Nov. 23, 2009", 16 pgs.

"U.S. Appl. No. 11/478,666, Final Office Action mailed Nov. 26, 2010", 16 pgs.

"U.S. Appl. No. 11/478,666, Non Final Office Action mailed May 6, 2009", 21 pgs.

"U.S. Appl. No. 11/478,666, Non-Final Office Action mailed Jun. 10, 2010", 13 pgs.

"U.S. Appl. No. 11/478,666, Pre-Appeal Brief Request filed Feb. 23, 2010", 5 pgs.

"U.S. Appl. No. 11/478,666, Response filed Jan. 25, 2010 to Final Office Action mailed Nov. 23, 2009", 17 pgs.

"U.S. Appl. No. 11/478,666, Response filed Jan. 26, 2011 to Final Office Action mailed Nov. 26, 2011", 14 pgs.

"U.S. Appl. No. 11/478,666, Response filed Jul. 22, 2009 to Non Final Office Action mailed May 6, 2009", 11 pgs.

"U.S. Appl. No. 11/478,666, Response filed Sep. 10, 2010 to Non Final Office Action mailed Jun. 10, 2010", 11 pgs.

"U.S. Appl. No. 11/497,976, Advisory Action mailed May 29, 2009", 3 pgs.

"U.S. Appl. No. 11/497,976, Final Office Action mailed Mar. 17, 2009", 13 pgs.

"U.S. Appl. No. 11/497,976, Non-Final Office Action mailed Sep. 30, 2008", 11 pgs.

"U.S. Appl. No. 11/497,976, Notice of Allowance mailed Aug. 14, 2009", 19 pgs.

(56) References Cited

OTHER PUBLICATIONS

"U.S. Appl. No. 11/497,976, Response filed May 18, 2009 to Final Office Action mailed Mar. 17, 2009", 13 pgs.
"U.S. Appl. No. 11/497,976, Response filed Dec. 30, 2008 to Non Final Office Action mailed Sep. 30, 2008", 12 pgs.
"U.S. Appl. No. 11/703,451, 312 Amendment filed Apr. 7, 2010", 3 pgs.
"U.S. Appl. No. 11/703,451, Non Final Office Action mailed May 14, 2009", 24 pgs.
"U.S. Appl. No. 11/703,451, Notice of Allowance mailed Jan. 7, 2010", 16 pgs.
"U.S. Appl. No. 11/703,451, Response filed Sep. 11, 2009 to Non Final Office Action mailed May 14, 2009", 18 pgs.
"U.S. Appl. No. 11/703,485, Advisory Action mailed Dec. 10, 2009", 3 pgs.
"U.S. Appl. No. 11/703,485, Final Office Action mailed Aug. 7, 2009", 8 pgs.
"U.S. Appl. No. 11/703,485, Non-Final Office Action mailed Feb. 17, 2009", 9 pgs.
"U.S. Appl. No. 11/703,485, Notice of Allowance mailed Mar. 30, 2010", 5 pgs.
"U.S. Appl. No. 11/703,485, Notice of Allowance mailed Jul. 26, 2010", 9 pgs.
"U.S. Appl. No. 11/703,485, Response filed Feb. 5, 2010 to Advisory Action mailed Dec. 10, 2009", 8 pgs.
"U.S. Appl. No. 11/703,485, Response filed May 15, 2009 to Non Final Office Action mailed Feb. 17, 2009", 15 pgs.
"U.S. Appl. No. 11/703,485, Response filed Nov. 9, 2009 to Final Office Action mailed Aug. 7, 2009", 12 pgs.
"U.S. Appl. No. 11/703,509 Advisory Action mailed Apr. 8, 2011", 3 pgs.
"U.S. Appl. No. 11/703,509, Advisory Action mailed Mar. 2, 2010", 3 pgs.
"U.S. Appl. No. 11/703,509, Decision on Pre-Appeal Brief Request mailed Apr. 21, 2010", 2 pgs.
"U.S. Appl. No. 11/703,509, Final Office Action mailed Dec. 2, 2009", 24 pgs.
"U.S. Appl. No. 11/703,509, Non-Final Office Action mailed May 15, 2009", 24 pgs.
"U.S. Appl. No. 11/703,509, Non-Final Office Action mailed Jul. 23, 2010", 42 pgs.
"U.S. Appl. No. 11/703,509, Pre-Appeal Brief Request filed Mar. 2, 2010", 5 pgs.
"U.S. Appl. No. 11/703,509, Response filed Feb. 2, 2010 to Final Office Action mailed Dec. 2, 2009", 15 pgs.
"U.S. Appl. No. 11/703,509, Response filed Mar. 2, 2010 to Advisory Action mailed Mar. 2, 2010", 7 pgs.
"U.S. Appl. No. 11/703,509, Response filed Aug. 17, 2009 to Non Final Office Action mailed May 15, 2009", 16 pgs.
"U.S. Appl. No. 11/703,509, Response filed Oct. 25, 2010 to Non Final Office Action mailed Jul. 23, 2010", 16 pgs.
"U.S. Appl. No. 11/703,511, Advisory Action mailed Dec. 9, 2009", 3 pgs.
"U.S. Appl. No. 11/703,511, Final Office Action mailed Aug. 7, 2009", 8 pgs.
"U.S. Appl. No. 11/703,511, Non-Final Office Action mailed Feb. 18, 2009", 9 pgs.
"U.S. Appl. No. 11/703,511, Notice of Allowance mailed Mar. 29, 2010", 4 pgs.
"U.S. Appl. No. 11/703,511, Response filed Feb. 5, 2010 to Advisory Action mailed Dec. 9, 2009", 9 pgs.
"U.S. Appl. No. 11/703,511, Response filed May 15, 2009 to Non Final Office Action mailed Feb. 18, 2009", 16 pgs.
"U.S. Appl. No. 11/703,511, Response filed Nov. 9, 2009 to Final Office Action mailed Aug. 7, 2009", 13 pgs.
"U.S. Appl. No. 11/703,515, Advisory Action mailed Dec. 1, 2009", 2 pgs.
"U.S. Appl. No. 11/703,515, Final Office Action mailed Aug. 10, 2009", 9 pgs.
"U.S. Appl. No. 11/703,515, Non-Final Office Action mailed Feb. 17, 2009", 10 pgs.
"U.S. Appl. No. 11/703,515, Notice of Allowance mailed Mar. 31, 2010", 8 pgs.
"U.S. Appl. No. 11/703,515, Response filed May 15, 2009 to Non Final Office Action mailed Feb. 17, 2009", 16 pgs.
"U.S. Appl. No. 11/703,515, Response filed Oct. 13, 2009 to Final Office Action mailed Aug. 10, 2009", 12 pgs.
"U.S. Appl. No. 11/703,515, Response filed Dec. 10, 2009 to Advisory Action mailed Dec. 1, 2009", 13 pgs.
"U.S. Appl. No. 12/620,213, Notice of Allowance mailed Dec. 20, 2010", 16 pgs.
"U.S. Appl. No. 12/777,061, Non-Final Office Action mailed Oct. 7, 2010", 11 pgs.
"U.S. Appl. No. 12/777,061, Response filed Jan. 7, 2011 to Non Final Office Action mailed Oct. 7, 2011", 8 pgs.
"European Application Serial No. 07752788.5, Office Action mailed Apr. 9, 2009", 7 pgs.
"International Application Serial No. PCT/US2007/003445, International Preliminary Report on Patentability mailed Aug. 21, 2008", 7 pgs.
"International Application Serial No. PCT/US2007/003445, International Search Report and Written Opinion mailed Sep. 20, 2007", 9 pgs.
"International Application Serial No. PCT/US2007/006102, International Preliminary Report on Patentability mailed Sep. 25, 2008", 10 pgs.
"International Application Serial No. PCT/US2007/006102, International Search Report and Written Opinion mailed Mar. 17, 2008", 13 pgs.
"International Application Serial No. PCT/US2007/006111, International Preliminary Report on Patentability mailed Sep. 25, 2008", 5 pgs.
"International Application Serial No. PCT/US2007/006111, International Search Report and Written Opinion mailed Feb. 27, 2008", 8 pgs.
Antonie, et al., "An associative classifier based on positive and negative rules", ACM, (2004), 6 pages.
Ding, et al., "GoldenBullet: automated classification of product data in E-commerce", Proceedings of Business Information Systems, Poznan Poland, (2002), 9 pages.
Maria, Nuno, et al., "Theme-based retrieval of Web news", Springer-Verlag Berlin Heidelberg, (2001,), 12 pages.
Yu, C. T, et al., "Automatic Knowledge Acquisition and Maintenance for Semantic Query Optimization", vol. 1, Iss. 3, (Sep. 1989), pp. 362-375.
"U.S. Appl. No. 11/478,666, Advisory Action mailed Feb. 11, 2011", 6 pgs.
"U.S. Appl. No. 11/478,666, Appeal Brief filed Apr. 14, 2011", 26 pgs.
"U.S. Appl. No. 11/478,666, Decision on Pre-Appeal Brief Request filed Mar. 14, 2011", 2 pgs.
"U.S. Appl. No. 11/478,666, Examiners Answer to Appeal Brief mailed May 20, 2011", 21 pgs.
"U.S. Appl. No. 11/478,666, Pre-Appeal Brief Request filed Feb. 28, 2011", 5 pgs.
"U.S. Appl. No. 11/478,666, Reply Brief filed Jul. 15, 2011", 13 pgs.
"U.S. Appl. No. 11/478,666, Response filed Jan. 26, 2011 to Final Office Action mailed Nov. 26, 2010", 14 pgs.
"U.S. Appl. No. 11/703,451, PTO Response to 312 Amendment mailed Apr. 21, 2010", 2 pgs.
"U.S. Appl. No. 11/703,509, 312 Amendment filed Dec. 7, 2012", 10 pgs.
"U.S. Appl. No. 11/703,509, Advisory Action mailed Apr. 8, 2011", 3 pgs.
"U.S. Appl. No. 11/703,509, Advisory Action mailed Apr. 12, 2012", 2 pgs.
"U.S. Appl. No. 11/703,509, Final Office Action mailed Jan. 26, 2011", 45 pgs.
"U.S. Appl. No. 11/703,509, Final Office Action mailed Jan. 30, 2012", 26 pgs.
"U.S. Appl. No. 11/703,509, Non Final Office Action mailed Aug. 5, 2011", 23 pgs.

(56) References Cited

OTHER PUBLICATIONS

"U.S. Appl. No. 11/703,509, Notice of Allowance mailed Jul. 13, 2012", 24 pgs.

"U.S. Appl. No. 11/703,509, Notice of Allowance mailed Sep. 7, 2012", 21 pgs.

"U.S. Appl. No. 11/703,509, PTO Response to 312 Amendment mailed Jan. 24, 2013", 2 pgs.

"U.S. Appl. No. 11/703,509, Response filed Mar. 25, 2011 to Final Office Action mailed Jan. 26, 2011", 21 pgs.

"U.S. Appl. No. 11/703,509, Response filed Mar. 30, 2012 to Final Office Action mailed Jan. 30, 2012", 13 pgs.

"U.S. Appl. No. 11/703,509, Response filed Apr. 30, 2012 to Advisory Action mailed Jan. 30, 2012", 15 pgs.

"U.S. Appl. No. 11/703,509, Response filed Dec. 5, 2011 to Non-Final Office Action mailed Aug. 5, 2011", 14 pgs.

"U.S. Appl. No. 11/703,509, Response filed Apr. 26, 2011 to Final Office Action mailed Jan. 26, 2011", 21 pgs.

"U.S. Appl. No. 12/777,061, 312 Amendment filed Sep. 7, 2011", 8 pgs.

"U.S. Appl. No. 12/777,061, Notice of Allowance mailed Feb. 4, 2011", 11 pgs.

"U.S. Appl. No. 12/777,061, Notice of Allowance mailed Jun. 10, 2011", 9 pgs.

"U.S. Appl. No. 12/777,061, Response filed Jan. 7, 2011 to Non Final Office Action mailed Oct. 7, 2010", 8 pgs.

"U.S. Appl. No. 12/777,061, Response to Rule 312 Communication mailed Sep. 23, 2011", 2 pgs.

"U.S. Appl. No. 12/815,371, Non Final Office Action mailed Sep. 2, 2011", 6 pgs.

"U.S. Appl. No. 12/815,371, Notice of Allowance mailed Mar. 21, 2012", 9 pgs.

"U.S. Appl. No. 12/815,371, Preliminary Amendment filed Sep. 14, 2010", 9 pgs.

"U.S. Appl. No. 12/815,371, PTO Response to Rule 312 Communication mailed Jul. 13, 2012", 2 pgs.

"U.S. Appl. No. 12/815,371, Response filed Jan. 3, 2012 to Non-Final Office Action mailed Sep. 2, 2011", 11 pgs.

"U.S. Appl. No. 12/961,465, Non Final Office Action mailed Jun. 12, 2012", 7 pgs.

"U.S. Appl. No. 12/961,474, Non Final Office Action mailed Apr. 2, 2012", 7 pgs.

"U.S. Appl. No. 12/961,477, Non Final Office Action mailed Jun. 12, 2012", 7 pgs.

"U.S. Appl. No. 12/961,477, Notice of Allowance mailed Nov. 2, 2012", 7 pgs.

"U.S. Appl. No. 12/961,477, Response filed Sep. 12, 2012 to Non-Final Office Action Mailed Jun. 12, 2012", 7 pgs.

"U.S. Appl. No. 13/152,976, Non Final Office Action mailed Jul. 12, 2012", 8 pgs.

"U.S. Appl. No. 13/152,976, Notice of Allowance mailed Nov. 30, 2012", 8 pgs.

"U.S. Appl. No. 13/152,976, Response filed Oct. 12, 2012 to Non Final Office Action mailed Jul. 12, 2012", 11 pgs.

"U.S. Appl. No. 13/584,131, Non Final Office Action mailed Jun. 24, 2013", 7 pgs.

"European Application Serial No. 07752788.5, Examination Notification Art. 94(3) mailed Aug. 22, 2013", 8 pgs.

"European Application Serial No. 07752788.5, Office Action mailed Jun. 24, 2011", 4 pgs.

"European Application Serial No. 07752788.5, Response filed Feb. 23, 2012", 14 pgs.

"European Application Serial No. 07752788.5, Response filed Oct. 9, 2009 to Office Action mailed Apr. 9, 2009", 25 pgs.

* cited by examiner

| | | Category — 154 | Title — 156 | Item Specific (e.g. Brand) — 158 | Item Specific (e.g., Size) — 160 |
|---|---|---|---|---|---|
| Sell Side Data — 150 | | Debutante's Shoes | AK Size 8 Ruby Pumps | Via Spiga | 8 |
| Buy Side Data — 152 | Domains 132 / Product / Aisle 130 / Department 128 | Women's Shoes<br>Women's Clothing<br>Apparel & Accessories | Ruby, Red<br>Anne Klein<br>8 | Via Spiga | 8 |
| | Aspects — Color / Brand / Size | | | | |

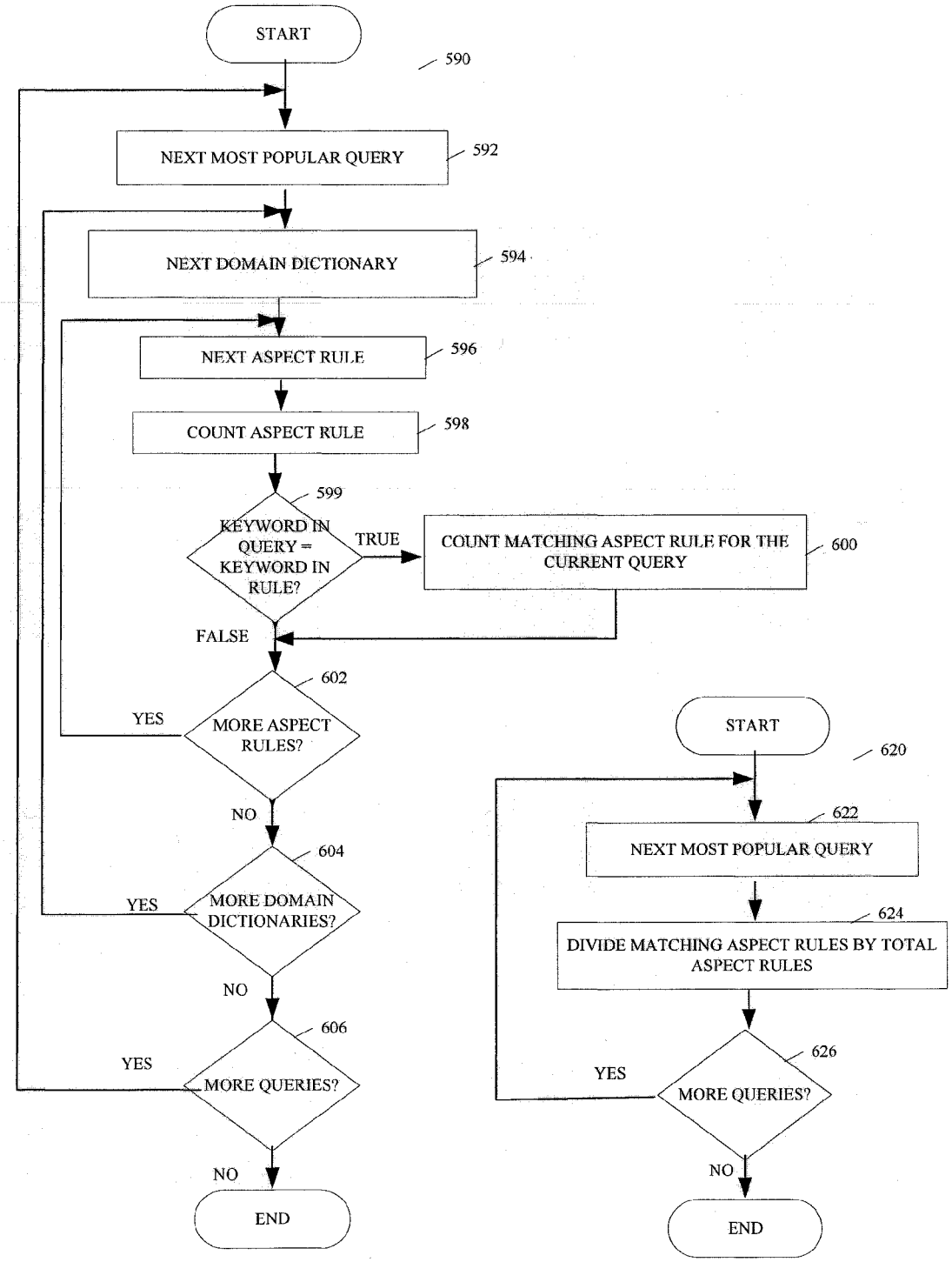
FIGURE 21                    FIGURE 22

METHOD AND SYSTEM TO IDENTIFY A PREFERRED DOMAIN OF A PLURALITY OF DOMAINS

RELATED APPLICATIONS

This application is a continuation of U.S. application Ser. No. 12/961,465 filed Dec. 6, 2010, entitled, "METHOD AND SYSTEM TO IDENTIFY A PREFERRED DOMAIN OF A PLURALITY OF DOMAINS," which is a continuation of U.S. Pat. No. 7,849,047, filed Feb. 7, 2007, entitled "METHOD AND SYSTEM TO ANALYZE DOMAIN RULES BASED ON DOMAIN COVERAGE OF THE DOMAIN RULES," which claims the priority benefits of U.S. Provisional Application No. 60/743,256, filed Feb. 9, 2006, entitled "METHODS AND SYSTEMS TO GENERATE A USER INTERFACE," and U.S. Provisional Application No. 60/781,521, filed Mar. 10, 2006, entitled "METHODS AND SYSTEMS TO GENERATE, ANALYZE AND PUBLISH RULES," and U.S. Provisional Application No. 60/745,347, filed Apr. 21, 2006, entitled "METHODS AND SYSTEMS TO COMMUNICATE INFORMATION," all of which are incorporated herein by reference in their entirety.

TECHNICAL FIELD

An embodiment relates generally to the technical field of data communications and, in one example embodiment, to methods and systems to identify a preferred domain of a plurality of domains corresponding to a query.

BACKGROUND

A user searching an information resource (e.g., database) may encounter challenges. One such challenge may be that a search mechanism (e.g., a search engine) that is utilized to search the information resource may return search results that are of little interest to the user. For example, the search mechanism may respond to a query from the user with search results that contains data items that cover a spectrum wider than the interests of the user. The user may experiment by adding additional constraints (e.g., keywords, categories, etc.) to the query to narrow the number of data items in the search results; however, such experimentation may be time consuming and frustrate the user. To this end, the information contained in the data items and the queries entered by a user to search for the data items may be processed with rules that enable the search mechanism to return search results that are more relevant to the user. For example, the rules may be authored to ensure that a data item entered by a seller and including a text description "BRN shoes" is identified responsive to a query that is entered by a buyer and that includes the keywords "brown shoes." Typically such rules may be authored by a category manager who is aware of the language used in a particular subject area. Nevertheless, in some instances, the category manager may find the authoring of such rules to be difficult and time consuming.

BRIEF DESCRIPTION OF THE DRAWINGS

An embodiment is illustrated by way of example and not limitation in the figures of the accompanying drawings, in which like references indicate similar elements and in which:

FIG. 6 is a table illustrating sell-side data and buy-side data, according to one embodiment;

FIG. 21 is a flowchart illustrating a method, according to an embodiment, to apply aspect rules to most popular queries;

FIG. 22 is a flowchart illustrating a method, according to an embodiment, to determine percentage coverage for most popular queries;

DETAILED DESCRIPTION

Figure 1:
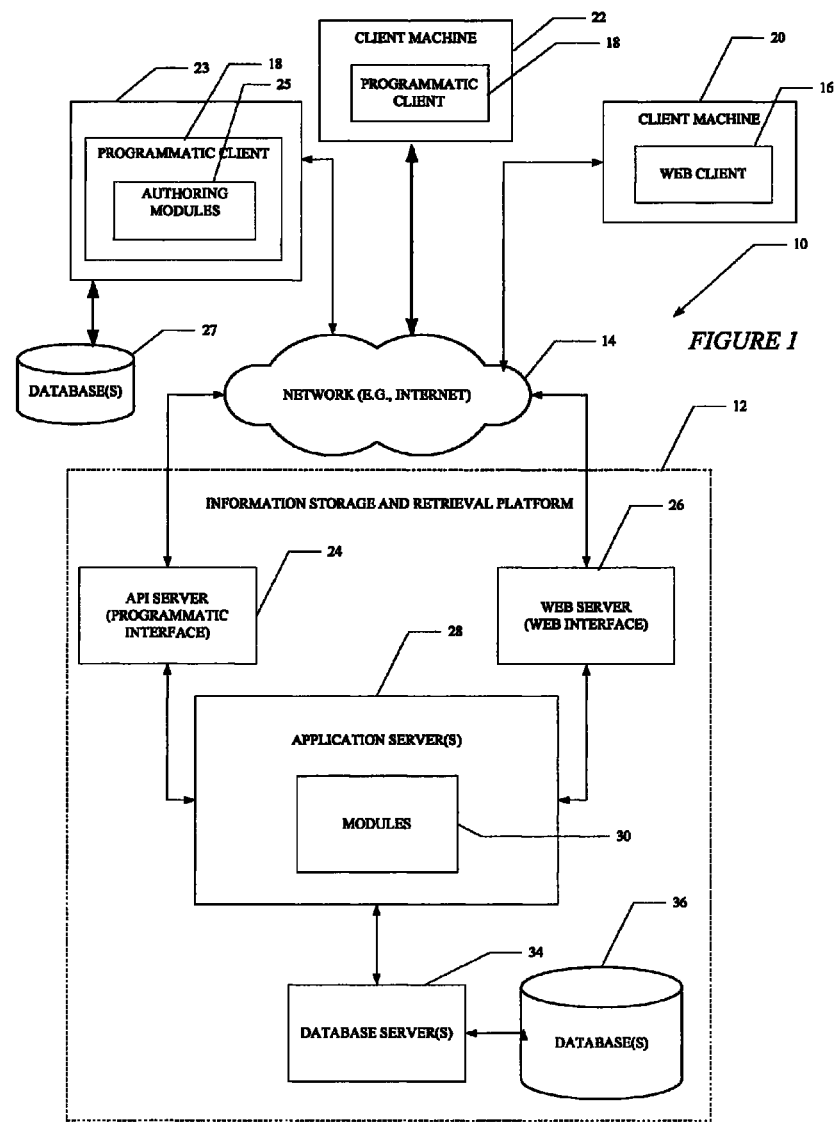
FIG. 1 is a network diagram depicting a system, according to one example embodiment, having a client-server architecture.

Methods and systems to analyze rules based on domain coverage are described. In the following description, for purposes of explanation, numerous specific details are set forth in order to provide a thorough understanding of the present disclosure. It will be evident, however, to one skilled in the art that the subject matter of the present disclosure may be practiced without these specific details.

DEFINITIONS

Data item: data describing an item or service that may be stored in a database and searched with a query.

Domain: an organization of like data items. A domain may include like data items or other like domain(s).

Product domain: a type of domain to organize data items of a particular product type (e.g., Women's Shoes)

Aisle domain: a type of domain to organize one or more product domains (e.g., Women's Clothing)

Department domain: a domain to organize one or more aisle or product domains (e.g., Apparel & Accessories)

Aspect: an aspect is derived from specific instances of a type of data item (e.g., shoes is a type of data item) and may be used to characterize the type of data item (e.g., COLOR, BRAND, STYLE, etc. are derived from a data item such as shoes and may be used to characterize shoes).

Value: a value is a specific instance of an aspect (e.g., red, green, blue, are specific instances of the aspect COLOR) that may be used to characterize a data item (e.g., shoes).

Aspect-value: a specific aspect and value (e.g., COLOR=red)

According to a first feature of the present disclosure, a system may be used to generate suggestions for values (e.g., aspect values) that may be included in rules that may be generated to classify data items and process queries to identify data items. A rule may be authored with one or more authoring modules and may be an "if-then" statement that may include a condition clause and a predicate clause. The condition clause may include a statement to evaluate the contents of a data item resulting in a TRUE or FALSE result. The predicate clause may include an aspect-value pair that may be associated with or concatenated to the unstructured information (e.g., data item). For example, a rule may be applied to a data item previously identified as describing shoes that includes the word "brown" in a description field. The rule may include a condition clause (e.g., trigger) that may be used to evaluate the description field for a color (e.g., if description contains "brn") and a predicate clause which specifies an aspect-value pair (e.g., COLOR=brown) that may be associated with or concatenated to the data item if the condition clause evaluates TRUE. The first feature of the present disclosure anticipates that an administrator or category manager that is authoring such rules may benefit from a system that may be used to automatically generate candidate values (e.g., aspect values). Such a system may receive a request to suggest one or more candidate aspect-values based on aspect-values that may have already been defined by the category manager. For example, consider a "Rocks and Minerals" domain that includes an aspect "Metals." The system may receive the aspect metal and the values gold, silver, platinum and a request to generate candidate values. Responsive to receiving the request, the system may search one or more databases based on the received aspect to generate candidate values (e.g., bronze, tin, etc.). In one embodiment, the category manager may accept or reject each of the candidate values, the accepted candidate values utilized as an aspect-value pair. For example, acceptance of a candidate value may result in generating an aspect-value pair that may be included as a predicate clause (e.g., COLOR=bronze) in a rule that is generated. Finally, the rules may be published to an information storage and retrieval system that may apply the rules to data items to structure the data items (e.g., concatenate aspect-value pairs). For example, the rule may include the condition clause "if title=brown" to evaluate the keywords in the title (e.g., Nike Brown Shoes for Sale) of a data item. Responsive to a TRUE evaluation (e.g., finding the word "brown" in the title), the predicate clause may include an aspect-value pair (COLOR=brown) that is concatenated to the data item. Further, the information storage and retrieval system may apply the same rules to queries that are received by the information storage and retrieval system. For example, the rule "if brown" may be utilized to evaluate the keywords in the query "brown shoes." Responsive to a TRUE evaluation (e.g., finding the word "brown" in the query), the rule may include a predicate clause includes an aspect-value pair (COLOR=brown) that may be utilized to identify data items that contain the same aspect-value pair.

According to a second feature of the present disclosure, a category manager may analyze rules by utilizing a system to determine a percentage of coverage for each query in a set of most popular queries. The system may determine a percentage coverage by receiving sample queries that have been entered by users to search a database on an information storage and retrieval platform. Each query may include a string of text that includes a keyword that may be compared with the keywords in other queries to determine the subset of most popular queries. For example, queries that include the keyword "iPod" may be determined the most popular query because no other keyword may be found in as many queries. Next, the system may apply the rules to each of the most popular queries. If the condition clause of the rule includes a keyword that matches a keyword in the query then a match is registered by incrementing a counter that corresponds to the query. Next, the system may determine a percentage of coverage for each of the most popular queries by dividing the quantity of rules registered in the respective counter by a total number of rules that are applied to the respective queries. Each percentage coverage corresponding to the respective most popular queries may be represented as an interface element within an interface. Category managers may utilize a system to determine percentage of coverage of most popular queries to analyze whether the newly authored set of rules perform as anticipated.

According to a third feature of the present disclosure, a category manager may analyze rules by utilizing a system to determine a percentage of coverage for a domain. For example, a domain "shoes" may include a set of domain rules that may be used to determine whether a data item is classified in the domain for "shoes." For example, the set of domain rules may test a category that is entered by the author of the data item and stored in the data item and, responsive to a match, may structure the data item in the domain "shoes" (e.g., assign a domain value-pair "PRODUCT TYPE=shoes"). The system may determine a percentage of coverage for the domain rules associated with the domain "shoes" by receiving a total quantity data items from a database that includes data items available for sale or auction on an information storage and retrieval platform. Next, the system may apply the domain rules to the total quantity of data items. If the condition clause of a domain rule includes a category that matches a category stored in the data item (e.g., listing) and a predicate clause of the domain rule includes the domain-value pair "PRODUCT TYPE="shoes"" then a match is registered by incrementing a counter associated with the product domain for "shoes." Next, the system may determine a percentage of coverage for the domain "shoes" by dividing the quantity of data items registered in the counter by the total quantity of data items to which the domain rules were applied. The percentage coverage for the domain "shoes" may be represented as an interface element within an interface. Category managers may utilize the system to determine whether a newly authored set of domain rules perform as anticipated.

According to a fourth feature of the present disclosure, a category manager may may analyze rules by utilizing a system to determine a percentage of coverage for an aspect in a domain. For example, the aspect COLOR may be used to describe data items (e.g., listings) of shoes for auction or sale in the domain "shoes." The system may determine a percentage of coverage for the aspect COLOR in the domain "shoes" by receiving a total quantity data items from a database that includes data items available for sale or auction on an information storage and retrieval platform. Next, the system may apply the aspect rules associated with the domain "shoes" to the total quantity of data items. If the condition clause of an aspect rule includes information that matches information stored in the listing and the predicate clause of the aspect rule assigns an aspect-value pair that includes the aspect COLOR (e.g., COLOR=red or COLOR=white, COLOR=blue, etc.) then a match is registered by incrementing a counter corresponding to the aspect-value pair in the domain "shoes." Next, the system may determine a percentage of coverage for the aspect COLOR in the domain "shoes" by dividing a quantity of data items registered in the respective counters (e.g., corresponding to values associated with the aspect COLOR) by the total quantity of data items to which the rules were applied. The percentage coverage for the aspect COLOR in the domain "shoes" may be represented as an interface element within an interface. Category managers may utilize the system to determine whether a newly authored set of aspect rules perform as anticipated.

According to a fifth feature of the present disclosure, a category manager may analyze rules by utilizing a system to determine a percentage of coverage for an aspect-value pair in a domain. For example, an aspect-value pair (e.g., COLOR=red) may be used to describe data items (e.g., listings) of shoes for auction or sale in the domain "shoes." The system may determine a percentage of coverage for the aspect-value pair (e.g., COLOR=red) in the domain "shoes" by receiving a total quantity data items from a database that includes data items available for sale or auction on an information storage and retrieval platform. Next, the system may apply aspect rules for the domain "shoes" to the total quantity of data items. If the condition clause of an aspect rule includes information that matches information stored in the listing and the predicate clause assigns the aspect-value pair "COLOR=red" then a match is registered by incrementing a counter corresponding to the aspect-value pair "COLOR=red" in the domain shoes. Next, the system may determine a percentage of coverage for the aspect-value pair "COLOR=red" in the domain "shoes" by dividing the quantity of data items registered in the counter by the total quantity of data items to which the aspect rules were applied. A percentage coverage may be generated for all values associated with an aspect (e.g., COLOR=red or COLOR=white, COLOR=blue, etc.). The percentage coverage may be represented as an interface element within an interface. Category managers may utilize the system to determine whether a newly authored set of aspect rules perform as anticipated.

FIG. 1 is a network diagram depicting a system 10, according to one example embodiment, having a client-server architecture. A commerce platform or commerce server, in the example form of an information storage and retrieval platform 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State) executing on a client machine 20, a programmatic client 18 executing on the client machine 22, and, a programmatic client 18 in the form of authoring modules 25 executing on the client machine 23.

Turning to the information storage and retrieval platform 12, an application program interface (API) server 24 and a web server 26 are coupled to, and provide programmatic and web interfaces respectively to, one or more application servers 28. The application servers 28 host one or more modules 30 (e.g., modules, applications, engines, etc.). The application servers 28 are, in turn, shown to be coupled to one or more database servers 34 that facilitate access to one or more databases 36. The modules 30 provide a number of information storage and retrieval functions and services to users that access the information storage and retrieval platform 12.

While the system 10 shown in FIG. 1 employs a client-server architecture, the present disclosure is of course not limited to such an architecture, and could equally well find application in a distributed, or peer-to-peer, architecture system. The various modules 30 and authoring modules 25 may also be implemented as standalone software programs, which do not necessarily have networking capabilities.

The web client 16 may access the various modules 30 via the web interface supported by the web server 26. Similarly, the programmatic client 18 accesses the various services and functions provided by the modules 30 via the programmatic interface provided by the API server 24. The programmatic client 18 may, for example, be a seller application (e.g., the TurboLister application developed by eBay Inc., of San Jose, Calif.) to enable sellers to author and manage data items or listings on the information storage and retrieval platform 12 in an off-line manner, and to perform batch-mode communications between the programmatic client 18 and the information storage and retrieval platform 12. In addition, the programmatic client 18 may, as previously indicated, include authoring modules 25 that may be used to author, generate, analyze, and publish domain rules and aspect rules that may be used in the information storage and retrieval platform 12 to structure data items and transform queries. The client machine 23 is further shown to be coupled to one or more databases 27.

Figure 2:
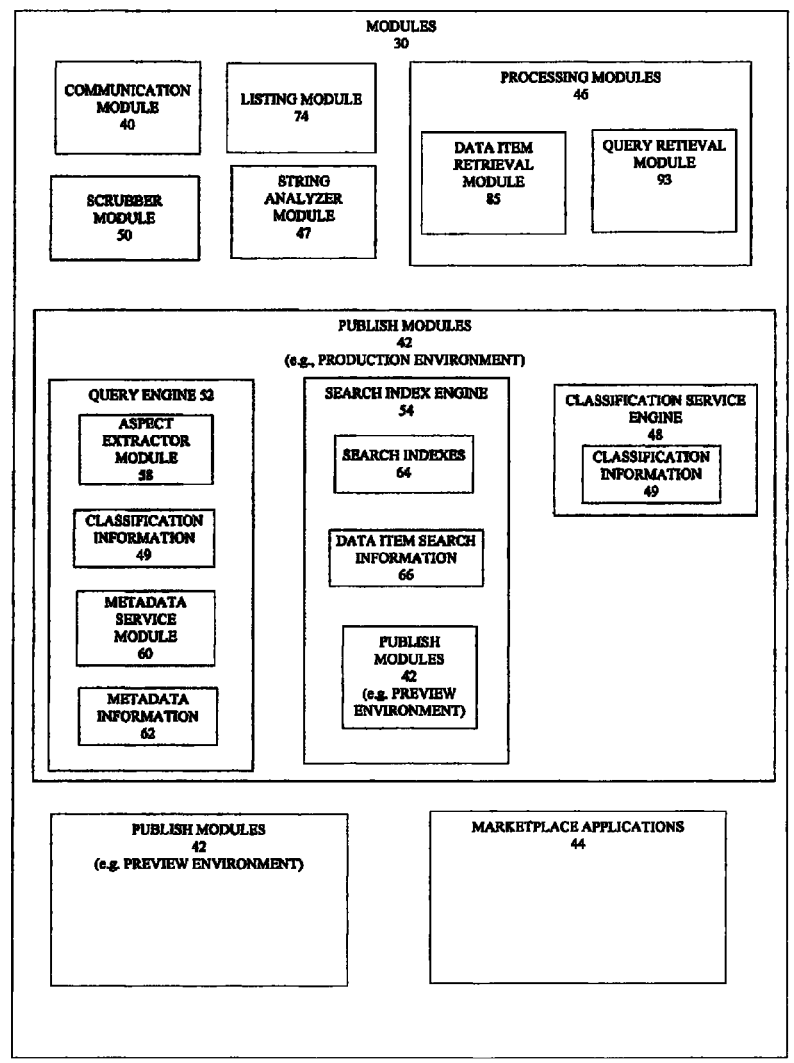
FIG. 2 is a block diagram illustrating modules and engines, according to an embodiment.

FIG. 2 is a block diagram illustrating the modules 30, according to an embodiment. The modules 30 include a communication module 40, a listing module 74, processing modules 46, a string analyzer module 47, a scrubber module 50, and two sets (e.g., instantiations) of publishing modules 42 (e.g., publishing modules 42 for the production environment, publishing modules 42 for the preview environment) and marketplace applications 44. Each set of publishing modules 42 includes a classification service engine 48, a query engine 52, and a search index engine 54. The publishing modules 42 may be utilized to publish new and/or existing rules to the production environment or the preview environment in the information storage and retrieval platform 12 thereby enabling the rules to be operative (e.g., applied to data items and queries) in the respective environments.

In one embodiment, the information storage and retrieval platform 12 may be embodied as a network-based marketplace (e.g., eBay, the Worlds Online Marketplace developed by eBay Inc., of San Jose, Calif.) that supports the transaction of data items or listings (e.g., goods or services) between sellers and buyers. For example, the information storage and retrieval platform 12 may receive information from sellers that describe the data items that may subsequently be retrieved by potential buyers or bidders. In such an embodiment the modules 30 may include marketplace applications 44 may provide a number of marketplace functions and services to users that access the information storage and retrieval platform 12.

The preview environment enables a category manager to analyze the rules and determine whether such rules perform as expected without impacting the live operations in the production environment. For example, the preview environment enables a most popular query analysis, a domain coverage analysis, an aspect coverage analysis, and an aspect-value pair coverage analysis as described later in this document.

After determining that rules perform as expected, the category manager may publish the rules to production environment in the information storage and retrieval platform 12.

The communication module 40 may receive a query from the client machine 22, 20 which may include one or more constraints (e.g., keywords, categories, information specific to a type of data item, (e.g., item-specific). The communication module 40 may interact with the query engine 52 and the search index engine 54 to process the query. The communication module 40 may receive aspect-value pairs that may be extracted from the query. Further, the communication module 40 may construct a transformed query based on the aspect-value pairs extracted from the query and may communicate an interface (e.g., user interface) to the user at the client machines 22, 20.

The listing module 74 may receive information from a client machine 20 or 22 and store the information as a data item in the database 36. For example, a seller may operate the client machine 20 or 22 to enter the information that is descriptive of the data item for the purpose of offering the data item for sale or auction on the information storage and retrieval platform 12.

The processing module 46 may receive classification information and metadata information. The processing module 46 may publish the classification information and metadata information to a production environment or a preview environment. The processing module 46 may publish to the production environment by publishing classification information and metadata information to backend servers that may host the query engine 52, the search index engine 54, and the classification service engine 48. The processing module 46 may publish to a preview environment by publishing classification information and metadata information to a local backend server that may host the query engine 52, the search index engine 54, and the classification service engine 48.

The processing module 46 is further shown to include a data item retrieval module 85 that may receive requests for data items from a category manager operating the client machine 23. For example, responsive to receiving the request, the data item retrieval module 85 may read the data items from the data item information 65 stored on the database 36 and store the data items 65 as sample information 63 in the database 27.

The processing module 46 is further shown to include a query retrieval module 93 that may receive requests for queries from a category manager operating the client machine 23. For example, responsive to receiving the request, the query retrieval module 93 may read the queries from the sample information 63 and communicate the queries to the client machine 23.

The scrubber module 50 may receive item information that may be entered by a client machine 22, 20 to create a data item. The scrubber module 50 may utilize the services of the classification service engine 48 to structure the item information in the data item (e.g., apply domain and aspect rules).

The string analyzer module 47 may receive a request from the client machine 23 to identify candidate values to associate with an aspect. The request may include the aspect and one or more values that have been associated to the aspect. The string analyzer module 47 may utilize the aspect (e.g., COLOR) to identify strings of text in a database that includes the aspect. The string analyzer module 47 relies on various services provided in the information storage and retrieval platform 12 to identify and process the strings of text. For example, the string analyzer module 47 may utilize services that may expand the aspect to a derivative form of the aspect including a singular form (e.g., COLOR), a plural form (e.g., COL- ORS), synonymous form, an alternate word form (e.g., CHROMA, COLORING, TINT, etc.), a commonly misspelled form (e.g., COLLOR, etc.) or an acronym form. In one embodiment the string analyzer module 47 may identify the boundaries of a string of text based on the position of the aspect and derivatives thereof in the string of text. For example, the string analyzer module 47 may identify the boundaries of the string of text based on a predetermined number of words to the left and right of the aspect in the string of text. In one embodiment the predetermined number of words may be a configurable value. After the strings of text have been identified, the string analyzer module 47 may rely on a service in the information storage and retrieval platform 12 to remove stop words from the strings (e.g., the, and, if, etc.). For example, stop words may include prepositions and antecedents because they may not be considered candidate values. Next, the string analyzer module 47 may remove the aspect values received in the request from the string. Finally, the string analyzer module 47 returns the remaining candidate values to the client machine 23.

The database utilized by the string analyzer module 47 may include queries that have been entered by a user to the information storage and retrieval platform 12 and/or data items that have been entered by a user to the information storage and retrieval platform 12 and/or dictionaries, and/or thesauruses. The string analyzer module 47 may analyze the strings of text to identify candidate values to associate with the aspect.

The classification service engine 48 may be used to apply domain rules and aspect rules to data items. The classification service engine 48 may apply domain rules to identify one or more domain-value pairs (e.g., PRODUCT TYPE=Women's Shoes) that may be associated with the data item. The classification service engine 48 may further apply the aspect rules to identify aspect-value pairs (Brand=Anne Klein) that may be associated with the data item. The classification service engine 48 may apply the domain and aspect rules to data items or listings as they are added to the information storage and retrieval platform 12, or responsive to the publication of new rules (e.g., domain rules, aspect rules).

The classification service engine 48 may process data items received from the client machines 20, 22. For example, the scrubber module 50 may use the services of the classification service engine 48, as previously described, to apply domain rules and aspect rules to the data item. The classification service engine 48 may further store the data item, with the associated domain-value pairs and aspect-value pairs in a database 36 as item search information. Further, the classification service engine 48 pushes or publishes item search information over a bus in real time to the search index engine 54. Further, the classification service engine 48, may execute in the preview environment to enable analysis of newly authored rules before publication of the rules to the production environment. Further, the classification service engine 48 may maintain histogram information in the form of data item counters as the domain and aspect rules are applied to the data items. For example, the classification service engine 48 may increment a data item counter responsive to a condition a clause in a domain or aspect rule evaluating TRUE. The histogram information may be communicated to the client machine 20 that may utilize the histogram information to determine percentage coverage for most popular queries, domains, aspects, and aspect-value pairs.

The query engine 52 includes an aspect extractor module 58, classification information 49, metadata service module 60, and metadata information 62. In the production environment, the aspect extractor module 58 may receive a query from the communication module 40 and apply aspect rules to extract aspect-value pairs from the query. Further, in the production environment, the aspect extractor module 58 may communicate the query received from the communication module 40 to the processing module 46 that may store the query as sample query information.

In the preview environment, the aspect extractor module 58 may receive most popular queries from the client machine 23 and apply aspect rules to extract aspect-value pairs from the query. Further, in the preview environment, the aspect extractor module 58 may maintain histogram information 99 while applying the aspect rules to the queries. For example, the query processing module 69 may respond to a condition clause 298 that evaluates TRUE (e.g., matching keyword) by incrementing a data item counter associated with the respective query. Further, in the production environment, the aspect extractor module 58 may communicate the aspect-value pairs to the communication module 40.

The metadata service module 60 may communicate metadata information to the communication module 40 based on the query that is received from the communication module 40. The metadata information may include metadata that the communication module 40 may use to format and generate an interface (e.g., user interface).

The search index engine 54 may include search indexes 64 and data item search information 66 (e.g., including data items and associated domain-value pairs and aspect-value pairs). In the production environment, the search index engine 54 may receive the transformed query from the communication module 40 and utilize the search indexes 64 to identify data items based on the transformed query. Further, in the production environment, the search index engine 54 may further communicate the found data items to the communication module 40.

Figure 3:
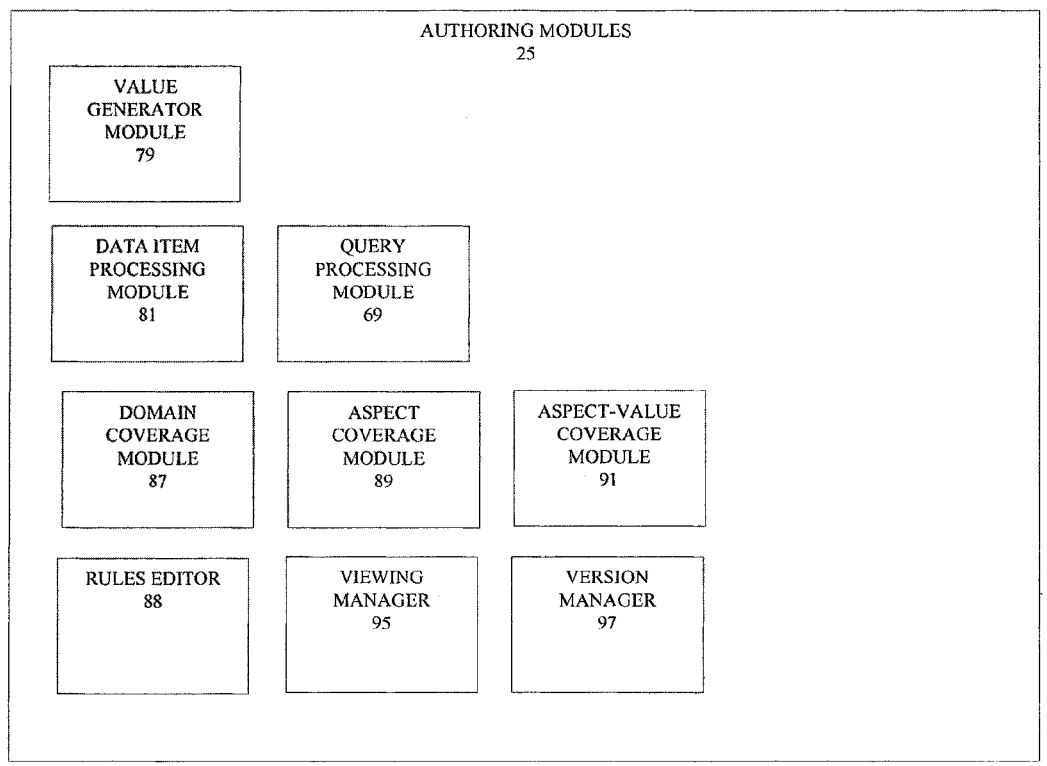
FIG. 3 is a block diagram illustrating authoring modules, according to an embodiment.

FIG. 3 is a block diagram illustrating authoring modules 25, according to an embodiment. The authoring modules 25 may include a value generator module 79, a data item processing module 81, a query processing module 69, a domain coverage module 87, an aspect coverage module 89 and an aspect-value coverage module 91, a rules editor 88, a viewing manager 95, and a version manager 97. In general, the authoring modules 25 may be used to author, analyze and generate the above described domain and aspect rules. Specifically, the authoring modules 25 may generate candidate values and aspect-value pair(s) that include the candidate values. The generated aspect-value pair(s) may be utilized by the rules editor 88 to generate one or more aspect rules. In general, the rules editor 88 may be utilized to edit and generate aspect and/or domain rules. The version manager 97 may be utilized to publish versions of rules.

The data item processing module 81 may be used to request data items for the preview environment. For example, the rules (e.g., domain and aspect) may be published or applied to the requested data items. The data item processing module 81 may be utilized to request different types of data items for the preview environment, as described further below.

The viewing manager 95 may be utilized to view coverage of the rules. For example, the viewing manager 95 may represent percentage coverage for most popular queries, domains, aspects, or aspect-values as interface elements. Interface elements may include user interface elements, audio interface elements, media interface elements, machine interface elements respectively presented on a user interface, audio interface, media interface and/or a machine interface. For example, in one embodiment, the viewing manager 95 may represent percentage coverage for queries or data items as user interface elements that may be displayed on a user interface. Further, the viewing manager 95 may receive a request from a category manager to display the percentage coverage of the most popular queries for a specified category. In response to receiving the request, the viewing manager 95 may request the query retrieval module 93 on the information storage and retrieval platform 12 to retrieve queries for the specified categories.

The value generator module 79 may receive a request from a category manager to suggest candidate values for a particular aspect. In response to receiving the request, the value generator module 79 may communicate the request to string analyzer module, the request including the aspect and existing candidate values. Further, the value generator module 79 may receive candidate values from the string analyzer module 47 and prompt the category manager to select candidate value(s).

The query processing module 69 may determine a percentage of coverage for each of the most popular queries. The domain coverage module 87 may determine a percentage of coverage for a selected domain(s). The aspect coverage module 87 may determine a percentage of coverage for each of the aspects within a selected domain. The aspect-value coverage module 91 may determine a percentage of coverage for each of the aspect-values within a selected domain and aspect.

Figure 4:
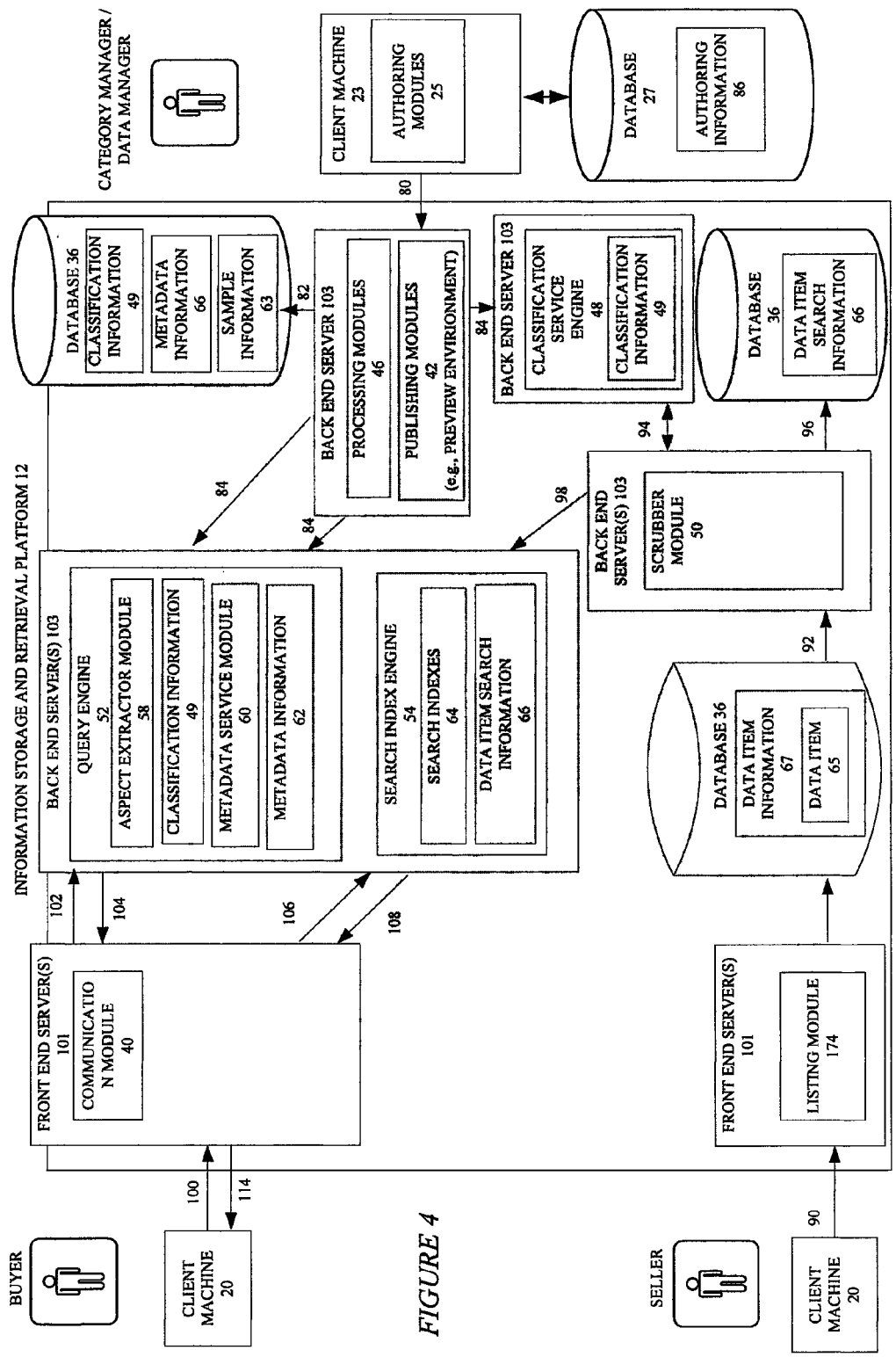
FIG. 4 is a block diagram illustrating an information storage and retrieval platform, according to an embodiment.

FIG. 4 is a block diagram further illustrating the information storage and retrieval platform 12, according to an embodiment. For example, as previously described, the information storage and retrieval platform 12 may be embodied as a network-based marketplace (e.g., eBay, the Worlds Online Marketplace developed by eBay Inc., of San Jose, Calif.) that supports the transaction of data items or listings (e.g., goods or services) between sellers and buyers.

Rules Generation

At operation 80, a category or data manager may utilize the authoring modules 25 to author rules that may include classification rules (e.g., domain rules and aspect rules) and metadata rules that may be published in the production environment or the preview environment on the information storage and retrieval platform 12. The following operations 82 through 114 provide an overview of a publication of rules in the production environment and operation of the production environment.

At operation 82, the processing module 46 may receive and store the rules in the database 36 in the form of classification information 49 and metadata information 66.

At operation 84, the processing module 46 may communicate the rules over a bus to a query engine 52, a metadata service module 60, and a classification service engine 48. For example, the category manager may publish the rules in real-time to facilitate the addition of new rules or the modification of existing rules while the information storage and retrieval platform 12 may be operating. In one embodiment, the processing module 46, query engine 52, metadata service module 60 and classification service engine 48 may communicate with each other over a bus that utilizes publish/subscribe middleware and database access software. In one embodiment the middleware may be embodied as TIBCO RENDEZVOUS™, a middleware or Enterprise Application Integration (EAI) product developed by Tibco Software, Inc. Palo Alto, Calif.

Data Item Generation

At operation 90, an author or publisher (e.g., a seller, user, etc.) enters information including item information into a client machine 20. The client machine 20 may communicate the item information to the information storage and retrieval platform 12 where the item information may be stored as a data item 65 in data item information 67 in the database 36.

The item information entered by the user may include keywords in a title/description, one or more categories in which to list the data item 65, and one or more item-specifics (e.g., color=blue). For example, the data item may describe a pair of shoes for auction or sale.

At operation 92, a scrubber module 50 may read the data item 65 and utilize the services of the classification service engine 48 (operation 94). The classification service engine 48 may structure the item information in the data item. For example, the classification service engine 48 may structure the data item by applying domain rules and aspect rules to the data item 65. The domain rules and aspect rules may respectively include a condition clause and a predicate clause. The classification service engine 48 may apply a condition clause to the data item 65 (e.g., Title, description, category, item-specific, etc.) and if the condition evaluates TRUE, then the corresponding predicate clause (e.g., domain-value pair, or aspect-value pair) be associated with the data item 65. For example, a seller may enter a data item 65 that includes Category="Debutante's Shoes", Title="AK Size 8 Black Pumps" and the classification service engine 48 may apply domain rules to the data item 65 to identify one or more domain-value pairs that may be stored with the data item 65 (e.g., If category="Debutante's Shoes" then PRODUCT TYPE=Women's Shoes, AISLE=shoes, DEPARTMENT=Apparel & Accessories). Further, the classification service engine 48 may apply aspect rules to identify one or more aspect-value pairs that may be associated with the data item 65 (e.g., If Title=black then color=black, etc.).

The above described domain-value pairs enable the data items to be identified (e.g., searched with a query) or browsed according to domains. According to one embodiment the domains may include a hierarchy of product domains, aisle domains, and department domains. The product domain represents the lowest level of the hierarchy and includes data items in the form of products (e.g., women's shoes, belts, watches, etc.) or services offered for sale on the information storage and retrieval platform. The aisle domain (e.g., Women's Clothing) represents the next level in the hierarchy and may include one or more product domains. The department domain (e.g., Apparel and Accessories) represents the highest level in the hierarchy and may include one or more aisle or product domains. Other embodiments may include different number or nesting of domains. Accordingly, the above described domain-value pairs may include a product type domain-value pair (e.g., "PRODUCT TYPE=Women's Shoes", PRODUCT TYPE=Watches", etc.), an aisle type domain-value pair (e.g., "AISLE TYPE=Women's Clothing", AISLE TYPE=Women's Accessories", etc.) or a department domain-value pair ("AISLE TYPE=Women's Clothing").

The above described aspect-value pairs may be domain specific and enable the data items to be identified (e.g., searched with a query) or browsed within a domain. For example, in the product domain "Women's Shoes" the following aspects may be used to describe women's shoes—color, brand, size. Further each of the aspects may be associated with one or more values to form the aspect-value pair (e.g., COLOR=blue, COLOR=red, etc.). Further, the classification service engine 48 may, in an example embodiment, assign only canonical values to the value of an aspect-value pair. For example, the seller may enter any of the following strings "A Klein", "Anne Klein" and "AK"; however, in each case, the classification service engine 48 may associate an aspect-value pair with the same canonical value, Brand="Anne Klein."

At operation 96, the scrubber module 50 may store the data item 65, domain value-pairs, and aspect-value pairs as data item search information 66 in the database 36.

At operation 98 the scrubber module 50 pushes or publishes the data item search information 66 over a bus in real time to a search index engine 54 that may store the data item search information 66 and update search indexes 64 based on the data item search information 66. For example, the search index engine 54 may add a data item identification number to appropriate search indexes 64 that may be associated with keyword(s) or aspect-value pairs in the data item 65. The scrubber module 50 and search index engine 54 may communicate with each other over a bus that utilizes publish/subscribe middleware and database access software. In one embodiment the middleware may be embodied as TIBCO RENDEZVOUS™, as described above.

Query Time Operations

At operation 100, a user may enter a query that includes different types of constraints including a keyword constraint, an item-specific constraint, and a category constraint. The query may be received by a communication module 40 at the information storage and retrieval platform 12.

At operation 102, the communication module 40 may communicate the query to the query engine 52, at a back end server 103 that may include the aspect extractor module 58 and the metadata service module 60. The aspect extractor module 58 may apply the aspect rules associated with the product type domain "Women's Shoes" to the query to extract aspect-values from the query. For example, the aspect-value pairs COLOR=ruby, COLOR=red, BRAND=anne klein, size=8 IN PRODUCT TYPE=Women's Shoes may be extracted from the query "A Klein shoes size 8 ruby." Further, the aspect extractor module 58 may assign the same canonical values that were assigned by the classification service engine 48, as described below. Indeed, the aspect extractor module 58 may utilize a subset of the same aspect rules that were utilized by the classification service engine 48.

At operation 104, the aspect extractor module 58 may communicate the extracted aspect-value pairs to the communication module 40. Further, the metadata service module 60 may communicate metadata information 62 to the communication module 40. The communication module 40 may utilize the extracted aspect-value pairs to construct a transformed query. For example, the transformed query may include keywords from the query and aspect-value pairs extracted from the query. In addition, the communication module 40 may cache the metadata for subsequent construction of the interface (e.g. user interface).

At operation 106, the communication module 40 may communicate the transformed query to the search index engine 54 at the back end server 103. The search index engine 54 may utilize the transformed query to retrieve data items 65. The search index engine 54 retrieves the data items 65 by utilizing the search indexes 64. For example, the search index engine 54 may utilize the keywords constraints (e.g., keywords) in the transformed query to retrieve item identification numbers from search indexes 64 that correspond to the keywords. Further, the search index engine 54 may utilize the aspect-value pairs in the transformed query to retrieve item identification numbers from search indexes 64 that correspond to the aspect-value pairs.

At operation 108, the search index engine 54 may communicate the retrieved data items 65 to the communication module 40 that, in turn, utilizes the data items 65 and the metadata information 62 to generate an interface.

At operation 114, the communication module 40 communicates the interface (e.g., user interface) to the client machine 20 that displays the interface to the user (e.g. buyer or bidder).

Figure 5:
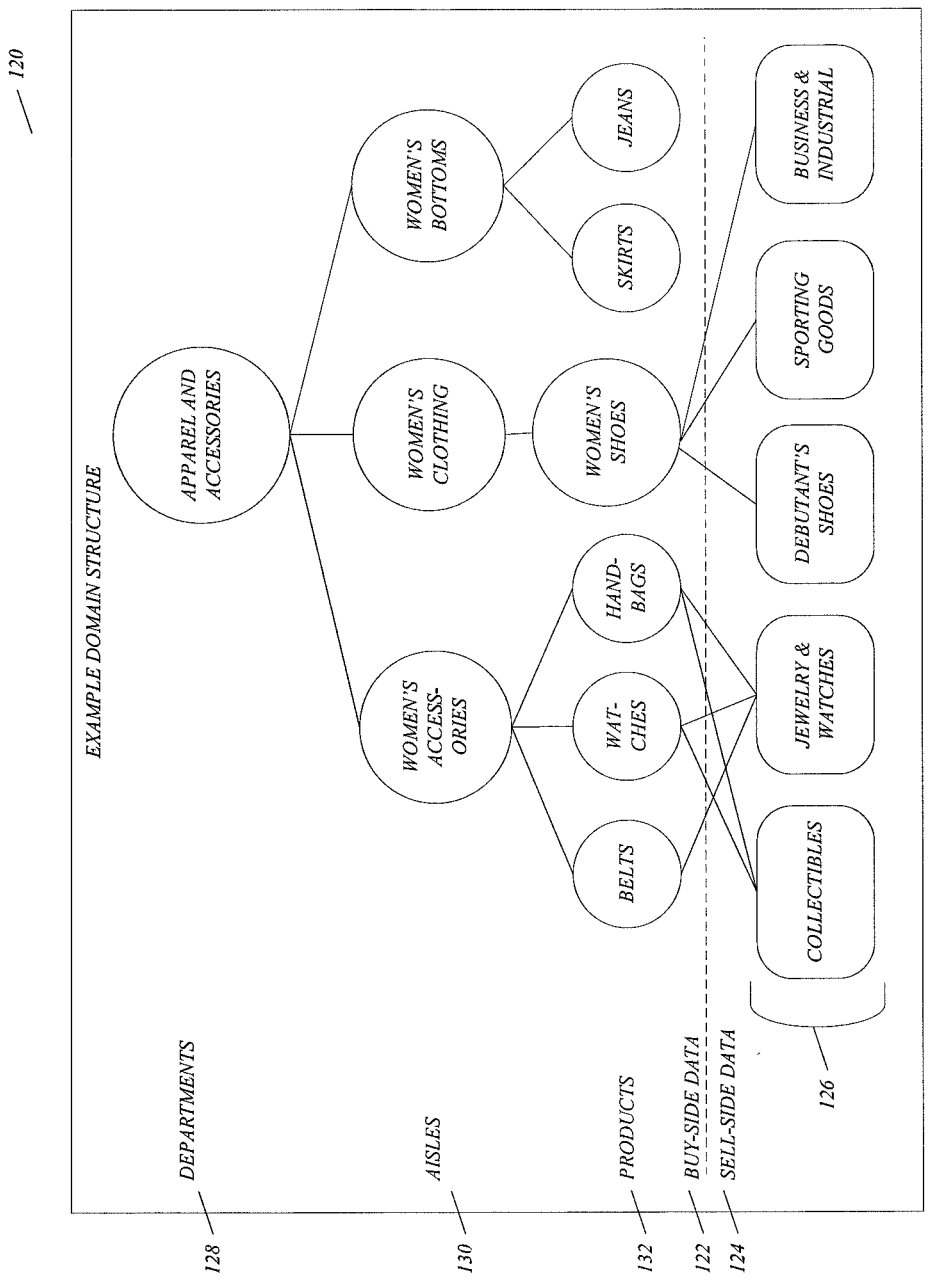
FIG. 5 is a diagram illustrating an example domain structure, according to one embodiment.

FIG. 5 is a diagram illustrating a domain structure 120, according to one embodiment. The domain structure 120 is shown to include buy-side data 122 and sell-side data 124. The sell-side data 124 is shown to include categories 126 that may have been selected by an author (e.g., seller) of the data item 65 to categorize the data item 65 on the information storage and retrieval platform 12. For example, the author may select one or more categories 126 including collectibles, jewelry and watches, debutante's shoes, etc. The buy-side data 122 is shown to include the above described product domains 132 (e.g., Belts, Watches, Handbags, Women's Shoes, etc.), aisle domains 130 (e.g., Women's Accessories, Women's Clothing, Women's Bottoms, etc.) and a department domain 128 (e.g., Apparel and Accessories). The previously described domain rules may be used to associate sell side data 124 (e.g., categories) to the product, aisle and department domains 128, 130, 132.

FIG. 6 is a table 148 further illustrating sell-side data 150 and buy-side data 152, according to one embodiment. The sell-side data 150 may be entered by an author (e.g., seller) of a listing or data item 65 and stored in the data item 65 and, as described above. The sell-side data 150 may include a category 154, a title 156 and one or more item-specifics 158, 160. For example, the sell-side data 150 illustrates the author as entering the category 154 "Debutante's Shoes", the title 156 "AK Size 8 Ruby Pumps", the item-specific 158 "Brand=Via Spiga" and the item-specific 160 Size=8. The buy-side data 152 is shown to include the product domain 132 "Women's Shoes", the aisle domain 130 "Women's Clothing", the department domain 128 "Apparel & Accessories", the aspect "Color", the aspect "Brand" and the aspect "Size." The buy-side data 152 may be associated with the sell-side data 150 via the domain rules and aspect rules, as previously described. Specifically, the condition clause in the rules may be used to test sell-side data 150. If the rule evaluates TRUE then buy-side data 152 in the same column may be associated with the data item 65. For example, the buy-side data 152 is shown to include a product domain-value pair 201 (e.g., PRODUCT TYPE=Women's Shoes), an aisle domain-value pair 201 (e.g., AISLE TYPE=Women's Clothing), a department domain-value pair (e.g., DEPARTMENT TYPE=Apparel & Accessories) that may have been associated with the data item 65 based on the category 154 "Debutante's Shoes." Note that multiple aspect brands (e.g., Anne Klein, Via Spiga) may be associated with the data item 65 based on the title 156 and the item-specific 158. Further note that aspect rules may be designed to infer or map one aspect-value pair to another. For example, the assignment of the aspect-value pair COLOR=ruby may be used to infer the assignment of another aspect-value pair COLR=red because ruby is a type of red. In one embodiment, the inference may be made with an aspect rule that includes a predicate clause that determines whether an aspect value pair is has been assigned to the data item 65 (e.g., if COLOR=red, then COLOR=ruby).

Figure 7:
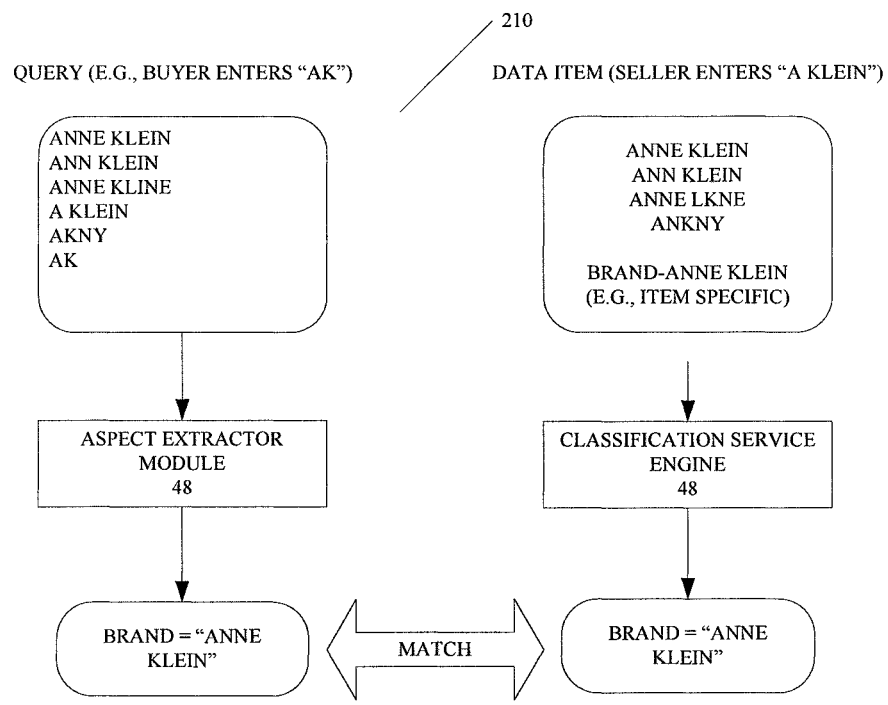
FIG. 7 is a diagram illustrating a canonical matching concept, according to an embodiment.

FIG. 7 is a diagram illustrating a canonical matching concept 210, according to an embodiment. The canonical matching concept 210 may be used to identify a data item 65 with a query. The canonical matching concept 210 may use a value (e.g., canonical value) to represent other values 208. For example, a query that includes the string "AK" may be received from a client machine. The query may be processed with an aspect rule that may include a condition clause that tests for multiple keywords (If "Anne Klein" OR "Ann Klein"

OR "A Klein" OR "AKNY" OR "AK", etc.) to associate the canonical aspect-value pair "BRAND=Anne Klein" to the query.

Continuing with example, a data item may be received from a seller at the client machine and may include any of the illustrated strings that represent "Ann Klein." For example, the title in the data item may contain "Anne Klein." Continuing with the example, the data item 65 may be processed with an aspect rule that includes a condition clause that tests for keywords in the title (If title="Anne Klein" OR "Ann Klein" OR "A Klein" OR "AKNY" OR "AK", etc.) to associate the canonical aspect-value pair 204 "BRAND="Anne Klein" to the data item. Accordingly, the data item may be found by a buyer that enters a query that includes keywords that do not match the information entered by the seller.

Figure 8A:
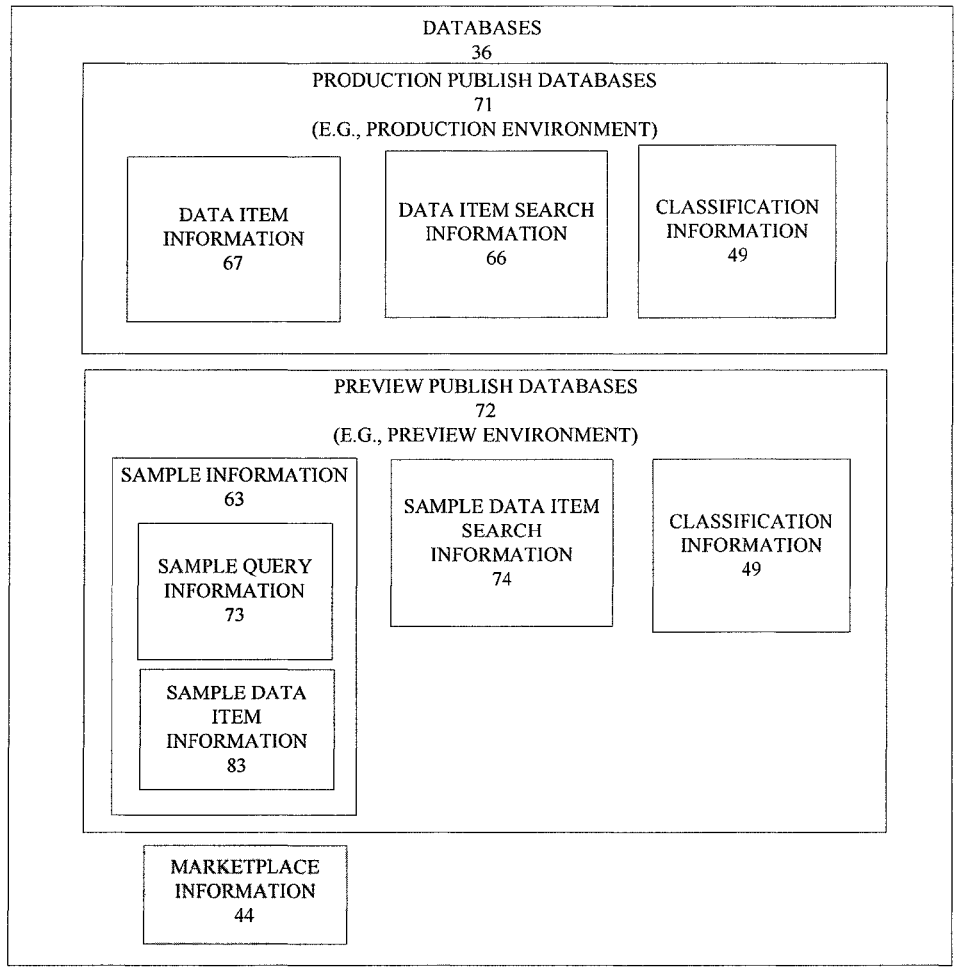
FIG. 8A is a block diagram illustrating databases, according to an embodiment.

FIG. 8A is a block diagram illustrating databases 36, according to an embodiment. The databases 36 include the production publish databases 71, preview publish databases 12, and the marketplace information 44. The production publish databases 71 may be utilized in the production environment and the preview publish databases 72 may be utilized in the preview environment. The production publish databases 71 include data item information 67, data item search information 66 and classification information 49. The classification information 49 includes the domain and aspect rules that may be applied to the data item information 67 (e.g., data items 65) to generate the data item search information 66 (e.g., data items 65 that have been structured with domain-value pairs and aspect-value pairs). The publish databases 72 includes sample information 63, sample data item search information 74, and classification information 49. The classification information 49 includes the domain and aspect rules that may be applied to the sample data item information 83 (e.g., data items 65) to generate the sample data item search information 74 (e.g., data items 65 that have been structured with domain-value pairs and aspect-value pairs). Further, the aspect rules in the classification information 49 may be applied to sample query information 73 to generate transformed queries that may be utilized to search the sample data item information 83.

The sample information 63 is shown to include sample query information 73 and sample data item information 83. The sample query information 73 includes queries that have been received by the information storage and retrieval platform 12 for a predetermined period of time. For example, the sample query information 73 may include all queries received in production environment in the last year. The sample data item information 83 includes data items 65 that have been sampled from the data item information 67 (e.g., live data). The sample data item information 83 may include different sets of data items 65 that may be published to preview environment in the information storage and retrieval platform 12. For example, the sets of data items 65 may include a current set, a seasonal set, or an historical set. The current set may be a sample taken on a date close to the current date (e.g., the current date or one or two days after the current date). The seasonal set may be taken on a date close to a holiday date (e.g., the holiday date one or two days before or after the holiday date). The historical set may be taken on a date close to a historical date (e.g., the historical date or one or two days before or after the historical date (e.g., 9/11)).

Further, example sets of data items 65 may include data items 65 that have been selected to include lengthy titles, a lengthy descriptions, a specific category, hard to classify data items 65, and data items entered by a particular seller segment. The lengthy title set and the lengthy description sets may include data items 65 that have been filtered based on the number of words in the title or description. For example, the title or description for data items 65 in each of the sets may exceed a predetermined number of words. The specific category set may include data items 65 that have been classified by a seller in a specific category. The hard to classify set may include data items 65 that have been historically difficult for category managers to classify with domain and/or aspect rules. The particular seller segment set may include data items 65 that have been authored by sellers that sell products or services on the information storage and retrieval platform 12 with revenues exceeding a predetermined amount.

As previously described, in one embodiment, the information storage and retrieval platform 12 may be embodied as a network-based marketplace (e.g., eBay, the Worlds Online Marketplace developed by eBay Inc., of San Jose, Calif.) that supports the transaction of data items or listings (e.g., goods or services) between sellers and buyers. In such an embodiment the databases 36 may include marketplace information 44.

Figure 8B:
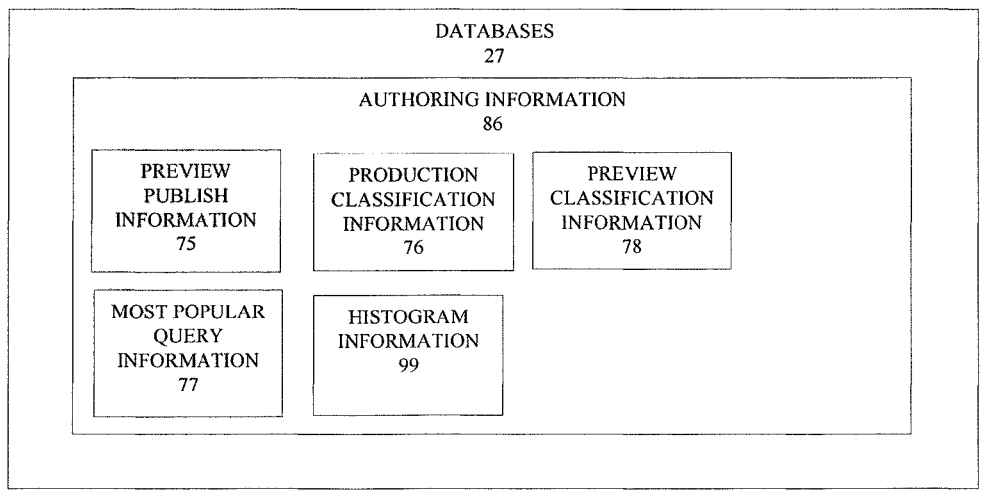
FIG. 8B is a block diagram illustrating additional databases, according to an embodiment.

FIG. 8B is a block diagram illustrating databases 27, according to an embodiment, including authoring information 86. The authoring information 86 includes preview publish information 75, production classification information 76, preview classification information 78, most popular query information 77 and histogram information 99. The preview publish information 75 may be used to identify domain dictionaries to publish to the production environment or the preview environment. The production classification information 76 stores domain dictionaries that are currently published in the production environment as classification information 49. The preview classification information 78 stores new or edited domain dictionaries. Indeed, the domain dictionaries in the preview classification information 78 may be concurrently updated by multiple category managers. The preview publish information 75 may be utilized to identify the domain dictionaries in the production classification information 76 or the preview classification information 78 to publish to the preview environment or the production environment. For example, the preview publish information 75 may be utilized to identify the latest version of a domain dictionary.

The most popular query information 77 may be used to store most popular queries. The histogram information 99 may be generated by the classification service engine 48 and utilized to store statistical information (e.g., counters) based on the application of domain or aspect rules to the data items or queries. The histogram information 99 may be communicated to the authoring modules to determine percentage coverage for most popular queries, domains, aspects, and aspect-value pairs.

Figure 9A:
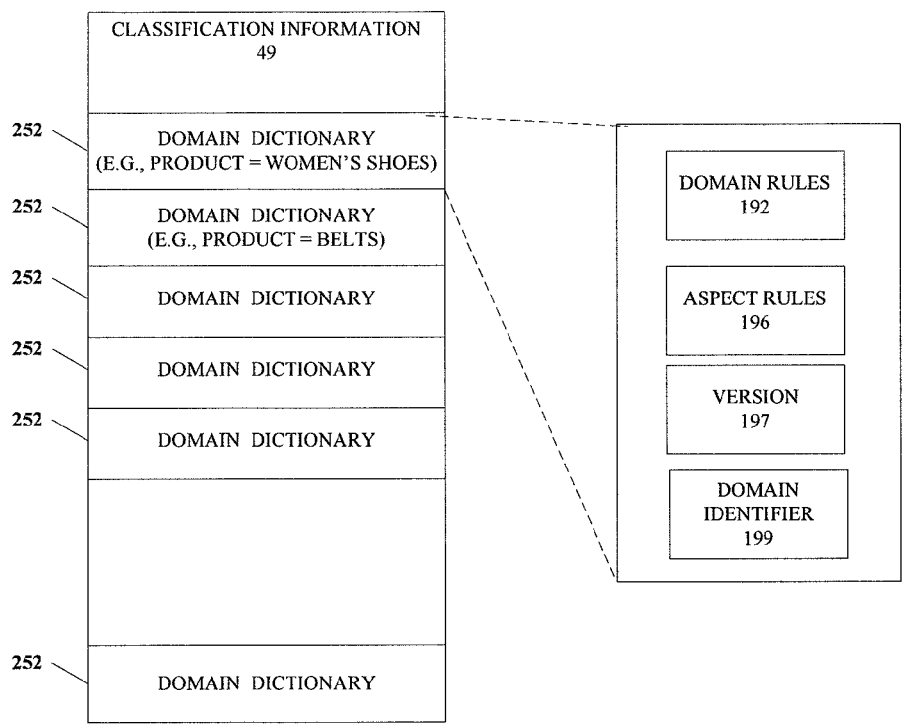
FIG. 9A is a block diagram illustrating classification information, according to an embodiment.

FIG. 9A is a block diagram illustrating the classification information 49, according to an embodiment. The classification information 49 in the production environment includes a complete set of domain dictionaries 252 that are published to the production environment on the information storage and retrieval platform 12. The classification information 49 in the preview environment includes a complete set of domain dictionaries 252 that are published to the preview environment on the information storage and retrieval platform 12. Each domain dictionary 252 may be associated with a single product type (e.g., shoes, belts, watches, etc.) and includes domain rules 192, aspect rules 296, a domain version 197, and a domain identifier 199. The domain rules 192 may be used to associate a product domain 132 and/or aisle domain 130 and/or department domain 128 to the data item 65 based on the contents of the data item. The aspect rules 296 may be used to associate aspect-value pairs to the data item 65 based on the contents of a data item 65. Specifically, the aspect rules 296 in a domain dictionary 252 may be utilized to associate aspect-value pairs to data items identified, via domain rules 192 in the same domain dictionary 252, as belonging to the product type of the domain dictionary 252. For example, the domain rules 192 from the product domain 132 "women's shoes" may be used to identify a data item 65 as belonging to the "women's shoe's" product domain 132 and the aspect rules 296 from the same product domain 132 "women's shoes" may be used to associate aspect-value pairs to data items identified as belonging to the product domain 132 "women's shoes." Further, the aspect rules 296 for a particular product domain 132 may be utilized to associate aspect-value pairs to a query to form a transformed query that may be utilized to search for data items identified as being in the same product domain 132 and containing matching aspect-value pairs. The domain version 197 may be used to identify the version of the domain dictionary currently published to and operating in production environment or the preview environment on the information storage and retrieval platform 12.

Figure 9B:
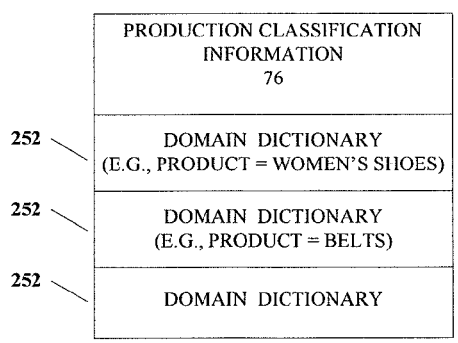
FIG. 9B is a block diagram illustrating production classification information, according to an embodiment.

FIG. 9B is a block diagram illustrating production classification information 76, according to an embodiment. The production classification information 76 includes a complete set of domain dictionaries 252 that have been published to the production environment on the information storage and retrieval platform 12. The production classification information 76 may include domain dictionaries 252 that may be identified by the preview publish information 75 for publication to the preview environment or the publication environment on the information storage and retrieval platform 12.

Figure 9C:
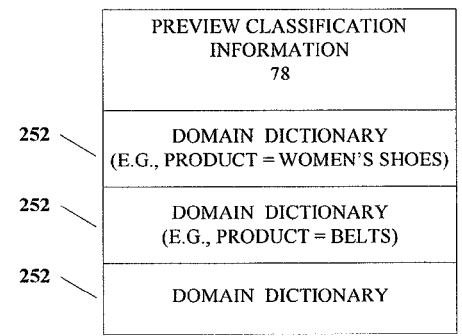
FIG. 9C is a block diagram illustrating preview classification information, according to an embodiment.

FIG. 9C is a block diagram illustrating the preview classification information 78, according to an embodiment. The preview classification information 78 does not include a complete set of domain dictionaries for publication; but rather new domain dictionaries 252 that have been created by a category manager or existing domain dictionaries 252 that have been edited by a category manager. The preview classification information 78 may include domain dictionaries 252 that may be identified by the preview publish information 75 for publication to the preview environment or the publication environment on the information storage and retrieval platform 12.

Figure 10:
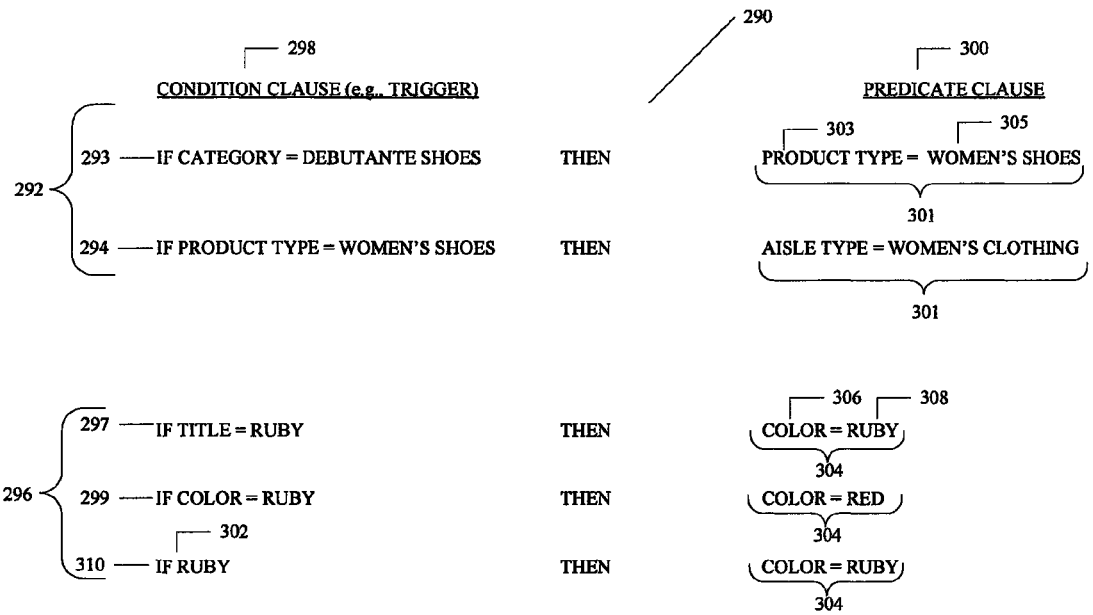
FIG. 10 is a diagram illustrating rules, according to an embodiment.

FIG. 10 is a diagram illustrating rules 190, according to an embodiment. The rules 290 include domain rules 292 and aspect rules 296. The domain rules 292 and aspect rules 296 include a condition clause 298 (e.g., trigger, Boolean expression, etc.) on the left and a predicate clause 300 on the right. The condition clause 298 that may include a Boolean expression that may evaluate TRUE or FALSE. In one embodiment the Boolean expression may be used to evaluate one or more fields in the data item 65 to identify matching information (e.g., condition clause 298 evaluates TRUE). For example, the condition clause 298 may evaluate TRUE responsive to the identification of matching information in the category 154 and/or in the title 156, and/or in the item-specific 158 in a data item 65. Further, the Boolean expression may include multiple operators (AND, OR, EXCLUSIVE OR, etc.). If the condition clause 298 evaluates TRUE, then, the predicate clause 300 may be executed to associate the contents of the predicate clause with the data item 65.

The predicate clauses 300 associated with the domain rules 292 may include a domain-value pair 301 (e.g., PRODUCT TYPE=Women's Shoes). The domain-value pair 301 may include a domain type 303 (e.g., PRODUCT TYPE) and a domain 305 (e.g., "Women's Shoes"). The domain type 303 may describe the type of domain (e.g., PRODUCT TYPE, AISLE TYPE, DEPARTMENT TYPE, etc. The domain 305 may be any one of the possible domain names associated with the corresponding domain type 303. The domain-value pair 201 "PRODUCT TYPE=Women's Shoes" may further be used as a condition clause 298 to trigger the association of another domain-value pair 301. For example, the domain rule 294 is shown to evaluate TRUE if the data item 65 includes the previously associated domain-value pair 301 "PRODUCT TYPE=Women's Shoes." If TRUE, then the domain-value pair 301 "AISLE TYPE=Women's Clothing" may also be associated with the data item 65. Accordingly, the association of one domain-value pair 301 to a data item 65 may trigger the association of another domain-value pair 301 (e.g., mapping).

The predicate clauses 300 associated with the aspect rules 296 may include an aspect-value pair 304 (e.g., COLOR=ruby). For example, the aspect rule 297 is associated with aspect-value pair 304 "COLOR=ruby" that may be assigned to a data item 65 that contains a Title with the word "Ruby." The aspect-value pair 304 may include an aspect 306 such as "COLOR" and a value 308 such as "ruby." The aspect-value pair 304 (e.g., COLOR=ruby) may further be used as a condition clause 298. For example, an aspect rule 299 may include the aspect-value pair 204 (e.g., COLOR=ruby) as a condition clause 298 to trigger the association of another aspect-value pair 304 ("color=red") to the data item 65. Accordingly, the association of one aspect-value pair 304 to the data item 65 may be used to associate another aspect-value pair 204 to the data item 65. In addition, the aspect rules 296 may include a condition clause 298 that includes a keyword 302. For example, an aspect rule 296 is shown to include the keyword 302 "ruby." The keyword(s) 302 in the aspect rule 296 may be used by the aspect extractor module 58 to match keyword(s) 302 in a query. In response to the match, the aspect extractor module 58 may assign the aspect-value pair (e.g., COLOR=ruby) from the corresponding predicate clause 300 to a transformed query that may be used to search data items 65 including the same aspect-value pair.

Figure 11:
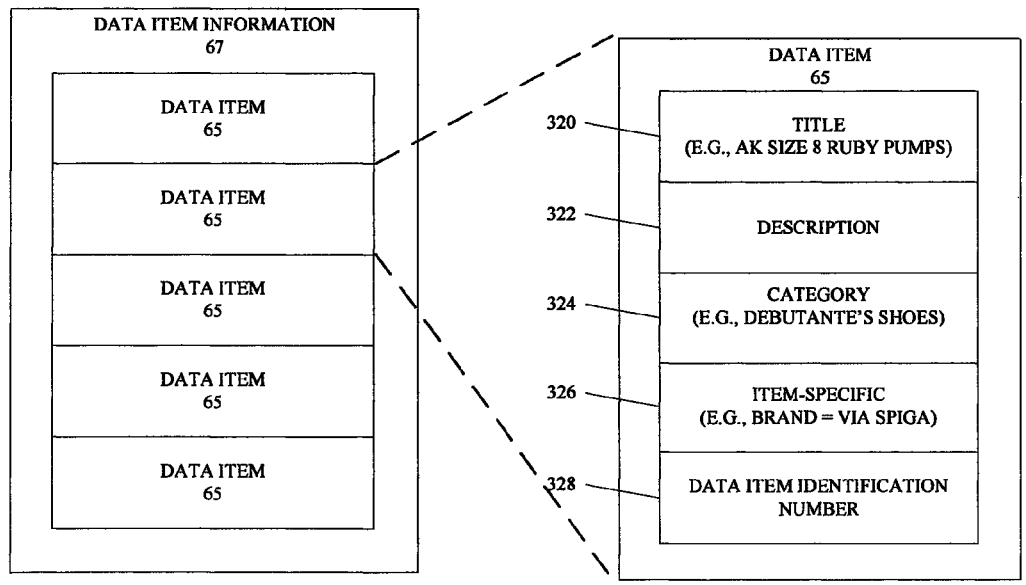
FIG. 11 is a block diagram illustrating data item information, according to an embodiment.

FIG. 11 is a block diagram illustrating data item information 67, according to an embodiment. The data item information 67 is shown to include multiple data items. The data item 65 may include a title 320, a description 322, one or more categories 324, one or more item-specifics 326, and a data item identification number 328. The title 320 may include keywords entered by the user to describe the data item 65. For example, the present data item 65, as illustrated, shows a title "AK Size 8 Ruby Pumps." The description 322 may be used to describe the data item 65 that may be for sale or auction. The category 324 may be a category selected by the seller or author of the data item 65. The item-specific 326 may include item-specific (e.g., Via Spiga, Size 8) information selected by the seller or author of the data item 65. In the present example, the data item 65 may be a pair of shoes, and therefore an item-specific 264 for BRAND is appropriate. The data item identification number 266 uniquely identifies the data item 65 in the information storage and retrieval platform 12.

Figure 12:
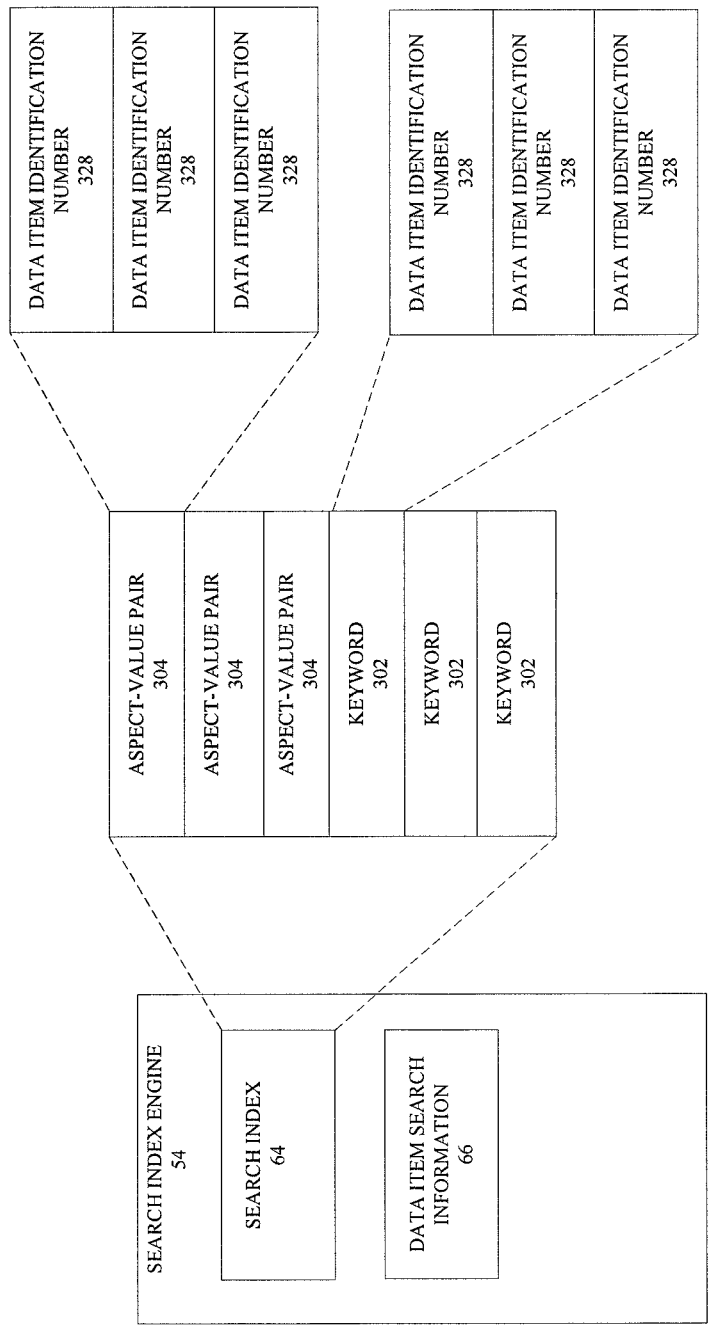
FIG. 12 is a block diagram illustrating a search index engine, according to an embodiment.

FIG. 12 is a block diagram illustrating the search index engine 54, according to an embodiment. The search index engine 54 is shown to include the search index 64, and the data item search information 66. The search index 64 is further shown to include multiple aspect-value pairs 304 and multiple keywords 302. Each aspect-value pair 304 and keyword 302 is further illustrated as associated with one or more data item identification numbers 328. For example, if a data item 65 was associated with the aspect-value pair 304 "BRAND=Anne Klein", then the data item identification number 328 corresponding to the data item 65 may be associated with the aspect-value pair "BRAND=Anne Klein."

Also, for example, if a data item 65 was associated with the aspect-value pair 304 "COLOR=Ruby", then the data item identification number 328 of the data item 65 may be associated with the keyword 202 "Ruby" in the search index 64.

Figure 13A:
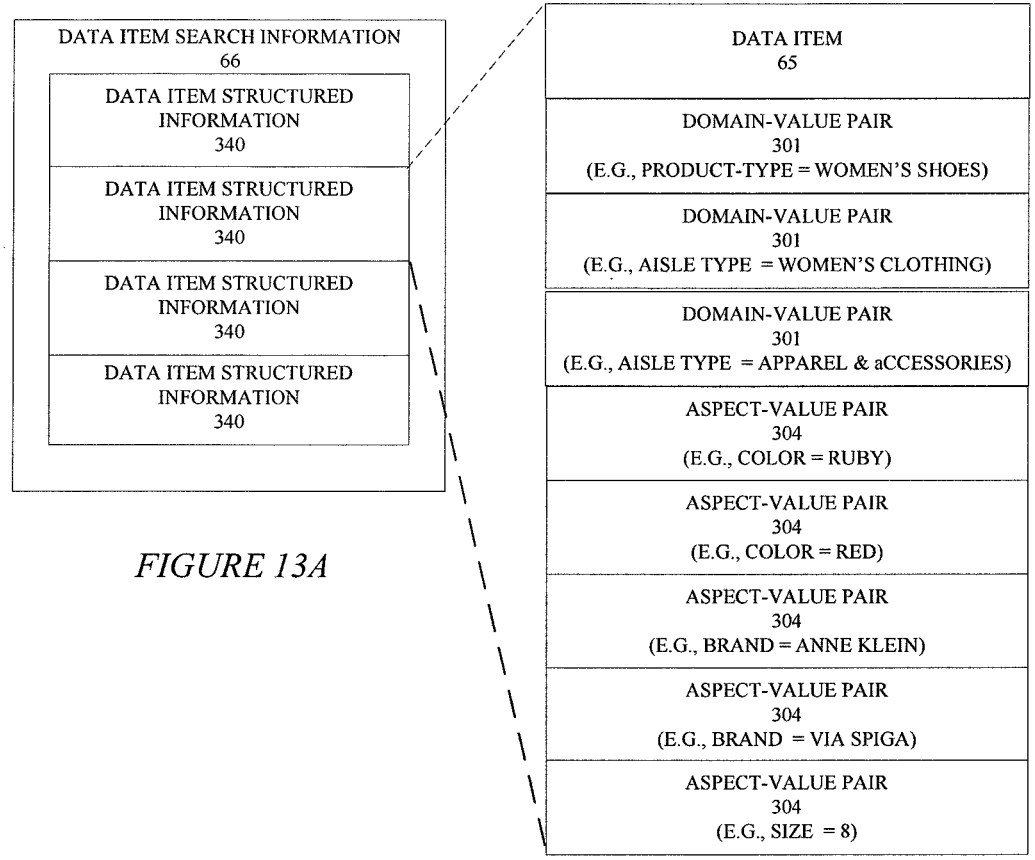
FIG. 13A is a block diagram illustrating a data item search information, according to an embodiment.

FIG. 13A is a block diagram illustrating the data item search information 66, according to an embodiment. The data item search information 66 may be utilized in the production environment and is shown to include multiple data item structured information 340 entries. Each data item structured information 340 entry may contain a data item 65, one or more domain-value pairs 301 that have been assigned to the data item 65 based on the application of one or more domain rules 292 and one or more aspect-value pairs 304 that have been assigned to the data item 65 based on the application of one or more aspect rules 296 in the production environment.

Figure 13B:
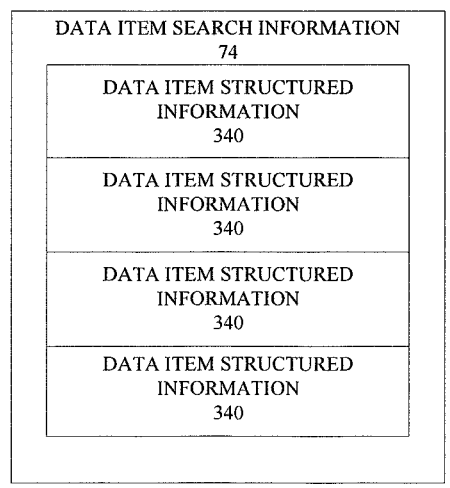
FIG. 13B is a block diagram illustrating a sample data item search information, according to an embodiment.

FIG. 13B is a block diagram illustrating the sample data item search information 74, according to an embodiment. The sample data item search information 74 may be utilized in the preview environment and is shown to include multiple data item structured information 340 entries. Each data item structured information 340 entry may contain a data item 65, one or more domain-value pairs 301 that have been assigned to the data item 65 based on the application of one or more domain rules 292 and one or more aspect-value pairs 304 that have been assigned to the data item 65 based on the application of one or more aspect rules 296 in the preview environment.

Figure 14:
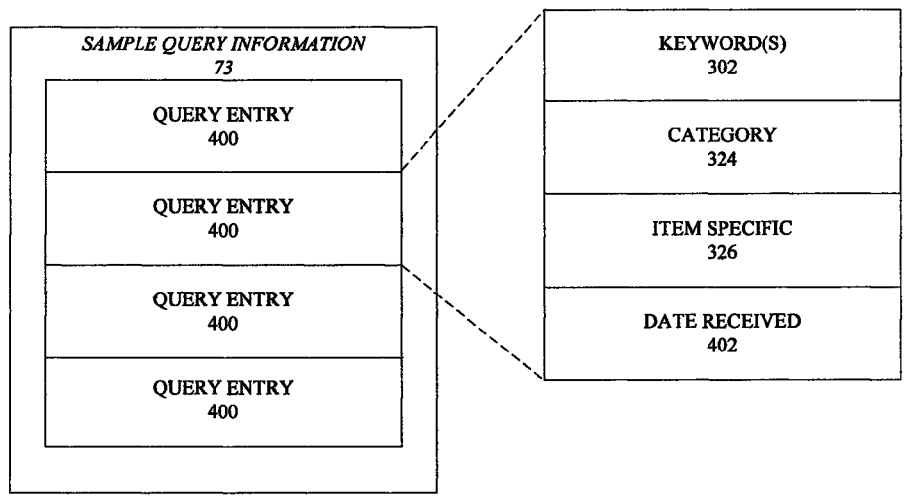
FIG. 14 is a block diagram illustrating query information, according to an embodiment.

FIG. 14 is a block diagram illustrating sample query information 73, according to an embodiment. The sample query information 73 includes one or more query entries 400. Each query entry 400 includes one or more keywords 302, one or more categories 324 one or more item specifics 326 and a date received 402. The sample query information 73 is used to store queries received by the information storage and retrieval platform from a user (e.g., operating client machine 20).

Figure 15:
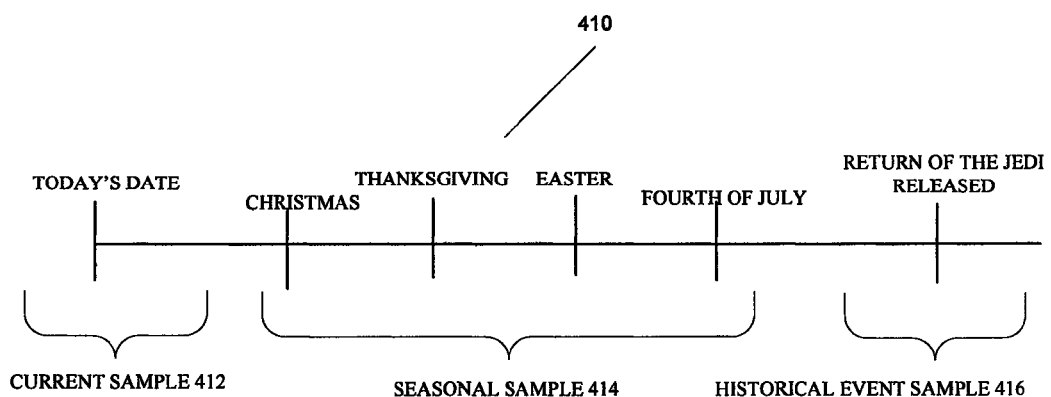
FIG. 15 is a block diagram illustrating data item criteria, according to an embodiment.

FIG. 15 is a block diagram illustrating sampling criteria 410, according to an embodiment, for data items and queries. The sampling criteria 410 may be used to capture a current sample 412, a seasonal sample 414, or an historical sample 416. The current sample 412 may represent a sample of queries taken from the sample query information 73 on the information storage and retrieval platform 12. The current sample 412 may also represent a sample of data items 65 taken from the data item information 67 and stored in the sample data item information 83. The seasonal sample 414 may queries taken from the sample query information 73. Further, the seasonal sample 414 may be data items 65 taken from the data item information 67. The historical sample 416 may be queries taken from the sample query information 73. Further, the historical sample 416 may be data items 65 taken from the data item information 67.

Figure 16:
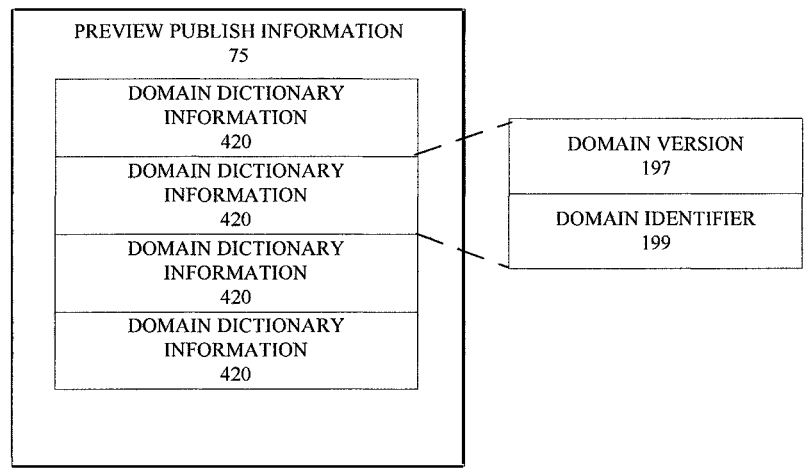
FIG. 16 is a block diagram illustrating preview publish information, according to an embodiment.

FIG. 16 is a block diagram illustrating preview publish information 75, according to an embodiment. The preview publish information 75 is utilized to schedule the publication of a domain dictionary 252 to the preview environment or the production environment. The preview publish information 75 may be utilized to publish a domain dictionary 252 that is new, deleted, or updated (e.g., add rule(s), delete rule(s), or modify rules(s)). It will be appreciated that multiple category managers may be concurrently working on multiple domain dictionaries 252 and that the preview publish information 75 may be utilized to identify domain dictionaries 252 for publication to the preview environment or the production environment. The preview publish information 75 includes domain dictionary information entries 420. Each domain dictionary information 420 identifies a domain version 197 and domain identifier 199 associated with a domain dictionary 252 that is to be published to the preview environment or the production environment.

Figure 17:
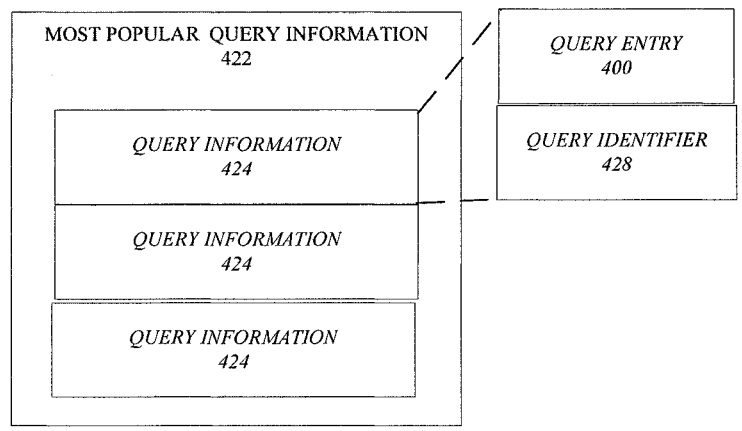
FIG. 17 is a block diagram illustrating most popular query information, according to an embodiment.

FIG. 17 is a block diagram illustrating most popular query information 77, according to an embodiment. The most popular query information 422 includes multiple query information entries 424 that respectively include the previously described query entry 400 and a query identifier 428. The most popular query information 422 is communicated by the query processing module 69 to the aspect extractor module 58 in the query engine 52 in the preview environment on the information storage and retrieval platform 12. The aspect extractor module 58 reads each of the query entries and applies the aspect rules 296 to the keywords in the query entry 400.

Figure 18:
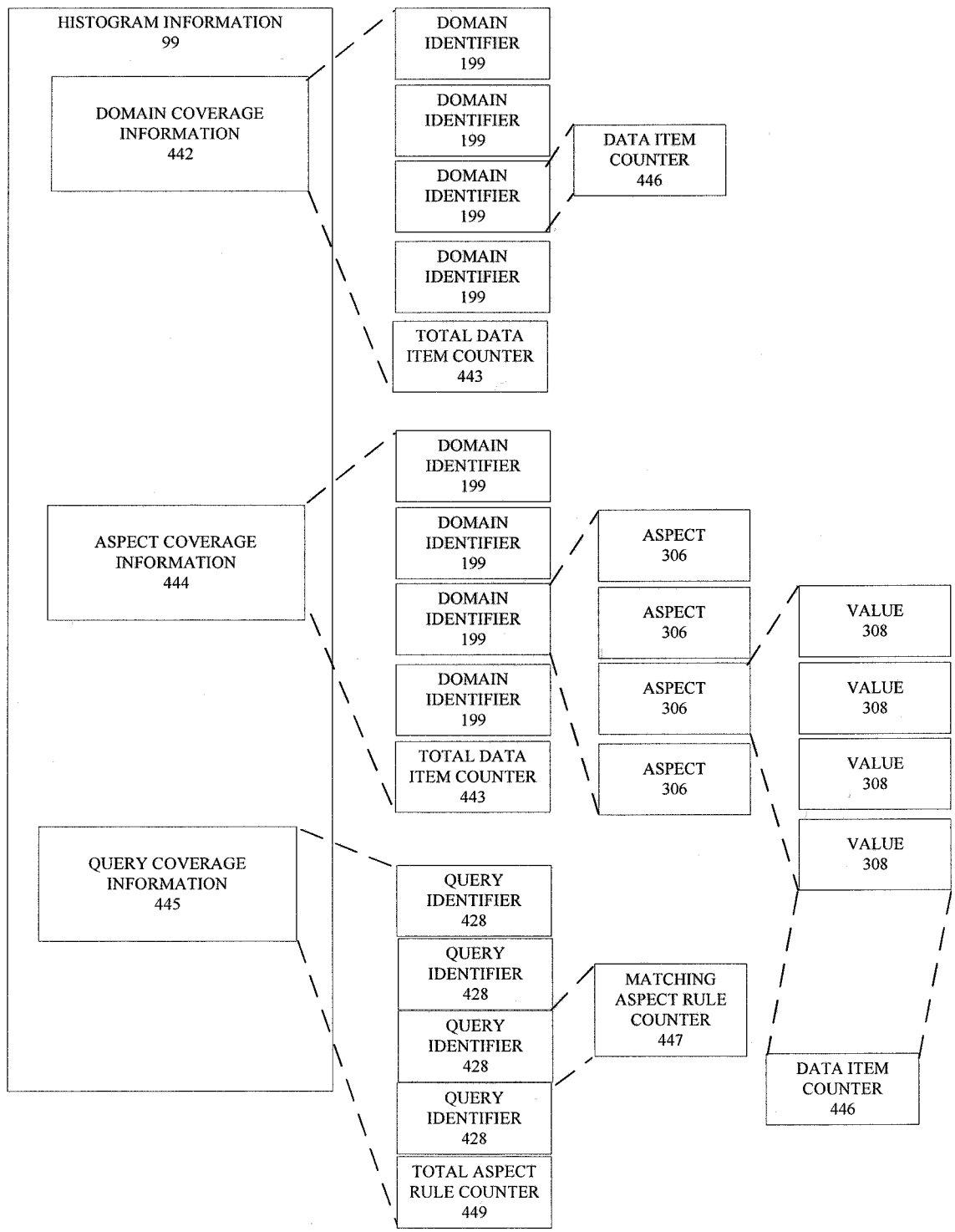
FIG. 18 is a block diagram illustrating histogram information, according to an embodiment.

FIG. 18 is a block diagram illustrating histogram information 99, according to an embodiment. The histogram information 99 includes domain coverage information 442, aspect coverage information 444, and query coverage information 445. The domain coverage information 442 and aspect coverage information 444 may be generated by the classification service engine 48 which increments data item counters 446 responsive to application of domain rules 186 and aspect rules 296 that result in assignment of corresponding predicate clauses 300 to the data items 65. The domain coverage information 442 may be communicated to and read by the domain coverage module 87 to determine percentage domain coverage. The aspect coverage information 444 may be communicated to and read by the aspect coverage module 89 or the aspect-value percentage coverage module 91. The domain coverage information 440 includes domain identifiers 199, data item counters 446, and total data item counters 443. The total data item counters 443 include a count of all data items 65 evaluated with domain rules 292. The respective data item counters 446 may be incremented responsive to a domain rule 192 assigning a corresponding domain to a data item 65. Consider the following domain rule 192:

If category="Debutante's Shoes" then PRODUCT TYPE=shoes

The domain 305 in the above predicate clause 300 includes the product type domain "shoes." Accordingly, the data item counter 446 corresponding to the domain 305 "shoes" is incremented responsive to the assignment of "PRODUCT TYPE=shoes" to the data item 65.

The aspect coverage information 444 includes domain identifiers 199, aspects 306, values 308, data item counters 446 and a total data item counter 443. The total data item counters 443 include a count of all data items 65 evaluated with aspect rules 296. The respective data item counter 446 may be incremented responsive to an aspect rule 196 assigning the corresponding aspect-value pair (e.g., aspect 306 and value 308) to a data item 65. Consider the following aspect rules 296:

IN PRODUCT TYPE=SHOES, If title=ruby then COLOR=red

Responsive to applying the above aspect rule 196 from the domain dictionary 252 associated with the "shoes" domain to a data item 65, the aspect-value pair 304 "COLOR=red" may be assigned to the data item 65 if the word "red" is found in the title 320 field of the data item 65. Accordingly, the classification service engine 48 may increment the data item counter 446 in the aspect coverage information 444 that corresponds to the "shoes" domain, the aspect 306 "COLOR", and the value 308 "red." In yet another example, the same aspect value-pair, COLOR=red, may be assigned to the data item 65 based on the item specific 326 or the category 324 in the data item 65. Consider the following:

```
IN PRODUCT TYPE=SHOES, If item specific
    3456=red then COLOR=red

IN PRODUCT TYPE=SHOES, If category=1234 then
    COLOR=red

IN PRODUCT TYPE=SHOES, If "ruby" then
    COLOR=red
```

Responsive to applying any of the above aspect rules 296, the aspect-value pair 304 "COLOR=red" may be assigned to the data item 65. Accordingly, the data item counter 446 corresponding to corresponds to the "shoes" domain, the aspect 306 "COLOR", and the value 308 "red" may be incremented based on any of the above aspect rules evaluating TRUE.

The query coverage information 445 includes query identifiers 428, a matching aspect rule counter 447, and a total aspect rule counter 449. The respective matching aspect rule counters 447 may be incremented by the aspect extractor module 58 responsive to an aspect rule 196 that evaluates TRUE. For example, consider the following aspect rules 296:

```
IN PRODUCT TYPE=MILITARY SURPLUS, If
    navy, then SERVICE=Navy

IN PRODUCT TYPE=CLOTHING, If navy, then
    COLOR=blue
```

If the above aspect rules 296 are applied to a query "Navy Seal Fins" then the matching aspect rule counter 447 corresponding to the query may be incremented twice by the aspect extractor module 58. Further, the total aspect rule counter 449 may be incremented twice (e.g., for every aspect rule 196 that is applied to the query) by the aspect extractor module 58.

Figure 19:
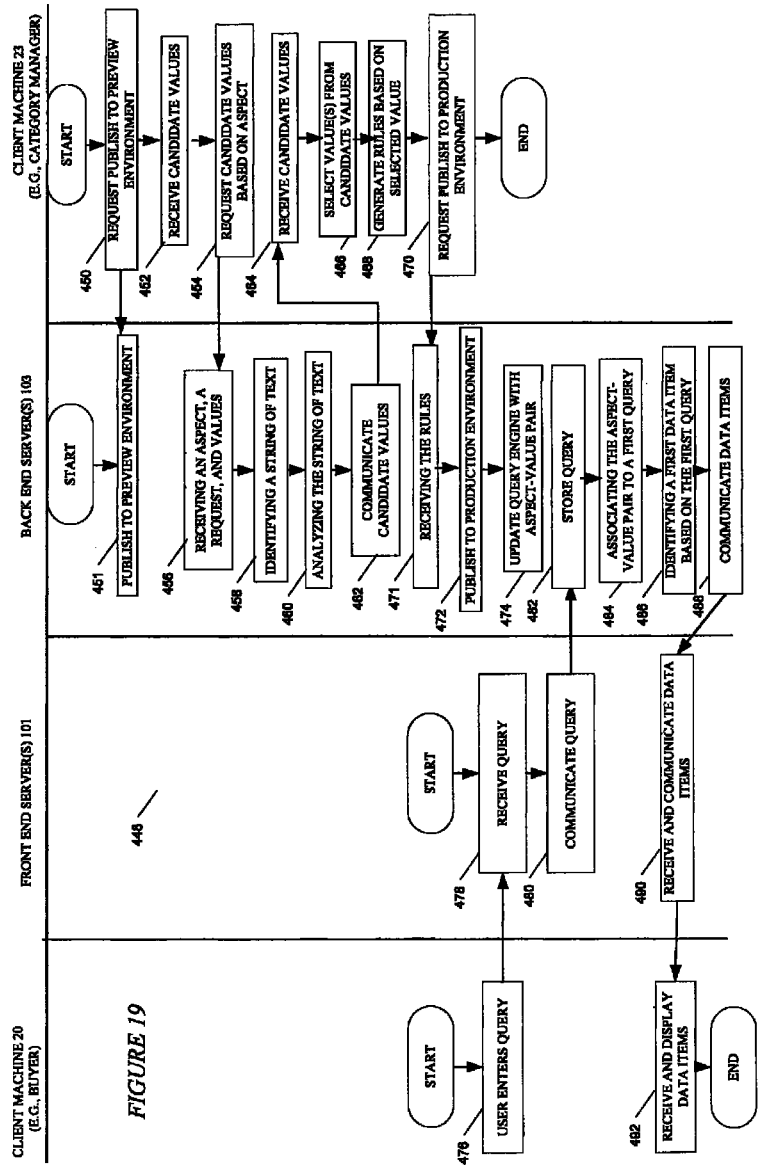
FIG. 19 is a flow chart illustrating a method to generate rules to identify data items, according to an embodiment.

FIG. 19 is a flow chart illustrating a method 448 to generate rules to identify data items, according to an embodiment. The method commences at operation 450, at the client machine 23, with a category manager requesting publication of domain dictionaries 252 to the preview environment on the information storage and retrieval platform 12. In one embodiment, the request may be received and processed by the version manager 97 that utilizes the domain versions 197 identified in the preview publish information 75. For example, the version manager 97 may read the domain dictionary 252 from the preview classification information 78 or the production classification information 78 based on the latest domain version 197 identified in the preview publish information 75. Publication to the preview environment results in application of the domain rules 192 and the aspect rules 196 to sample data item information 83 to generate sample data item search information 74. For example, the sample data item information 83 may include a current sample 412 of data items 65, a seasonal sample 414 of data item 65, an historical sample 416 of data items 65 or some other type of sample, as previously described.

At operation 451, on the back end servers 103, the processing module 46 receives a complete set of domain dictionaries 252 in the form of classification information 49 and utilizes the publish modules 42 to publish the classification information 49 to the preview environment.

At the client machine 23, the category manager may review the aspect rules 296 and determine that the aspect 306 "COLOR" in the domain 305 "shoes" may provide greater coverage if additional values 308 were found. To this end the category manager may request that candidate values be suggested.

Figure 34:
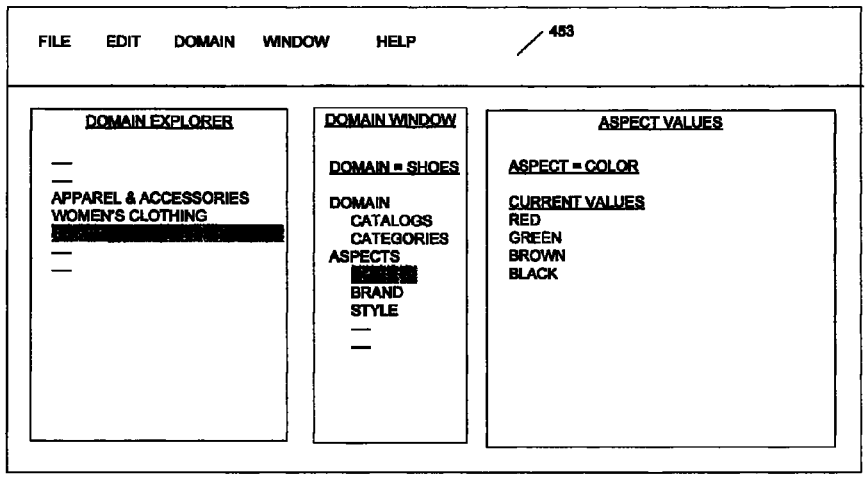

FIG. 34 is a diagram illustrating a user interface 453, according to an embodiment, to request candidate values. The user interface 453 shows the domain 305 "shoes" selected, the aspect 306 "color" selected and the current values 308 associated with the aspect "color" in the domain "shoes" (e.g., red, green, brown, and black). In one embodiment, the user may right click a mouse and request that candidate values 308 be suggested.

Returning to FIG. 19, at operation 452, the value generator module 79 receives the request to suggest candidate values and at operation 454 communicates the request, the aspect "color", and the existing values (e.g., red, green, brown, and black) to the information storage and retrieval platform 12.

At operation 456, the string analyzer module 47 receives the request, the aspect "COLOR", and the existing values and at operation 458 the string analyzer module 47 identifies strings of text in the sample query information 73 and/or the data item information 65 that may include the aspect 306 or derivatives thereof as previously described. For example, the string analyzer module 47 may identify strings that contain the aspect "COLOR" or derivatives thereof (e.g., acronyms, synonyms, misspellings, etc.) in the keywords 302 in the query entries 400 of the sample query information 73 or in the keywords 302 contained in the title 320 or description 322 of data items 65 in the data item information 65.

At operation 460, the string analyzer module 47 may analyze the string of text. For example, the string analyzer module 47 may remove stop words, the received values (e.g., red, green, brown, and black) and the aspect 306 or derivatives thereof from the identified strings of text to identify candidate value(s) 308 that may remain in the identified strings of text.

At operation 462, the string analyzer module 47 may communicate the candidate values 308 to the client machine 23. For example, the string analyzer module 47 may communicate the candidate values ruby, purple, orange, and yellow.

At operation 464, at the client machine 23, the value generator module 79 receives the candidate values, generates a user interface including the candidate values, and displays the user interface to the category manager. At operation 466, the category manager may select the candidate value 308 "ruby" to include the aspect-value pair "COLOR=ruby" in an aspect rule 296. For example, responsive to receiving the category managers selections, the authoring modules 25 may associate the aspect-value pair "COLOR=ruby" (e.g., a predicate clause 300) to a condition clause 208.

At operation 468, the rules editor 88 may generate an aspect rule 196 and enter the aspect-rule 196 into the domain dictionary 252 for the product "shoes." For example, the following aspect rules 296 may be generated and entered into the shoes domain dictionary 252:

```
IN Shoes, if ruby then COLOR=ruby

IN Shoes, if title=ruby then COLOR=ruby
```

At operation 470, at the client machine 23, a category manager requests publication of domain dictionaries 252 to the publication environment on the information storage and retrieval platform 12. For example, the publication request may include the above described rules. In one embodiment, the request may be received and processed, at the client machine 23, by a version manager 97 that utilizes the domain versions 197 identified in the preview publish information 75. For example, the version manager 97 may read the domain dictionary 252 from the preview classification information 78 or the production classification information 76 based on the latest domain version 197 identified in the preview publish information 75. Publication to the publication environment results in application of the domain rules 192 and the aspect rules 196 to the data item information 67 utilized by the information storage and retrieval platform 12 as live data.

Figure 31:
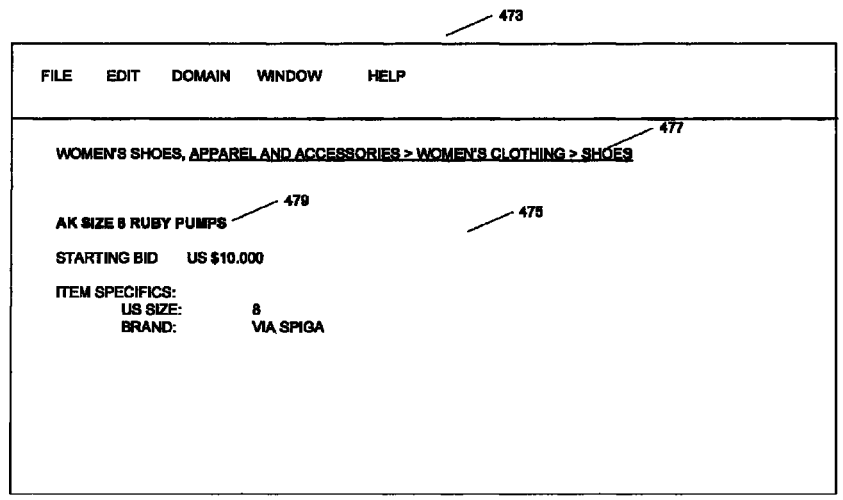
FIGS. 31-38 are diagrams illustrating user interfaces, according to an embodiment.

At operation 471, on the back end servers 103, the processing module 46 receives a complete set of domain dictionaries 252 in the form of classification information 49 and utilizes the publish modules 42 to publish the classification information 49 to the production environment on the information storage and retrieval platform 12. For example, the classification service engine 48 may apply the domain rules 292 from each of the domain dictionaries 252 to the data items 65 and apply the aspect rules 296 from each of the domain dictionaries to the data items 65. In applying the aspect rules 296, the classification service engine 48 may concatenate the aspect-value pair 304 COLOR=ruby to a data item 65 in the product type shoes domain. FIG. 31 is a diagram illustrating a user interface 473, according to an embodiment, showing a data item 65 (callout 475) with a title 320 (callout 479) that contains the word "ruby." Further, the data item 65 (callout 475) is shown to be classified in the product domain 132 for shoes (callout 477). Application of the aspect-rule 196 "IN Shoes, if title=ruby then COLOR=ruby" to the data item 65 shown on the user interface 473 may, accordingly, result in the assignment of the aspect-value pair 304 COLOR=ruby" to the data item 65.

Returning to FIG. 19, at operation 474, processing module 46 may update the query engine 53 with the aspect rules 296 "if ruby then COLOR=ruby responsive to the publication request.

Figure 32:
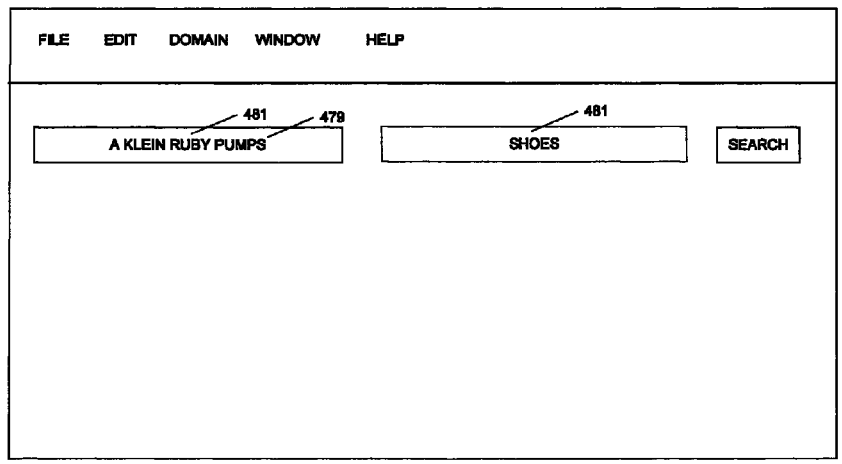

At operation 476, at the client machine 20, a user enters a query in the shoes category including the keywords "A Klein ruby pumps." For example, FIG. 32 is a diagram illustrating a user interface 477, according to an embodiment, showing a query (callout 479) in the "shoes" category (callout 481) that contains the keyword 302 "ruby" (callout 481). Returning to FIG. 19, at operation 474, the client machine 20 communicates the query and category to the front end servers 101.

At operation 478, the front end servers 101 receive the query and the category. At operation 480, the front end servers 101 communicate the same to the back end servers 103. At operation 482, the back end servers 103 store the query and the category as sample query information 73. At operation 484 the aspect extractor module 58 extracts the aspect-value pair "COLOR=ruby" from the query. For example, the aspect extractor module 58 may extract the aspect-value pair "COLOR=ruby" from the query by applying the condition clause "if ruby" to the keywords 302 in the query. Further, a transformed query may be constructed utilizing the extracted aspect-value pair "COLOR=ruby."

At operation 486, the search index engine 54 utilizes the transformed query to search for and identify a data item 65 in the domain shoes that contain the aspect-value pair "COLOR=ruby." Next, the search index engine 54 communicates the identified data item 65 to the front end server 101.

At operation 490, at the front end server 101, the communication module 40 receives the identified data item 65, generates a user interface that contains the identified data item 65, and communicates the user interface to the client machine 20. At operation 492, at the client machine 20, the user interface containing the identified data item 65 is displayed to the user.

Figure 20:
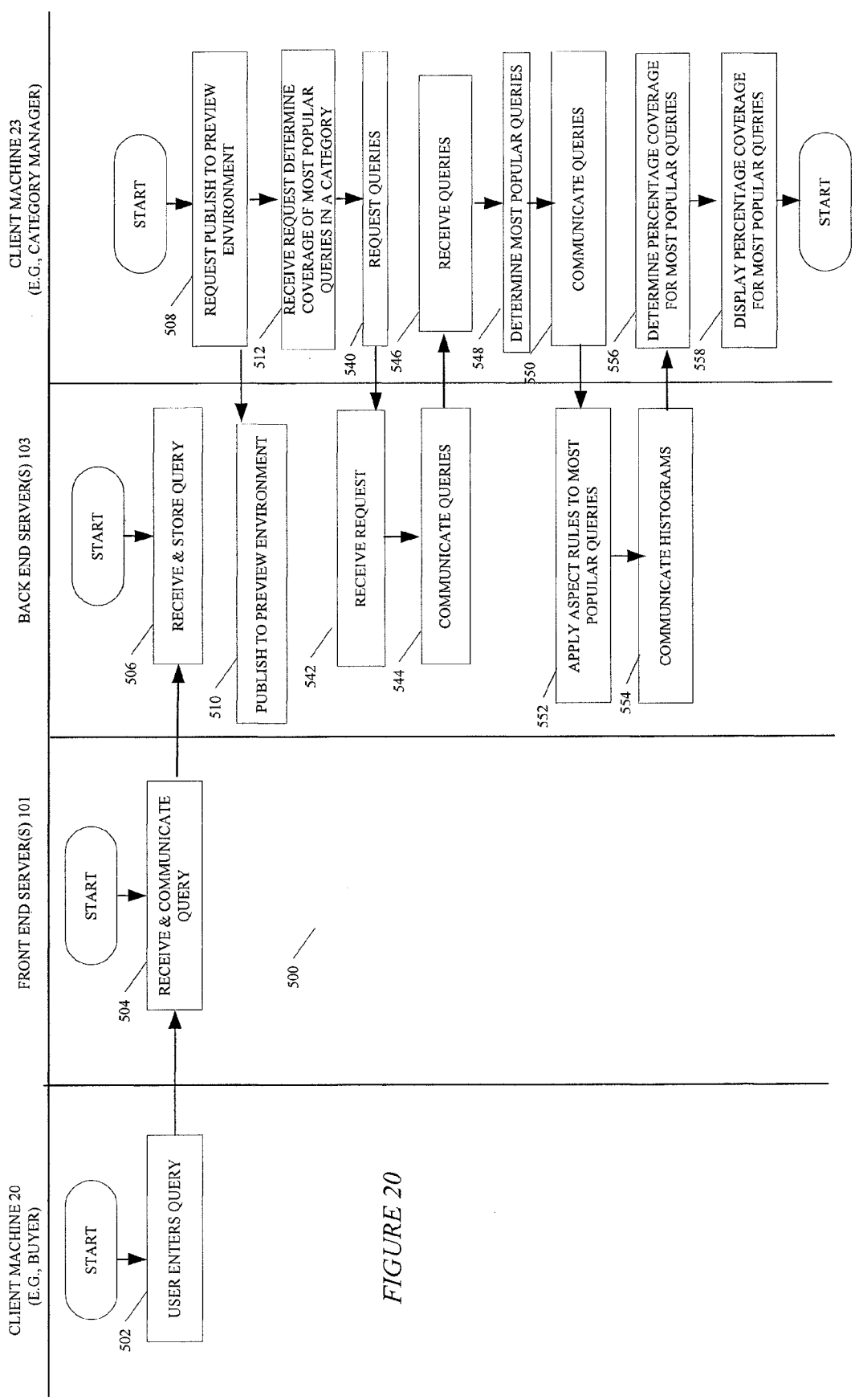
FIG. 20 is a flowchart illustrating a method, according to an embodiment, to represent percentage of coverage for a subset of most popular queries.

FIG. 20 is a flowchart illustrating a method 500, according to an embodiment, to represent percentage coverage for a subset of most popular queries. Illustrated on the far left are operations for a client machine 20 and illustrated on the far right are operations for a client machine 23. Illustrated on the center left are operations for a front end server 101 and illustrated on the center right are operations for back end servers 103. The method 500 commences at the client machine 20, at operation 502, with a user entering a query for data items 65 at the client machine 20 in the production environment. The web client 16 at the client machine 20 communicates the query to the front end server 101.

At operation 504, at the front end servers 101, an aspect extractor module 58 receives the query and processes the query. Further, the aspect extractor module 58 communicates the query to a back end server 103.

At operation 506, at the back end server 103, a processing module 46 receives the query and stores the query in the sample query information 73 on the database 36.

At operation 508, at the client machine 23, a category manager may request publication of domain dictionaries 252 to the preview environment. In one embodiment, the request may be received and processed by the version manager 97 that utilizes the domain versions 197 identified in the preview publish information 75. For example, the version manager 97 may read the domain dictionary 252 from the preview classification information 78 or the production classification information 76 based on the latest domain version 197 identified in the preview publish information 75.

At operation 510, on the back end servers 103, the processing module 46 receives a complete set of domain dictionaries 252 in the form of classification information 49 and utilizes the published modules 42 to publish the classification information 49 to the preview environment.

At operation 512, at the client machine 23, the version manager 97 receives a request to determine the percentage of coverage for a subset of most popular queries in a category.

Figure 35:
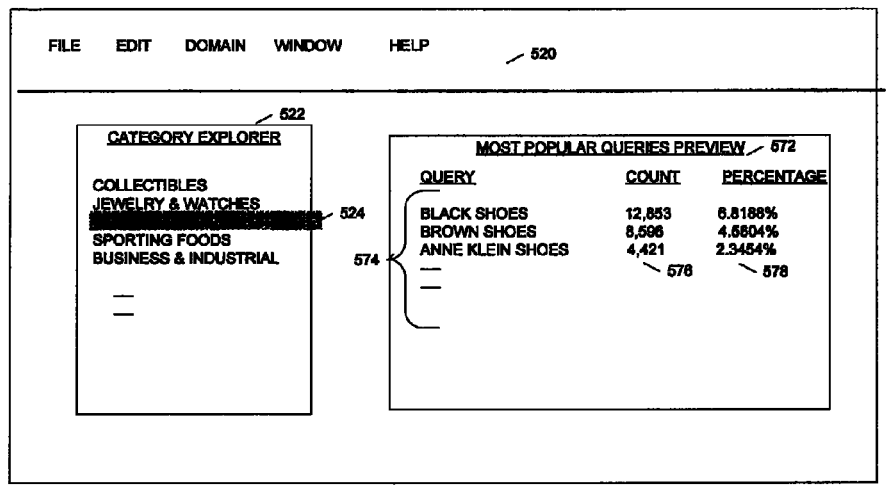

FIG. 35 is a diagram illustrating a user interface 520, according to an embodiment, to determine the percentage of coverage for a subset of most popular queries in a category. The user interface 520 is shown to include a category explorer window 522 that lists categories (e.g., utilized by a seller to list data items 65 for sale or a buyer to search for the data items 65). The category explorer 522 is shown to include a category selection 524, "women's shoes," that has been entered by the category manager to determine percentage coverage for the most popular queries that include the category "women's shoes."

Figure 33:
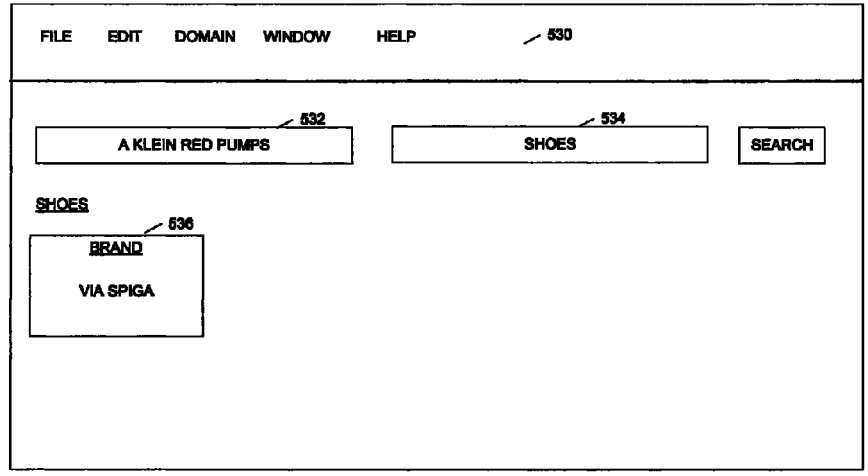

FIG. 33 is a diagram illustrating the user interface 530, according to an embodiment, to enter a query. The user interface 530 is presented to illustrate a query that includes a category. The user interface 530 is shown to include a keyword entry box 532, a category entry box 534, and an item specific entry box 536. For example, the user interface 530 illustrates a query for data items 65 that may contain the keywords "Klein Red pumps," the item specific "Via Spiga" and be listed in the category "shoes".

Returning to FIG. 20, at operation 540, at the client machine 23, the viewing manager 95 communicates a request for queries that include the category "women's shoes" to the back end servers 103.

At operation 542, at the back end servers 103, the query retrieval module 93 receives the request for queries in the "women's shoes" category. The query retrieval module 93 reads the sample query information 73 to identify query entries 400 that include the "women's shoes" category and, at operation 544, the query retrieval module 93 communicates the identified query entries 400 in the form of sample query information 73 to the client machine 23.

At operation 546, on the client machine 23 the query processing module 69 receives the sample query information 73 and, at operation 548, determines the most popular queries. For example, the query processing module 69 may identify the query entries 400 in the sample query information 73 that includes the most frequently entered keyword(s) 302 in the specified category 324. In one embodiment, the query processing module 69 may determine a predetermined number of most popular queries that may be received by the information storage and retrieval platform 12 for a predetermined period of time. For example, consider the following queries taken from a sample of ten thousand queries that may have been received by the information storage and retrieval platform 12 in the last twenty-four hours:

| Query Received | Frequency |
|---|---|
| "pink ipod" | 1000 |
| "blue ipod" | 997 |
| "black ipod" | 996 |
| "via spiga shoes" | 200 |

In one embodiment the predetermined number of most popular queries may be three, the predetermined period of time to receive the queries may be twenty-four hours and the frequency of receiving each of the above listed queries may be 1000, 997, 996 and 200, respectively. Accordingly, the three most popular queries may be "pink ipod" "pink ipod" and "black ipod,"

At operation 550, the query processing module 69 communicates the most popular query information 422 including query entries 400 identified as most popular to the back end server 103.

At operation 552, at the back end server 103, the query engine 52 applies the aspect rules 296 to the query entries 400 in the preview environment and generates histogram information 99. At operation 554, the query engine 52 communicates the histogram information 99, including the query coverage information 445, to the client machine 23.

At operation 556, at the client machine 23, the query processing module 69 determines the percentage coverage for most popular queries based on the query coverage information 445. At operation 558, the viewing manager 95 generates interface elements representing the subset of most popular queries respectively. In one embodiment, the viewing manager 95 may display interface elements as user interface elements on a user interface.

Returning to FIG. 35, the user interface 520 is shown to include a most popular queries preview panel 572. The most popular queries preview panel 570 shows the most popular queries 574 respectively associated with a count of matching aspect rules 296 (callout 576) (e.g., aspect rules 296 with condition clauses 298 that evaluated TRUE) and percentage coverage 578 (e.g., first quantity of rules/total quantity of rules).

FIG. 21 is a flow chart illustrating a method 590, according to an embodiment, to apply aspect rules 296 to most popular queries. The method 590 commences at operation 592 with the query engine 52 reading the next most popular query in the most popular query information 77. At operation 594, the query engine 52 identifies the next domain dictionary 252. At operation 596, the query engine 52 reads the next aspect rule 296 from the domain dictionary 252. At operation 598, the query engine 52 counts the aspect rule 296 by incrementing a total quantity of rules in the form of the total aspect rule counter 449 in the query coverage information 445.

At decision operation 599, the aspect extractor module 58 determines if the keyword(s) 302 in the query entry 400 matches the keyword(s) 302 in the condition clause 298 of the aspect rule 296. If the keyword(s) match, then a branch is made to operation 600. Otherwise processing continues at decision operation 602. At operation 600, the aspect extractor module 58 counts the matching aspect rule 296. For example, the aspect extractor module 58 may increment a second quantity of rules in the form of a matching aspect rule counter 447 that corresponds to the query in the query coverage information 445.

At decision operation 602, the query engine 52 determines if there are more aspect rules 296. If there are more aspect rules 296, then a branch is made to operation 596. Otherwise processing continues at decision operation 604.

At decision operation 604, the query engine 52 determines if there are more domain dictionaries 252. If there are more domain dictionaries 252, then processing continues at operation 594. Otherwise processing continues at decision operation 606.

At decision operation 606, the query engine 52 determines if there are more query entries 400 in the most popular query information 422. If there are more query entries 400, then a branch is made to operation 592. Otherwise processing ends.

FIG. 22 is a flow chart illustrating a method 620, according to an embodiment, to determine percentage coverage for most popular queries. The method 620 commences at operation 622 with the query processing module 69, reading the next query identifier 428 from the query coverage information 445.

At operation 624, the query processing module 69 divides a quantity rules (e.g., second quantity of rules) in the form of a matching aspect rule counter 447 corresponding to the query identifier 428 by a total quantity of rules in the form of the total aspect rule counter 449 to determine percentage coverage for the query entry 400. At decision operation 626, the query processing module 69 determines if there are more query entries 400. If there are more query entries 400, then a branch is made to operation 622. Otherwise processing ends.

Figure 23:
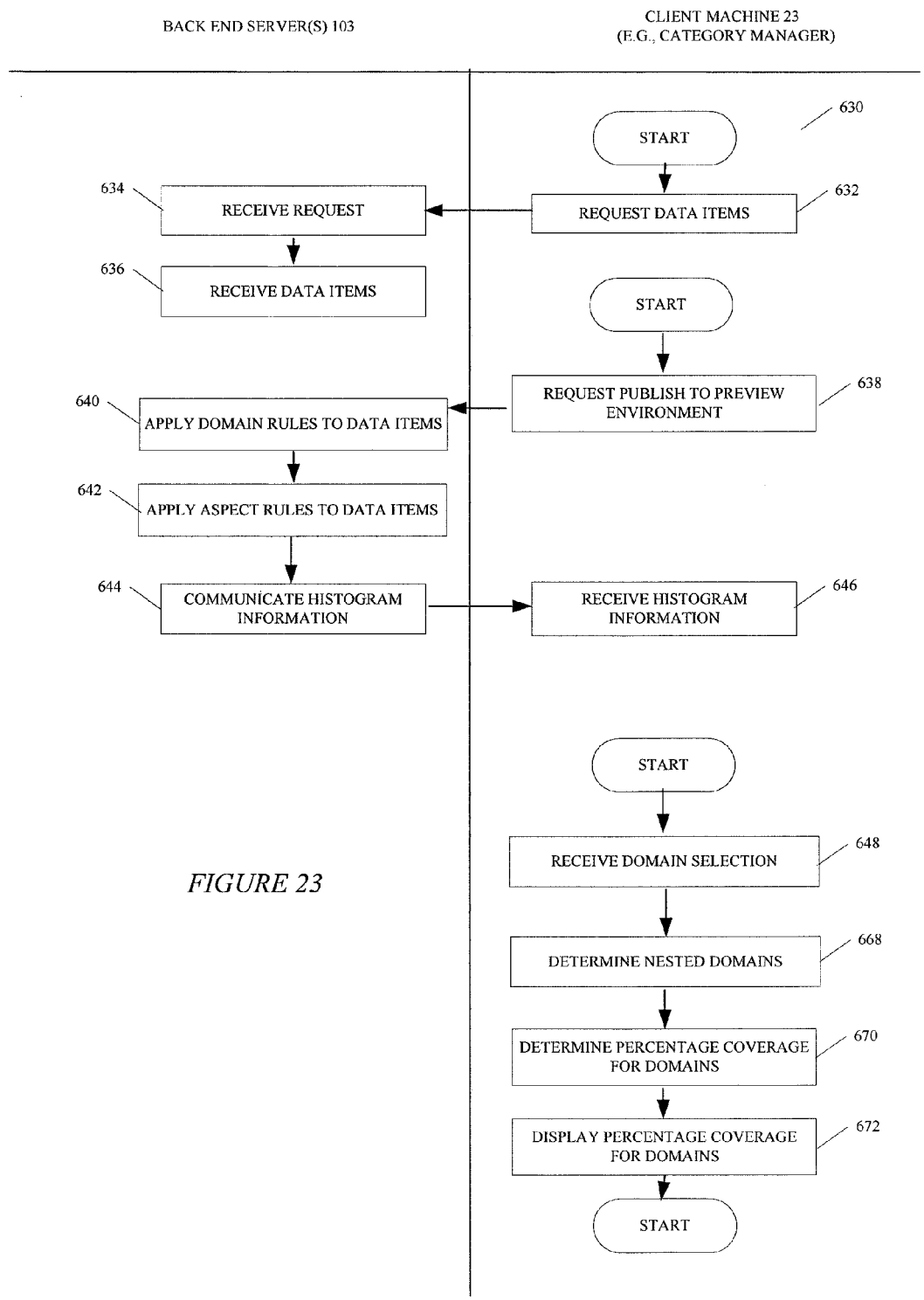
FIG. 23 is a flowchart illustrating a method, according to an embodiment, to represent percentage coverage associated with a domain.

FIG. 23 is a flow chart illustrating a method 630, according to an embodiment, to represent percentage coverage associated with a domain 305. Illustrated on the left are operations performed at back end servers 103 and illustrated on the right are operations performed on a client machine 23. The method 630 commences at operation 632, at the client machine 23, with a category manager requesting data items 65 for the preview environment. For example, in one embodiment, a data item processing module 81 may receive the request from the category manager. The request may identify a current sample 412, a seasonal sample 414, an historical sample 416 or some other type of sample of data items 65 as previously described. Next, the data item processing module 81 may communicate the request to the back end servers 103.

At operation 634, at the back end servers 103, the data item retrieval module 85 receives the request for the data items 65 and processes the request. For example, at operation 636, the data item retrieval module 85 may request and receive a current sample 412 of data items 65 (e.g., live data items 65 sampled from the data item information 67). In one embodiment ten percent of the data items 65 may be sampled from the data item information 67. In response to receiving the current sample 412, the data item retrieval module 85 may store the current sample 412 as sample data item information 83 that may be utilized as sample data for the next publication of rules to the preview environment. In another embodiment, the data item retrieval module 85 may utilize an existing sample that has previously been received from the data item information 67. For example, the data item retrieval module 85 may utilize a seasonal sample 414 or an historical sample 416 against which the rules may be published in the preview environment, the seasonal sample 414 or historical sample previously requested and received from the data item information 67.

At operation 638, at the client machine 23, a category manager may request publication of domain dictionaries 252 to the preview environment. For example, the version manager 97 may respond to the request by utilizing the domain versions 197 identified in the preview publish information 75 to identify the appropriate domain dictionaries 252 in the production classification information 76 or the preview classification information 78.

At operation 640, on the back end servers 103, the processing module 46 receives a complete set of domain dictionaries 252 and utilizes the publish modules 42 to publish the domain dictionaries 252 to the preview environment. For example, the classification service engine 48 may apply the domain rules 292 (operation 640) to the current sample 412 of the data items 65 and the aspect rules 296 (operation 642) to the current sample 412 of the data items 65. Further, the classification service engine 48 may generate and store histogram information 99 (operations 640, 642).

At operation 644, the classification service engine 48 communicates the histogram information 99 to the client machine 23. For example, the histogram information 99 may include aspect coverage information 444 and domain coverage information 442.

At operation 646, at the client machine 23, the authoring modules 25 may receive and store the histogram information 99. At operation 648, the domain coverage module 87 receives a domain selection from a category manager. For example, the category manager may enter the domain selection to determine a percentage coverage of data items 65 for the selected domain 305.

Figure 36:
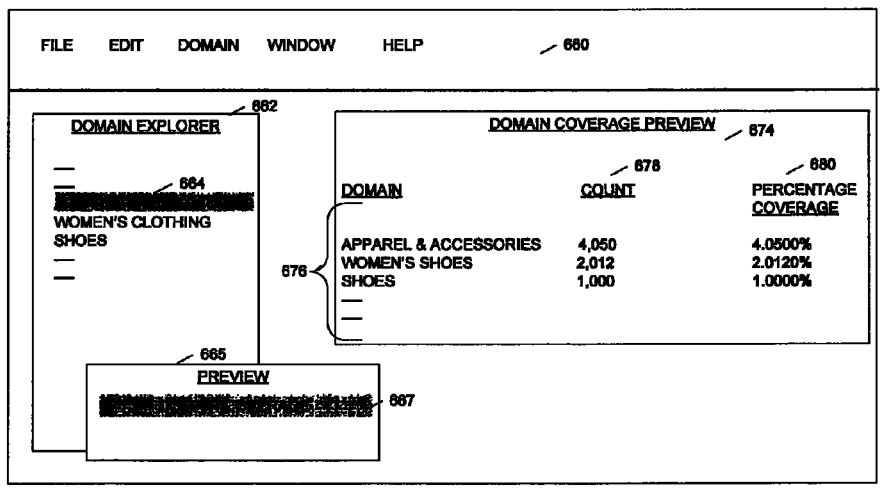

FIG. 36 is a diagram illustrating a user interface 660, according to an embodiment. The user interface 660 is shown to include a domain explorer panel 662 that lists domains 305 and a preview panel 665. The domain explorer panel 662 illustrates a selected domain 664, "Apparel and Accessories" and the preview panel 665 illustrates a request 667 to determine percentage coverage for the "Apparel and Accessories" department domain 305.

Returning to FIG. 23, at operation 668, the domain coverage module 87 determines the domains 305 that may be nested under the selected domain 305. For example, the "Apparel and Accessories" department domain 128 may include one or more aisle domains 130 that may respectively include one or more product domains 132. At operation 670, the domain coverage module 87 utilizes the histogram information 99 to determine the percentage coverage for the domain 305 selected and the domains 305 nested under the selected domain 305. For example, the domain coverage module 87 may divide a quantity of data items (e.g., first quantity of data items) in the form of a data item counter 446 in the domain coverage information 442 corresponding to the selected domain 306 by a total quantity of data items in the form of the total data item counter 443 in the domain coverage information 442 to determine the percentage coverage for the selected domain 305. The same determination may also be made for each of the nested domains 305.

At operation 672, the viewing manager 95 displays percentage coverage for the identified domains. For example, the viewing manager 95 may generate interface elements representing the percentage coverage for the domain 305 selected and the domains 305 nested under the selected domain 305. In one embodiment, the viewing manager 95 may display interface elements as user interface elements on a user interface.

Returning to FIG. 36, the user interface 660 is shown to include a domain coverage preview panel 674. The domain coverage preview panel 674 is shown to include domains 305 (callout 676) including the selected domain, "Apparel and Accessories", and nested domains 305 under the "Apparel and Accessories" domain 305 including "Women's Shoes," and "Shoes." Each of the domains 305 are associated with a count of data items 678 and a percentage coverage 680. The count of data items 675 may indicate a matching quantity of data items (e.g., category 324 in the data item 65 that matched a category 324 in the condition clause 298 of a domain rule 292). The percentage coverage may be the matching quantity of data items divided by the total quantity of data items 65 to which the domain rules 292 were applied.

Figure 24:
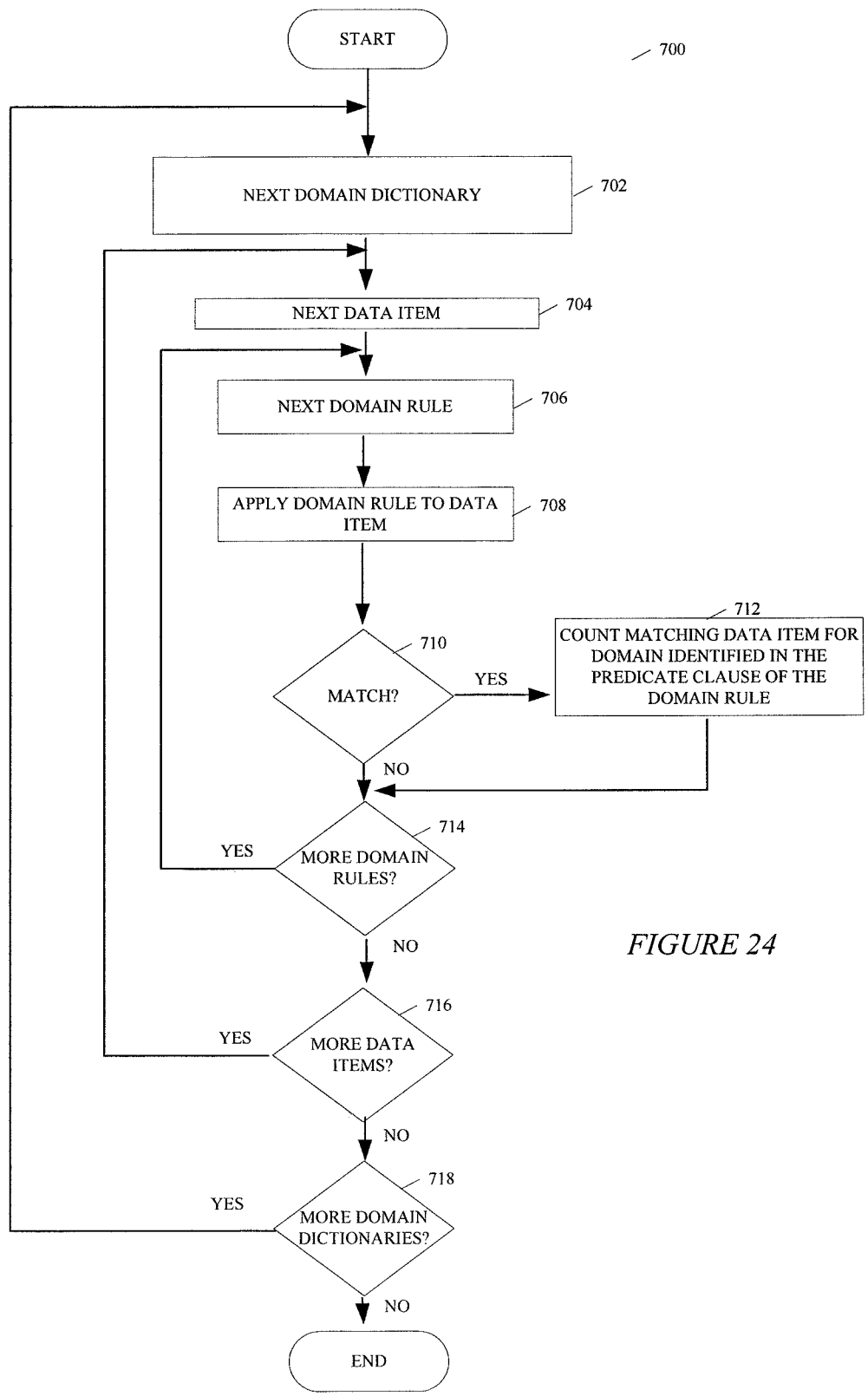
FIG. 24 is a flowchart illustrating a method, according to an embodiment, to apply domain rules to data items.

FIG. 24 is a flowchart illustrating a method 700, according to an embodiment, to apply domain rules 292 to data items 65. The method 700 commences at operation 702 with the classification service engine 48 identifying the next domain dictionary 252 in the classification information 49.

At operation 704, the classification service engine 48 reads the next data item 65 from the sample data item information 83. At operation 706, the classification service engine 48 reads the next domain rule 292 from the current domain dictionary 252. At operation 708, the classification service engine 48 applies the domain rule 292 to the data item 65.

At decision operation 710, the classification service engine 48 determines if the condition clause 298 in the domain rule 292 evaluates TRUE based on the contents of the data item 65. If the condition clause 298 evaluates TRUE, then a branch is made to operation 712. Otherwise, processing continues at decision operation 714.

At operation 712, the classification service engine 48 increments the appropriate data item counter 446 in the domain coverage information 442. For example, the classification service engine 48 increments the data item counter 446 in the domain coverage information 442 that corresponds to the domain 305 in the predicate clause 300 of the matching domain rule 292.

At decision operation 714, the classification service engine 48 determines if there are more domain rules 292 in the domain dictionary 252. If there are more domain rules 292, then a branch is made to operation 706. Otherwise, processing continues at decision operation 716.

At decision operation 716, the classification service engine 48 determines if there are more data items 65 in the sample data item information 83. If there are more data items 65, then a branch is made to operation 704. Otherwise, a branch is made to decision operation 718.

At decision operation 718, the classification service engine 48 determines if there are more domain dictionaries 252 to process. If there are more domain dictionaries 252 to process, then a branch is made to operation 702. Otherwise, processing ends.

Figure 25:
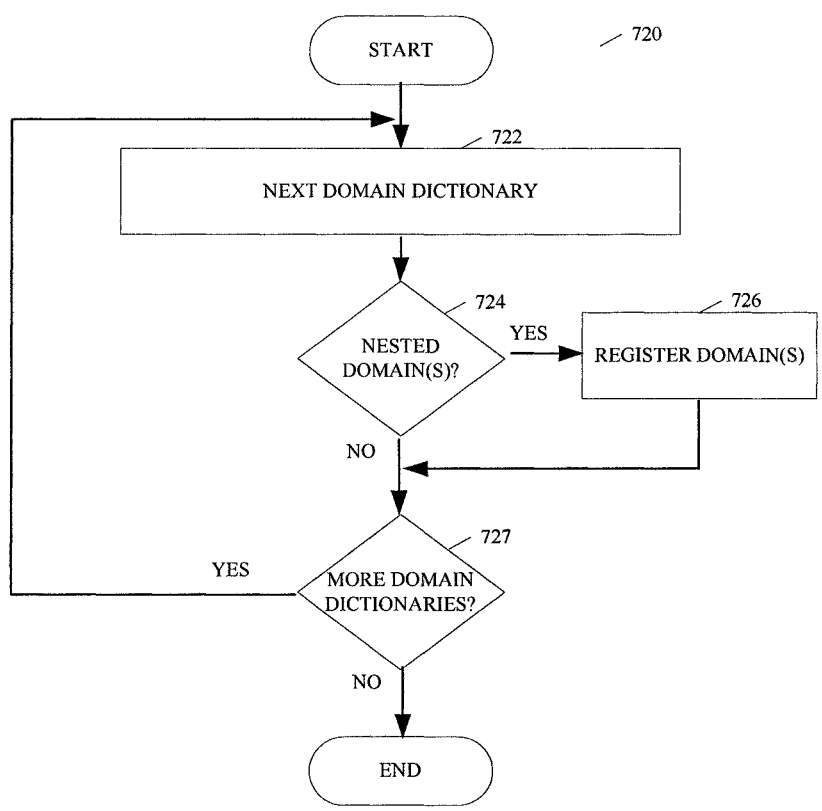
FIG. 25 is a flowchart illustrating a method, according to an embodiment, to determine domains.

FIG. 25 is a flowchart illustrating a method 720, according to an embodiment, to determine nested domains. The method 720 commences at operation 722 with the classification service engine 48 identifying the next domain dictionary 252.

At decision operation 724, the classification service engine 48 determines if the current domain dictionary 252 includes domains 305 that may be nested under the selected domain 305. For example, the selected domain 305 may be a department domain 128 that may include one or more aisle domains 130 that respectively may include one or more product domains 132. If the classification service engine 48 determines there are nested domains, then a branch is made to 726. Otherwise, a branch is made to decision operation 727.

At operation 726, the classification service engine 48 registers the nested domain(s). At decision operation 727, the classification service engine 48 determines if there are more domain dictionaries 252 to process. If there are more domain dictionaries 252 to process then a branch is made to operation 722. Otherwise processing ends.

Figure 26:
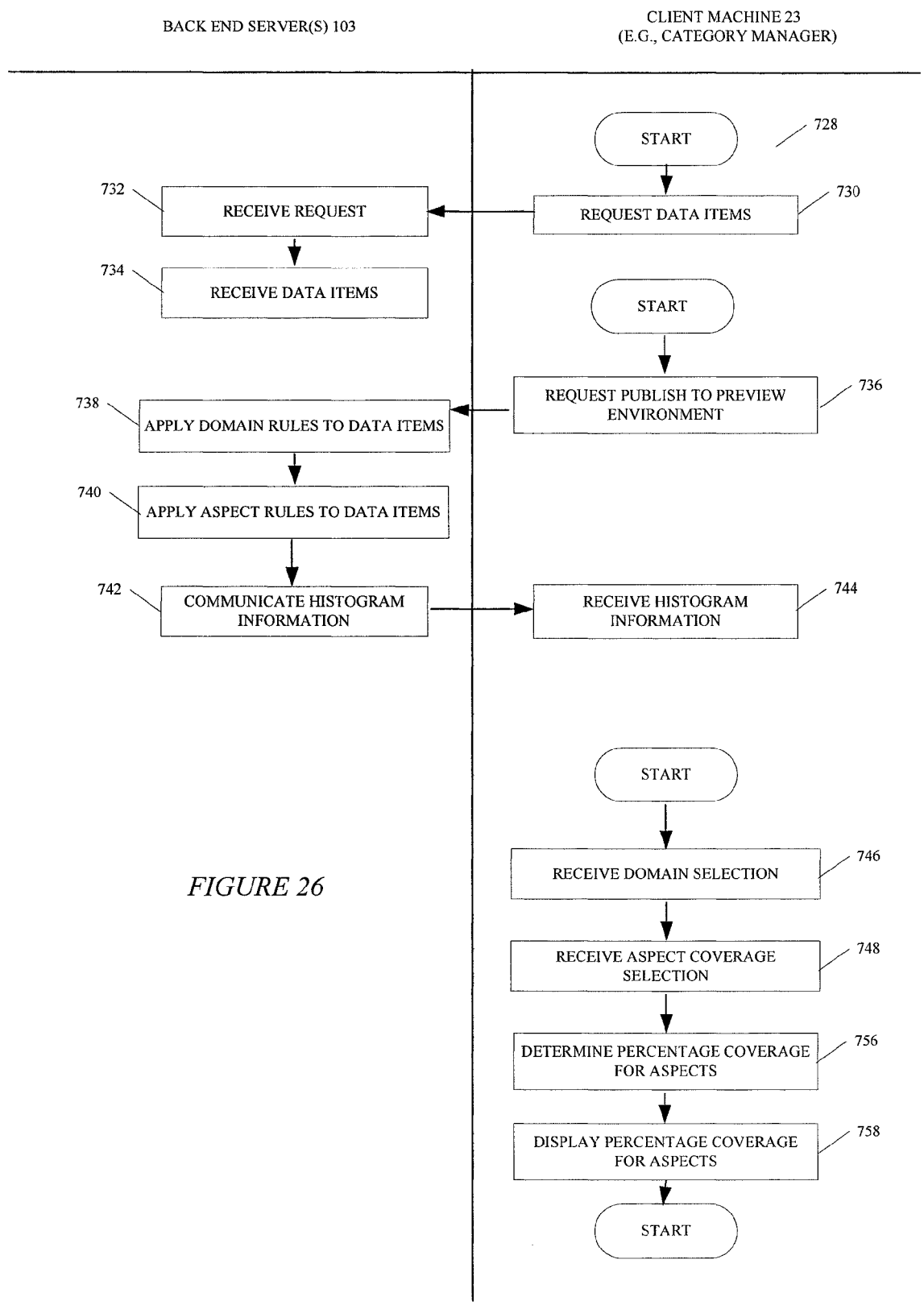
FIG. 26 is a flowchart illustrating a method, according to an embodiment, to represent percentage coverage for aspects.

FIG. 26 is a flow chart illustrating a method 728, according to an embodiment, to represent percentage coverage associated with an aspect. Illustrated on the left are operations performed at back end servers 103 and illustrated on the right are operations performed on a client machine 23. The method 728, commences at operation 730, at the client machine 23, with a category manager requesting data items 65 for the preview environment. For example, in one embodiment, a data item processing module 81 may receive the request from the category manager. The request may identify a current sample 412, a seasonal sample 414, an historical sample 416 or some other type of sample as previously described. Next, the data item processing module 81 may communicate the request to the back end servers 103.

At operation 732, at the back end servers 103, the data item retrieval module 85 receives the request for data items 65 and processes the request. For example, at operation 734, the data item retrieval module 85 may request and receive a current sample 412 of data items 65 (e.g., live data items 65) from the data item information 67. In response to receiving the current sample 412, the data item retrieval module 85 may store the current sample 412 as sample data item information 83 that may be utilized as sample data for the next publication of rules to the preview environment. In another embodiment, the data item retrieval module 85 may utilize an existing seasonal sample 414 or historical sample 416 that has been previously received from the data item information 67. The seasonal sample 414 or historical sample 416 may be utilized as the data items 65 for the next publication of rules to the preview environment, the seasonal sample 414 or historical sample previously requested and received from the data item information 67.

At operation 736, at the client machine 23, a category manager may request publication of domain dictionaries 252 to the preview environment, the request being received and processed by the version manager 97. The version manager 97 may respond to the request by utilizing the domain versions 197 identified in the preview publish information 75 to identify the appropriate domain dictionaries 252 in the production classification information 76 or the preview classification information 78 to be used for publication.

At operation 738, on the back end servers 103, the processing module 46 receives a complete set of domain dictionaries 252 in the form of classification information 49 and utilizes the publish modules 42 to publish the classification information 49 to the preview environment. For example, the classification service engine 48 may apply the domain rules 292 (operation 738) to the current sample 412 of the data items 65 and the aspect rules 296 (operation 740) to the current sample 412 of the data items 65. Further, during publication, the classification service engine 48 may generate and store histogram information 99 (operations 738, 740).

At operation 742, the classification service engine 48 communicates the histogram information 99 to the client machine 23. For example, the histogram information 99 may include aspect coverage information 444 and domain coverage information 442.

At operation 744, at the client machine 23, the authoring modules 25 receive and stores the histogram information 99.

At operation 746, the viewing manager 95 may receive a domain 305 selection and at operation 748 the viewing manager 95 may receive an aspect coverage selection. The domain 305 selection and the aspect coverage selection may be entered by a category manager to determine percentage coverage for aspects in the selected domain 305.

Figure 37:
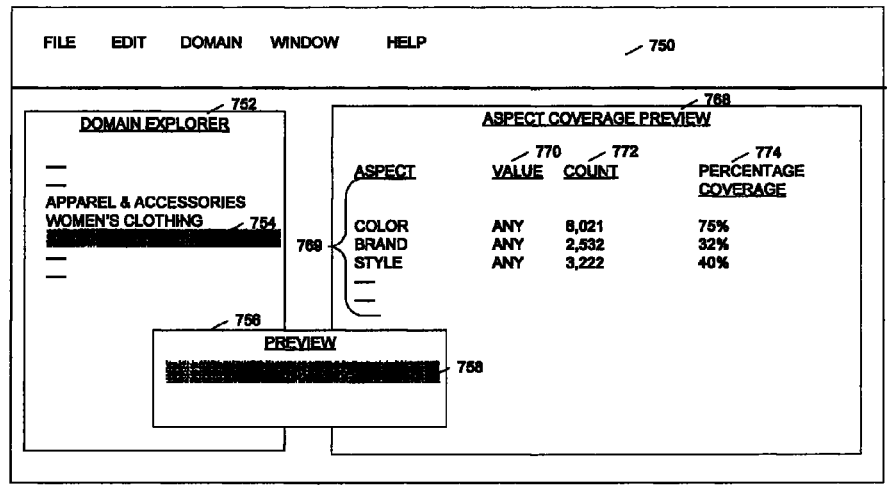

FIG. 37 is a diagram illustrating a user interface 750, according to an embodiment, to display percentage of coverage for aspects. The user interface 750 is shown to include a domain explorer panel 752 that lists multiple domains 305 (e.g., "Apparel & Accessories", "Women's Shoes", etc.). The domain explorer 752 panel illustrates a selected domain 754 (e.g., "Shoes"). The user interface 750 further shows a preview panel 756 that includes an aspect coverage preview selection 758.

Returning to FIG. 26, at operation 756, the aspect coverage module 89 determines percentage coverage for the aspects in the selected domain 305.

At operation 758, the viewing manager 95 generates interface elements. For example, the viewing manager 95 may generate interface elements representing the percentage coverage for the aspects selected in the domain selected. In one embodiment, the viewing manager 95 may display interface elements as user interface elements on a user interface.

Returning to the FIG. 37, the user interface 750 is shown to include an aspect coverage preview panel 768. The aspect coverage preview panel 768 includes multiple aspects 306 (callout 769) (e.g., COLOR, BRAND, STYLE). Each aspect 306 may be associated with a value indicator 770, count 772 and a percentage coverage 774. The value indicator 770 indicates that all values 308 associated with the corresponding aspect 306 may be utilized to generate the count 772 and the percentage coverage 896. For example, the count 772 associated with the aspect 306 COLOR may be incremented based on an assignment to a data item 65 of an aspect-value pair 304 that includes the aspect COLOR irrespective of the associated color value 308 (e.g., red, blue, yellow). The count 772 refers to a quantity of data items 65 (e.g., matching quantity of data items) that caused a condition clause 298 of an aspect rule 296 to evaluate TRUE. The percentage coverage 774 may be generated by dividing the matching quantity of data items 65 by the total quantity of data items 65 to which the aspect rules were applied.

Figure 27:
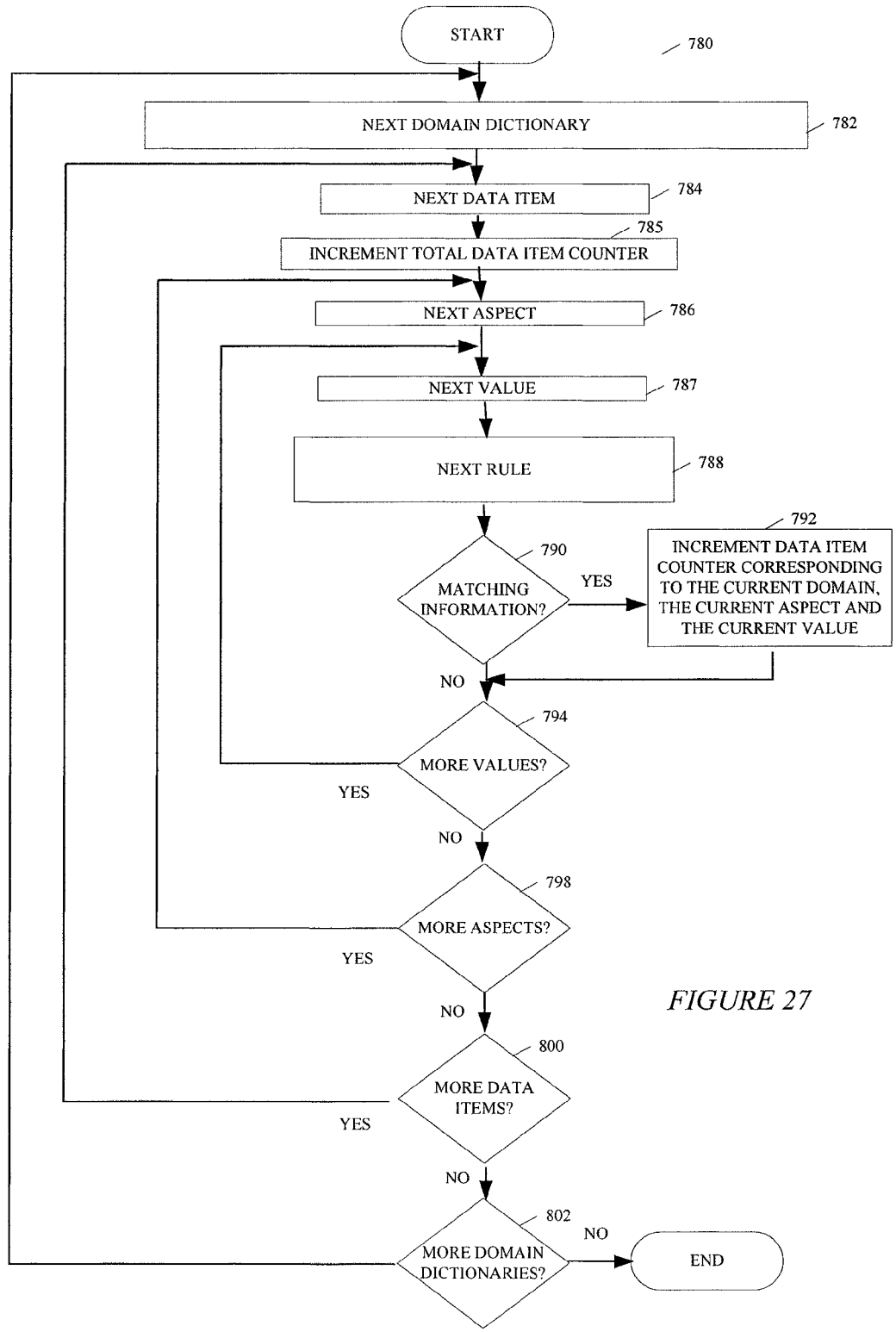
FIG. 27 is a flowchart illustrating a method, according to an embodiment, to apply aspect rules to data items.

FIG. 27 is a flow chart illustrating a method 780, according to an embodiment to apply aspect rules 296 to data items 65. The method 780 commences at operation 782 with the classification service engine 48 identifying the next domain dictionary 252 in the classification information 49.

At operation 784, the classification service engine 48 reads the next data item 65 from the sample data item information 83. At operation 785, the classification service engine 48 increments the total data item counter 443 (e.g., total quantity of data items) in the aspect coverage information 444. At operation 786, the classification service engine 48 identifies the next aspect 306 in the domain dictionary 252. At operation 787, the classification service engine 48 advances to the next value 308 associated with the current aspect 306. At operation 788, the classification service engine 48 reads the next aspect rule 296 associated with the current aspect 306 and the current value. At decision operation 790, the classification service engine 48 determines if the current aspect rule 296 matches the data item 65 (e.g., the condition clause 298 evaluates TRUE). If the current aspect rule 296 matches the data item then a branch is made to operation 792. Otherwise processing continues at decision operation 794.

At operation 792, the classification service engine 48 increments the data item counter 446 based on the current domain 305, the current aspect 306, and the current value 308. For example, if the predicate clause 300 of the current aspect rule 296 includes the aspect 306 COLOR and the value 308 "blue" and the domain 305 is "shoes" then the data item counter 446 corresponding to the domain 305 "shoes", the aspect "COLOR", and the value "blue" is incremented in the aspect coverage information 444.

At decision operation 794, the classification service engine 48 determines if there are more values 308 associated with the current aspect 306. If there are more values 308, then a branch is made to operation 787. Otherwise processing continues at decision operation 798.

At decision operation 798, the classification service engine 48 determines if there are more aspects 306 associated with the current domain 305. If there are more aspects 306, then a branch is made to operation 786. Otherwise processing continues at decision operation 800.

At decision operation 800, the classification service engine 48 determines if there are more data items 65. If there are more data items 65, then a branch is made to operation 784. Otherwise processing continues at decision operation 802.

At decision operation 802, the classification service engine 48 determines if there are more domain dictionaries 252. If there are more domain dictionaries 252, then a branch is made to operation 782. Otherwise processing ends.

Figure 28:
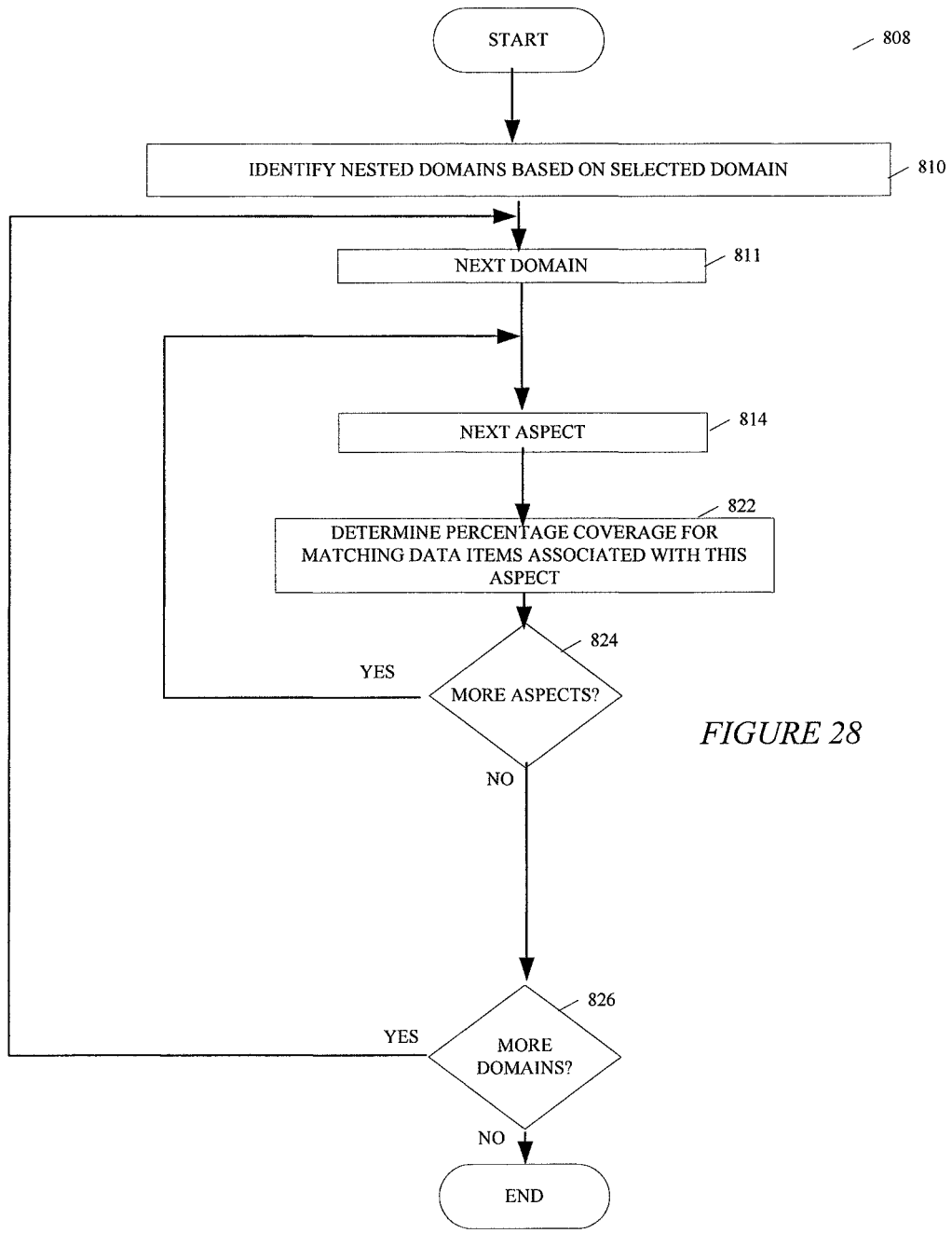
FIG. 28 is a flowchart illustrating a method, according to an embodiment, to determine percentage coverage for aspects.

FIG. 28 is a flow chart illustrating a method 808, according to an embodiment, to determine percentage coverage for aspects. The method 808 commences at operation 810 with the aspect coverage module 89 identifying one or more domains 305 based on the selected domain 305 and any domain(s) 305 nested under the selected domain 305. For example, a selected department domain 128 may further include aisle domains 130 that may further include product domains 132. Each product domain 132 may be associated with a domain dictionary 252.

At operation 811, the aspect coverage module 89 identifies the next domain 305 from the previously identified domains 305. At operation 814, the aspect coverage module 89 identifies the next aspect 306 in the identified domain 305.

At operation 822, the aspect coverage module 89 determines a percentage coverage for the current aspect 306 in the current domain 305. For example, the aspect coverage module 89 may identify a set of data item counters 446 in the aspect coverage information 444 that respectively correspond to the values 308 associated with the current aspect 306 in the current domain 305. Next, the aspect coverage module 89 adds the set of data item counters together to generate a quantity of data items 65 (e.g., first quantity of data items) associated with the current aspect 306. Next, the aspect coverage module 89 identifies a total quantity of data items in the form the total data item counter 443 in the aspect coverage information 444. Next, the aspect coverage module 89 divides the quantity of data items by the total quantity of data items to determine the percentage coverage for the aspect 306 in the current domain 305.

At decision operation 824, the aspect coverage module 89 determines if there are more aspects 306 associated with the current domain dictionary 252. If there are more aspects 306, then a branch is made to operation 814. Otherwise processing continues at decision operation 826.

At decision operation 826, the aspect coverage module 89 determines if there are more domains 305 from the identified domains 305 to process. If there are more domains 305, then a branch is made to operation 811. Otherwise processing ends.

Figure 29:
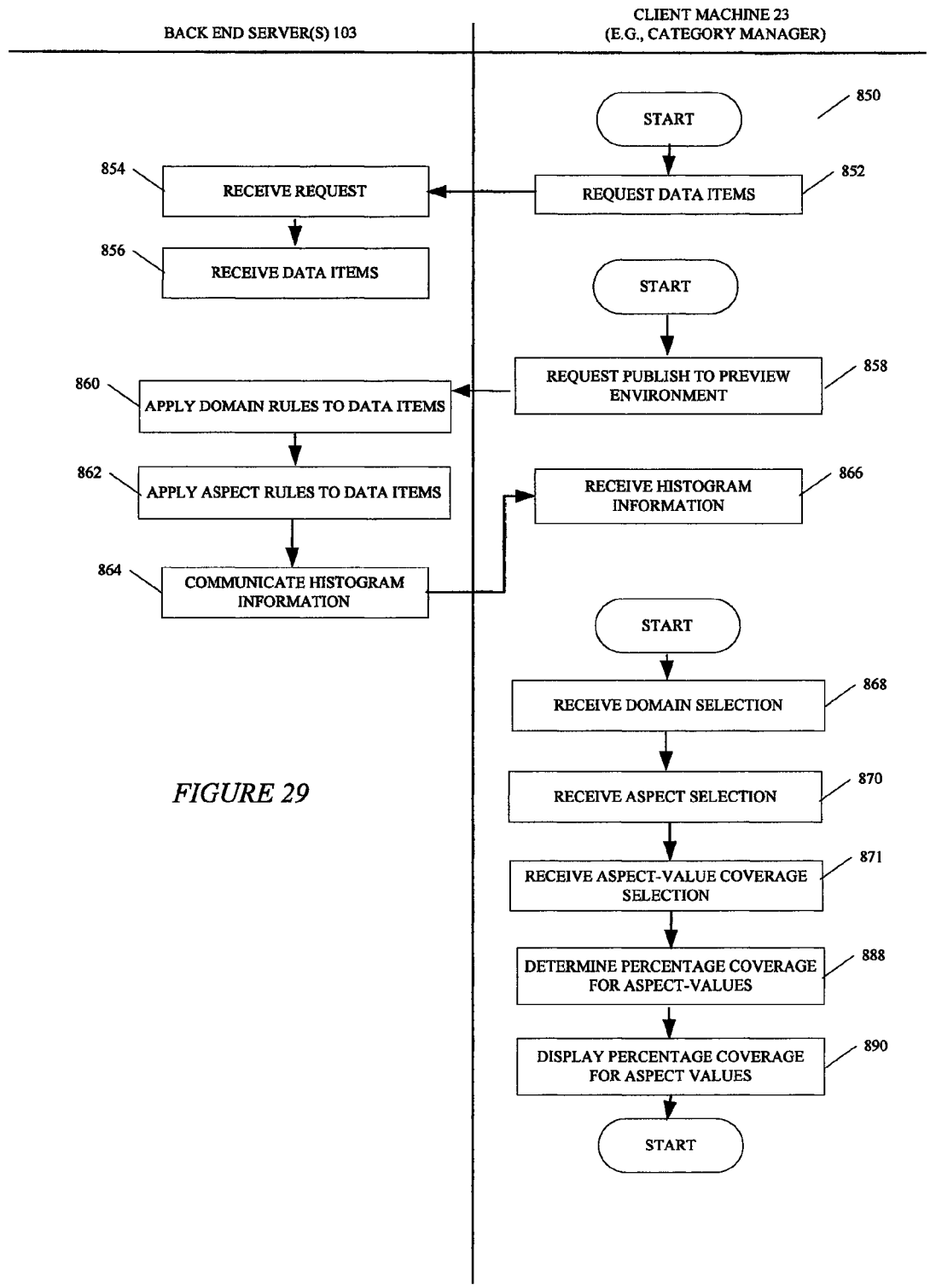
FIG. 29 is a flowchart illustrating a method, according to an embodiment, to represent percentage coverage for aspect-value pairs.

FIG. 29 is a flow chart illustrating a method 850, according to an embodiment, to represent percentage coverage associated with an aspect-value pair. Illustrated on the left are operations performed at back end servers 103 and illustrated on the right are operations performed on a client machine 23. The method 850, commences at operation 852, at the client machine 23, with a category manager requesting data items 65 for the preview environment. For example, in one embodiment, a data item processing module 81 may receive the request from the category manager. The request may identify a current sample 412, a seasonal sample 414, an historical sample 416 or some other type of sample as previously described. Next, the data item processing module 81 may communicate the request to the back end servers 103.

At operation 854, at the back end servers 103, the data item retrieval module 85 receives the request for data items 65 and processes the request. For example, at operation 856, the data item retrieval module 85 may request and receive a current sample 412 of data items 65 (e.g., live data items 65) from the data item information 67. In response to receiving the current sample 412, the data item retrieval module 85 may store the current sample 412 of data items 65 as sample data item information 83. The sample data item information 83 may be utilized as sample data for the next publication of rules to the preview environment. In another embodiment, the data item retrieval module 85 may utilize an existing seasonal sample 414 or historical sample 416 for the next publication of rules to the preview environment, the seasonal sample 414 or historical sample previously requested and received from the data item information 67.

At operation 858, at the client machine 23, a category manager may request publication of domain dictionaries 252 to the preview environment, the request being received and processed by the version manager 97. For example, the version manager 97 may respond to the request by utilizing the domain versions 197 identified in the preview publish information 75 to identify the appropriate domain dictionaries 252 in the production classification information 76 or the preview classification information 78 for publication.

At operation 860, on the back end servers 103, the processing module 46 receives a complete set of domain dictionaries 252 in the form of classification information 49 and utilizes the publish modules 42 to publish the domain dictionaries 252 in the classification information 49 to the preview environment. For example, the classification service engine 48 may apply the domain rules 292 (operation 860) to the current sample 412 of the data items 65 and aspect rules 296 (operation 862) to the current sample 412 of the data items 65. Further, during publication, the classification service engine 48 may generate and store histogram information 99 (operations 860, 862).

At operation 864, the classification service engine 48 communicates the histogram information 99 to the client machine 23. For example, the histogram information 99 may include aspect coverage information 444 and domain coverage information 442.

At operation 866, at the client machine 23, the authoring modules 25 may receive and store the histogram information 99.

At operation 868, the viewing manager 95 may receive a domain 305 selection. Further, at operation 870, the viewing manager 95 may receive an aspect selection and, at operation 871, the viewing manager 95 may receive an aspect-value pair coverage selection.

Figure 38:
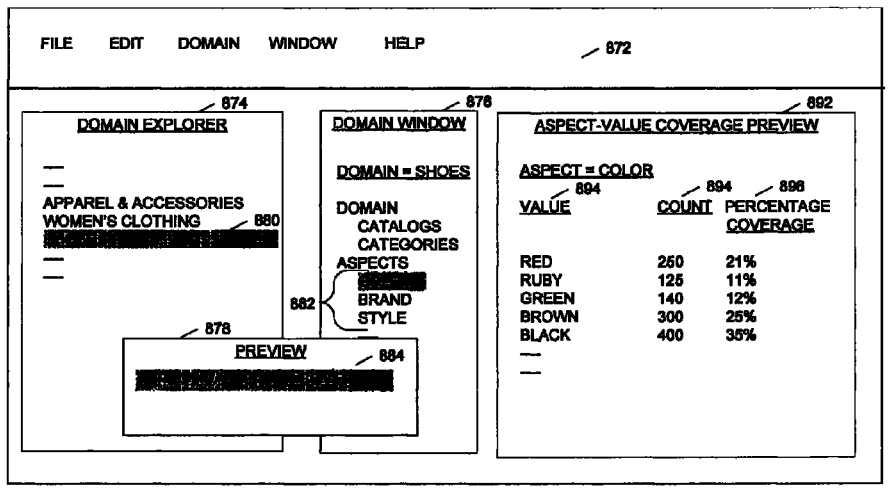

FIG. 38 is a diagram illustrating a user interface 872, according to an embodiment, to display percentage of coverage for aspect-value pairs 304. The user interface 872 is shown to include a domain explorer panel 874, a domain window 876, and a preview panel 884. The domain explorer panel 874 illustrates domains 305 (e.g., "Apparel & Accessories", "Women's Shoes", etc.) including a selected domain 305 (callout 880) (e.g., "shoes"). The domain window 876 illustrates domain information (e.g., "Catalogs", "Categories") and aspects 306 (callout 882) (e.g., COLOR, BRAND, STYLE) associated with the domain 305 "shoes." The domain window 876 further illustrates a selected aspect 306 (e.g., "COLOR"). The preview panel 878 illustrates an "aspect-value pair coverage" preview selection 884.

Returning to FIG. 29, at operation 888, the aspect coverage module 89 determines percentage coverage for aspect-value pairs 304 associated with the selected aspect 306 within the selected domain 305. For example, the aspect coverage module 89 may determine percentage coverage for the aspect-value pairs 304 "COLOR=red," "COLOR=ruby," "COLOR=green," "COLOR=brown," "COLOR=black," in the selected domain 305 "shoes."

At operation 890, the viewing manager 95 generates interface elements. For example, the viewing manager 95 may generate interface elements representing the percentage coverage for the aspect-value pairs based on the aspect 306 selected and the domain 305 selected. In one embodiment, the viewing manager 95 may display interface elements as user interface elements on a user interface.

Returning to the FIG. 38, the user interface 872 is shown to include an aspect-value coverage preview panel 892. The aspect-value coverage preview panel 892 includes multiple values 308 (callout 894) (e.g., "red", "ruby", "green", "brown", "black") associated with the aspect 306 "COLOR." Each value 308 is associated with a count 894 and percentage coverage 896. The count 894 refers to a matching quantity of data items 65 that caused a condition clause 298 of an aspect rule 296 to evaluate TRUE resulting in an assignment of a COLOR aspect-value pair 304 to the data item 65 (e.g., "COLOR=red," "COLOR=ruby"). The percentage coverage 896 may be generated by dividing the matching quantity of data items 65 by a total quantity of data items 65 to which the aspect rules were applied.

Figure 30:
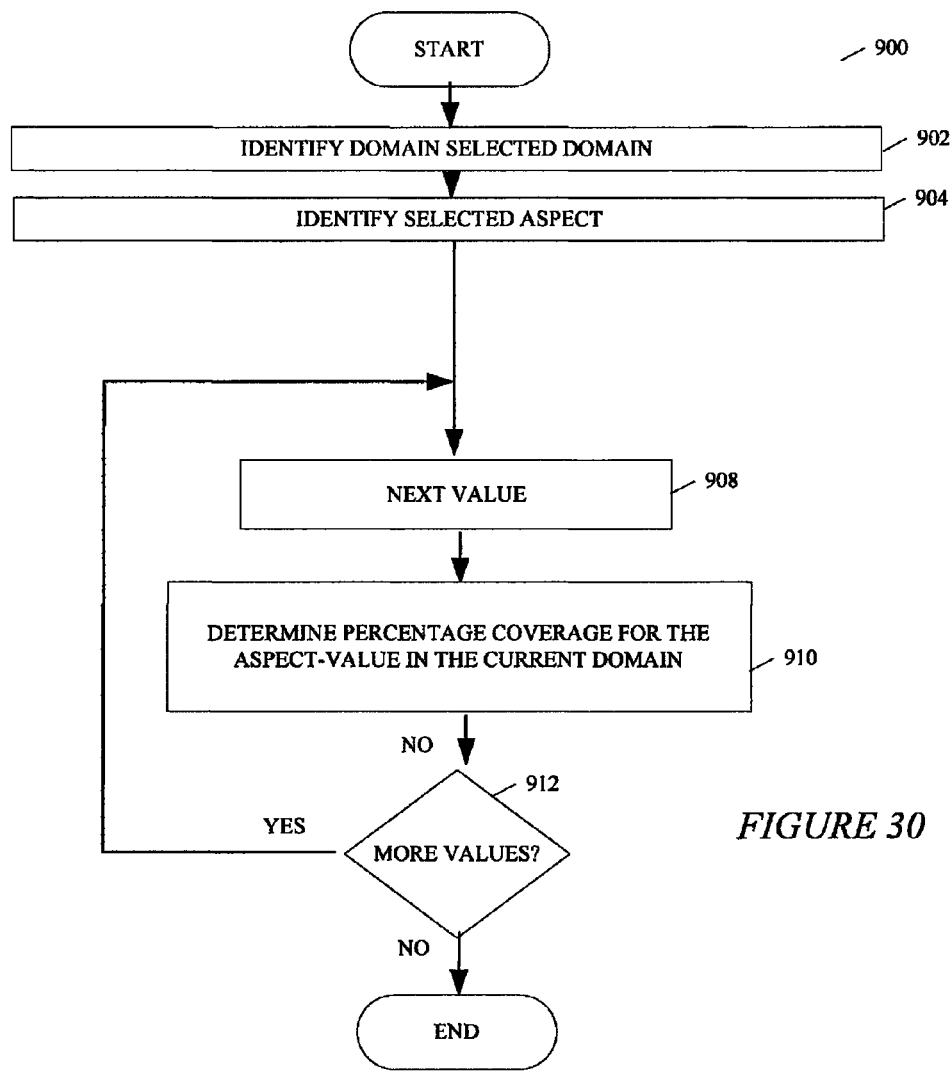
FIG. 30 is a flowchart illustrating a method, according to an embodiment to determine percentage coverage for aspect-value pairs.

FIG. 30 is a flow chart illustrating a method 900, according to an embodiment, to determine aspect-value coverage. The method 900 commences at operation 902 with the aspect-value coverage module 91 identifying the selected domain 305. At operation 904 the aspect-value coverage module 91 identifies the selected aspect 306. At operation 908, the aspect-value coverage module 91 identifies the next value 308 associated with the selected aspect 306.

At operation 910, the aspect-value coverage module 91 determines a percentage coverage for the aspect-value pair 304 in the selected domain 305. For example, the aspect-value coverage module 91 identifies a quantity of data items (e.g., first quantity of data items) in the form of the data item counter 446 in the aspect coverage information 444, the data item counter 446 corresponding to the selected domain 305, the selected aspect and the current value (e.g., aspect-value pair 304). Next, the aspect-value coverage module 91 identifies a total quantity of data items in the form the total data item counter 443 in the aspect coverage information 444. Next, aspect-value coverage module 91 divides the quantity of data items by the total quantity of data items to determine the percentage coverage for the aspect-value pair 304.

At decision operation 912, the aspect-value coverage module 91 determines if there are more values 308 associated with the current aspect 306. If there are more values 308, then a branch is made to operation 908. Otherwise processing ends.

Figure 39:
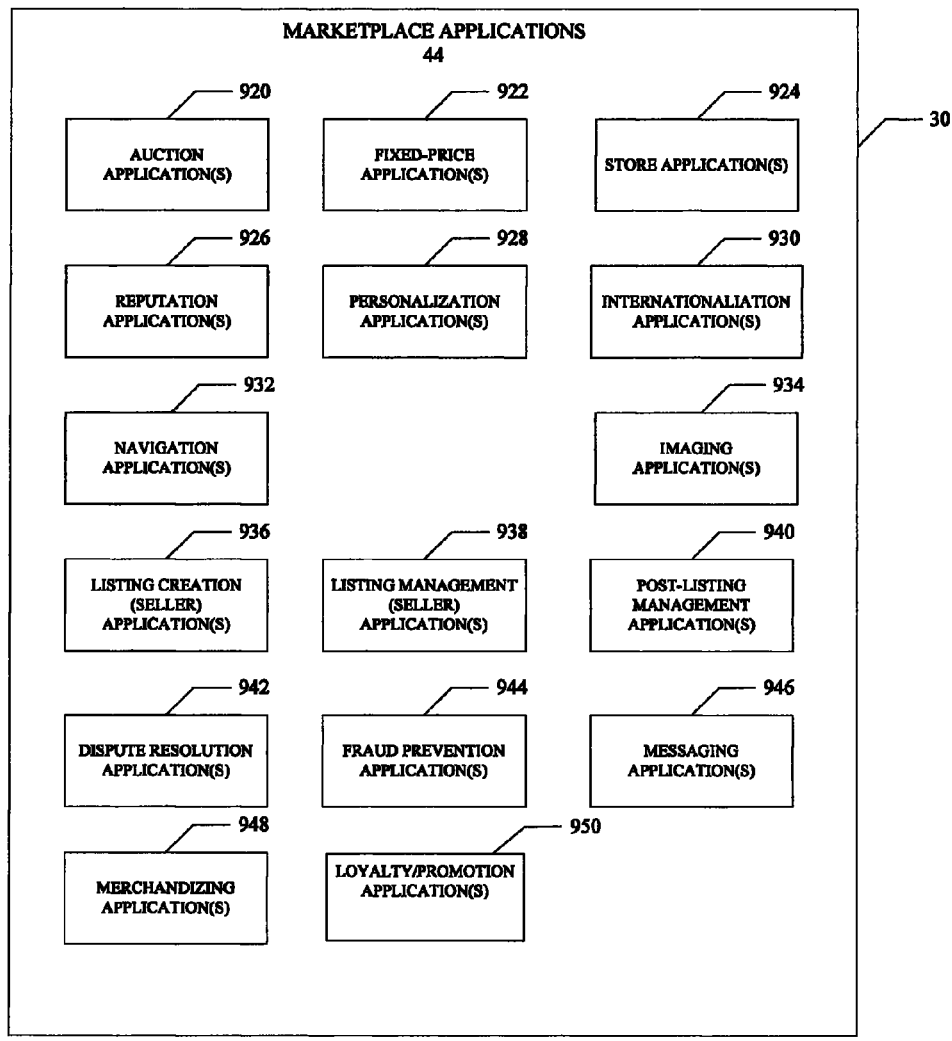
FIG. 39 is a block diagram illustrating marketplace applications, according to an embodiment.

FIG. 39 is a block diagram illustrating multiple marketplace applications 44 that, in one example embodiment of a network-based marketplace, are provided as part of the information storage and retrieval platform 12. The information storage and retrieval platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 44*re* shown to include one or more auction applications 920 which support auction-format listing and price setting mechanisms (e.g., English, Dutch, Vickrey, Chinese, Double, Reverse auctions etc.). The various auction applications 920 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 922 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 924 allow sellers to group their listings within a "virtual" store, which may be branded and otherwise personalized by and for the sellers. Such a virtual store may also offer promotions, incentives and features that are specific and personalized to a relevant seller.

Reputation applications 926 allow parties that transact utilizing the information storage and retrieval platform 12 to establish, build and maintain reputations, which may be made available and published to potential trading partners. Consider that where, for example, the information storage and retrieval platform 12 supports person-to-person trading, users may have no history or other reference information whereby the trustworthiness and credibility of potential trading partners may be assessed. The reputation applications 926 allow a user, for example through feedback provided by other transaction partners, to establish a reputation within the information storage and retrieval platform 12 over time. Other potential trading partners may then reference such a reputation for the purposes of assessing credibility and trustworthiness.

Personalization applications 928 allow users of the information storage and retrieval platform 12 to personalize various aspects of their interactions with the information storage and retrieval platform 12. For example a user may, utilizing an appropriate personalization application 52, create a personalized reference page at which information regarding transactions to which the user is (or has been) a party may be viewed. Further, a personalization application 928 may enable a user to personalize listings and other aspects of their interactions with the information storage and retrieval platform 12 and other parties.

In one embodiment, the information storage and retrieval platform 12 may included international applications 930 to support a number of marketplaces that are customized, for example, for specific geographic regions. A version of the information storage and retrieval platform 12 may be customized for the United Kingdom, whereas another version of the information storage and retrieval platform 12 may be customized for the United States. Each of these versions may operate as an independent marketplace, or may be customized (or internationalized) presentations of a common underlying marketplace.

Navigation of the information storage and retrieval platform 12 may be facilitated by one or more navigation applications 932. For example, a search application enables key word searches of listings published via the information storage and retrieval platform 12. A browse application allows users to browse various category, catalogue, or inventory data structures according to which listings may be classified within the marketplace 12. Various other navigation applications 932 may be provided to supplement the search and browsing applications.

In order to make listings, available via the information storage and retrieval platform 12, as visually informing and attractive as possible, the marketplace applications 44 may include one or more imaging applications 934 utilizing which users may upload images for inclusion within listings. An imaging application 934 also operates to incorporate images within viewed listings. The imaging applications 934 may also support one or more promotional features, such as image galleries that are presented to potential buyers. For example, sellers may pay an additional fee to have an image included within a gallery of images for promoted items.

Listing creation applications 936 allow sellers conveniently to author listings pertaining to goods or services that they wish to transact via the information storage and retrieval platform 12, and listing management applications 938 allow sellers to manage such listings. Specifically, where a particular seller has authored and/or published a large number of listings, the management of such listings may present a challenge. The listing management applications 938 provide a number of features (e.g., auto-relisting, inventory level monitors, etc.) to assist the seller in managing such listings. One or more post-listing management applications 940 also assist sellers with a number of activities that typically occur post-listing. For example, upon completion of an auction facilitated by one or more auction applications 920, a seller may wish to leave feedback regarding a particular buyer. To this end, a post-listing management application 940 may provide an interface to one or more reputation applications 926, so as to allow the seller conveniently to provide feedback regarding multiple buyers to the reputation applications 926.

Dispute resolution applications 942 provide mechanisms whereby disputes arising between transacting parties may be resolved. For example, the dispute resolution applications 942 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 944 implement various fraud detection and prevention mechanisms to reduce the occurrence of fraud within the information storage and retrieval platform 12.

Messaging applications 946 are responsible for the generation and delivery of messages to users of the information storage and retrieval platform 12, such messages for example advising users regarding the status of listings at the information storage and retrieval platform 12 (e.g., providing "out-bid" notices to bidders during an auction process or to provide promotional and merchandising information to users).

Merchandising applications 948 support various merchandising functions that are made available to sellers to enable sellers to increase sales via the information storage and retrieval platform 12. The merchandising applications 948 also operate the various merchandising features that may be invoked by sellers, and may monitor and track the success of merchandising strategies employed by sellers.

The information storage and retrieval platform 12 itself or a user of the information storage and retrieval platform 12 may operate loyalty programs that are supported by one or more loyalty/promotions applications 950.

Data Structures

Figure 40:
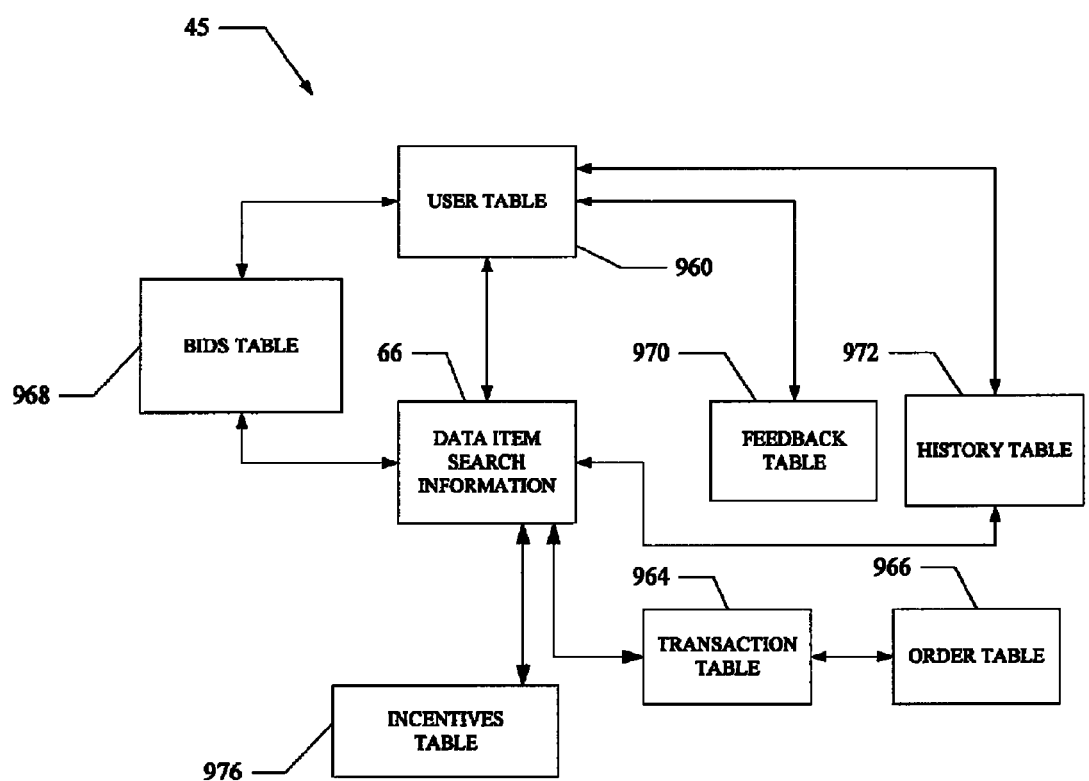
FIG. 40 is a block diagram illustrating marketplace information, according to an embodiment.
Figure 41:
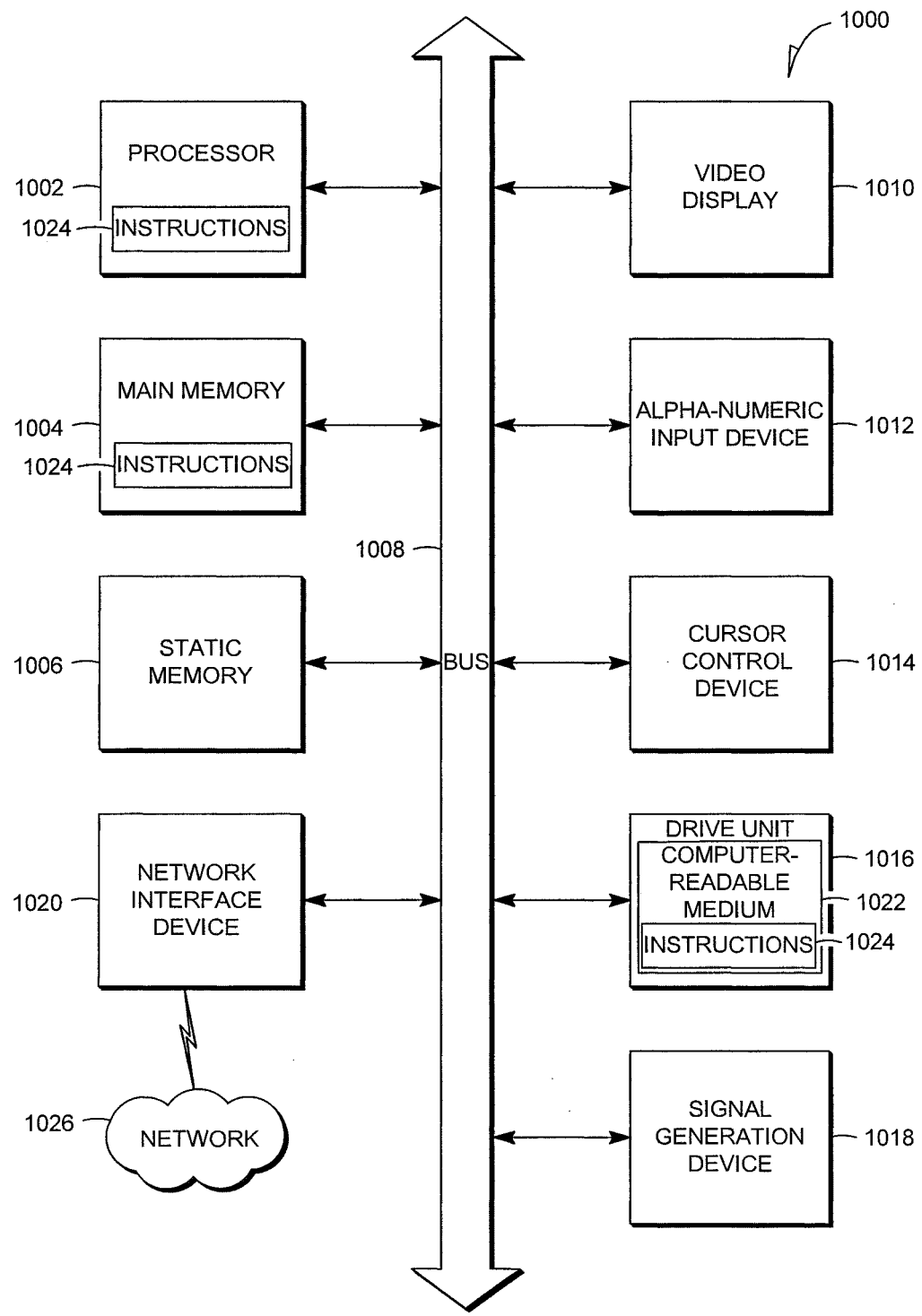
FIG. 41 is a block diagram of a machine, according to an example embodiment, including instructions to perform any one or more of the methodologies described herein.

FIG. 40 is a high-level entity-relationship diagram, illustrating various marketplace information 45 that may be maintained within the databases 36, and that are utilized by and support the marketplace applications 44. A user table 960 contains a record for each registered user of the information storage and retrieval platform 12, and may include identifier, address and financial instrument information pertaining to each such registered user. A user may, it will be appreciated, operate as a seller, a buyer, or both, within the information storage and retrieval platform 12. In one example embodiment, a buyer may be a user that has accumulated value (e.g., national currency or incentives including gift certificates, coupons, points, etc.) and is then able to exchange the accumulated value for items that are offered for sale on the information storage and retrieval platform 12. The user table 960 may further be used to maintain coupon generation information, gift certificate generation information, and points generation information that may be used to maintain incentive campaigns started by the user. Indeed the user, acting as a seller, may issue and redeem incentives via the information storage and retrieval platform 12.

The marketplace information 45 also includes data item search information 962 in which are maintained data item structured information 340, as previously described. In the present embodiment the data item structured information 340 may be for goods and services that are available to be, or have been, transacted via the information storage and retrieval platform 12. Each data item structured information 340 within the data item search information 962 may furthermore be linked to one or more user records within the user table 960, so as to associate a seller and one or more actual or potential buyers with each item record.

A transaction table 964 contains a record for each transaction (e.g., a purchase transaction) pertaining to items for which records exist within the items table 962.

An order table 966 is populated with order records, each order record being associated with an order. Each order, in turn, may be with respect to one or more transactions for which records exist within the transactions table 964.

Bid records within a bids table 968 each relate to a bid received at the information storage and retrieval platform 12 in connection with an auction-format listing supported by an auction application 920. A feedback table 970 is utilized by one or more reputation applications 962, in one example embodiment, to construct and maintain reputation information concerning users. A history table 972 maintains a history of transactions to which a user has been a party. Considering only a single example of such an attribute, the attributes tables 974 may indicate a currency attribute associated with a particular item, the currency attribute identifying the currency of a price for the relevant item as specified in by a seller.

An incentives table 976 maintains system incentive information. For example, system incentive information may include incentive generation information (e.g., coupon generation information, gift certificate generation information, and points generation information) that may be used to generate and maintain incentive campaigns whereby incentives are issued and redeemed by the information storage and retrieval platform 12.

FIG. 40 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

A system may communicate information by generating a user interface based on supply information and demand information. With regard to the supply information, the system may receive a first query that is entered by a user, identify matching data items, and maintain a set of data item counts for each domain. For example, in response to the first query, the system may find matching data items that may be identified or browsed according to product domain(s) (e.g., shoes), aisle domain(s) (e.g., footwear), and department domain(s) (e.g., apparel), where a department domain may include aisle domain(s) and/or product domains, an aisle domain may include product domain(s), and a product domain may include data items. Continuing with the example, if a data item is found in a Product C domain (e.g., shoes) that is organized under a hierarchy of domains (e.g., Department A—apparel, Aisle B—footwear, Product C—shoes), then the data item counts associated with the Department A, Aisle B and Product C domains may be incremented by one. Domains with high data item counts may be determined to be of interest to the user.

With regard to the demand information, the system may read navigation information that is historical for queries that contains constraints that correspond to the first query over a period of time. Specifically, the system maintains navigation information in the form of view data item counts according to domains that may be incremented responsive to a user viewing a data item over a view data item duration. For example, if a user previously entered a second query that contains constraints that correspond to the first query, selected the domain C and viewed a data item, then the view data item count corresponding to the domain C may be incremented by one. Domains with high data item counts may be determined to be of interest to the user.

The system may maintain the supply information in the form of a product histogram (e.g., percent of data items distributed over multiple product domains), an aisle histogram (e.g., percent of data items distributed over multiple aisle domains), and a department histogram (e.g., percent of data items distributed over multiple department domains). The system may maintain the demand information in a similarly structured set of histograms.

The system may generate total coverage histograms including total coverage information based the supply information that is included in the supply histograms and the demand information that is included in the demand histograms. Specifically, the system may generate a total coverage histogram including total coverage information for product domains, total coverage information for aisle domains, and total coverage information for department domains. The system may compare the total coverage histograms to predetermined distributions including a peak distribution 4202, a hills distribution 4304, and a flat distribution 4406 to identify the type of user interface to generate.

Figure 42:
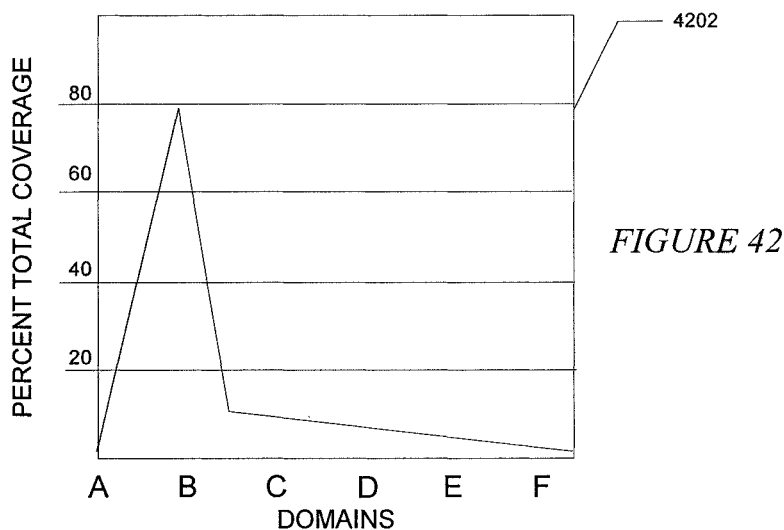
FIG. 42 is a diagram depicting a peak distribution, according to one example embodiment.

FIG. 42 is a diagram depicting the peak distribution 4202, according to one example embodiment. The peak distribution 4202 shows a peak with respect to a single domain B. The peak distribution 4202 may be a predetermined distribution that is compared with the total coverage histograms to determine whether the total coverage histogram includes total coverage information exhibiting the peak distribution 4202. For example, if the system detects a peak distribution 4202 in a total coverage histogram including total coverage information for product domains, then the system may generate a product user interface that includes a single product domain based on the position of the peak in the total coverage histogram.

Figure 43:
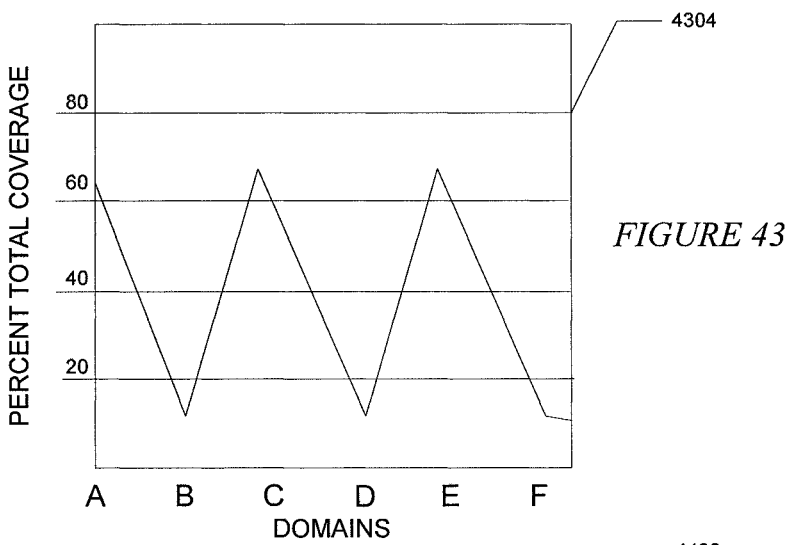
FIG. 43 is a diagram depicting a hills distribution, according to one example embodiment.

FIG. 43 is a diagram depicting the hills distribution 4304, according to one example embodiment. The hills distribution 4304 shows hills with respect to multiple domains. The hills distribution 4304 may be a predetermined distribution that is compared with total coverage histograms to determine whether the total coverage histogram includes total coverage information exhibiting the hills distribution 4304. For example, if the system detects a hills distribution 4304 in a total coverage histogram including total coverage information for product domains, then the system may generate a cross-product user interface that includes multiple product domains based on the respective position of the hills in the total coverage histogram.

Figure 44:
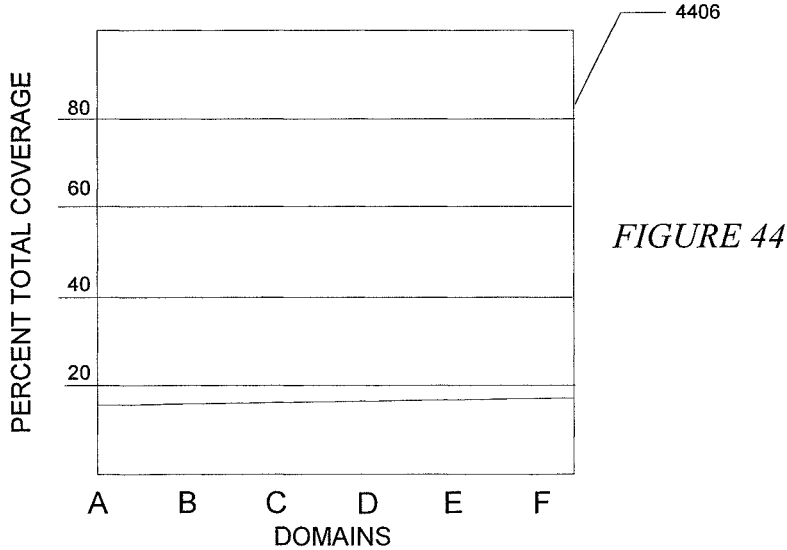
FIG. 44 is a diagram depicting a flat distribution, according to one example embodiment.

FIG. 44 is a diagram depicting the flat distribution 4406, according to one example embodiment. The flat distribution 4406 is flat with respect to multiple domains. The flat distribution 4406 may be a predetermined distribution that is compared with total coverage histograms to determine whether the total coverage histogram includes total coverage information exhibiting the flat distribution 4406. For example, if the system detects a flat distribution 4406 in a total coverage histogram including total coverage information for product domains, then the system may attempt to detect peak, hills, and flat distributions for total coverage histograms associated with aisle domains. If, on the other hand, the system detects the flat distribution 4406 with regard to aisle domains then the system may attempt to detect the peak distribution for total coverage histograms associated with the department domains.

A system may further communicate information by generating a user interface (e.g., cross-product user interface, cross-aisle user interface, cross-department user interface) that includes user interface elements representing domains that may be positioned on the user interface based on the supply and demand information. For example, in one embodiment, the system generates a user interface that includes user interface elements that may be positioned on the user interface in descending order proceeding from a highest total coverage information, as described above, to the lowest total coverage information. For example, the system may position user interface elements representing departments (e.g., from highest to lowest total coverage) until eighty percent of total coverage is reached or until a ten user interface elements representing departments may have been positioned on the use interface.

Figure 45:
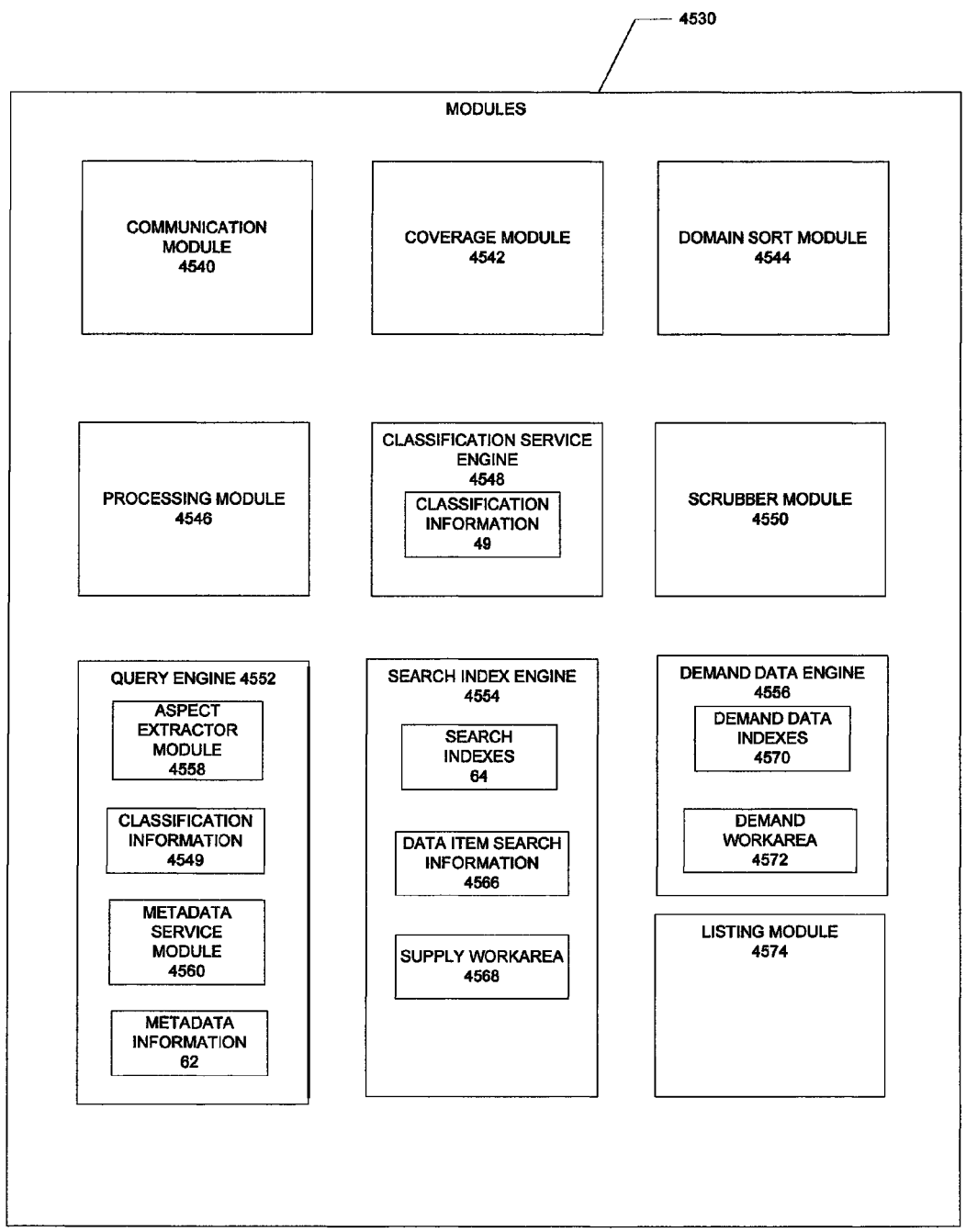
FIG. 45 is a block diagram illustrating modules and engines, according to an embodiment.

FIG. 45 is a block diagram illustrating the modules 4530, according to an embodiment. The modules 4530 include a communication module 4540, a coverage module 4542, a domain sort module 4544, a processing module 4546, a classification service engine 4548, a scrubber module 4550, a query engine 4552, a search index engine 4554, a demand data engine 4556, and a listing module 4574.

The communication module 4540 may receive a query from the client machine 22, 20 which may include one or more constraints (e.g., keywords, categories, information specific to a type of data item, otherwise referred to as an item-specific, etc.). The communication module 4540 may interact with the query engine 4552, the search index engine 4554, the demand data engine 4556, and the coverage module 4542 to process the query. The communication module 4540 may receive aspect-value pairs that may be extracted from the query responsive to processing the query. Further, the communication module 4540 may construct a transformed query based on the query received from the client machine 20, 22 and may communicate the user interface to the user at the client machines 22, 20.

The coverage module 4542 may generate a total coverage histogram based on corresponding supply histograms and demand histograms. For example, the coverage module 4542 may generate a total coverage histogram associated with product type domains based on a supply histogram and demand histogram both associated with product type domains. The coverage module 4542 may generate total coverage histograms for product type domains, aisle type domains and department type domains. In addition, the coverage module 4542 may generate interface information by comparing distributions of the total coverage information with the predetermined peak, hills, and flat distributions 4202, 4304 and 4406.

The domain sort module 4544 may generate distribution data that may determine the position (e.g., order) of user interface elements that represent domains for presentation on a user interface that includes multiple domains (e.g., cross-domain user interface). For example, the domains of greatest interest to the user may be presented at the most prominent positions on the cross-domain user interface.

The processing module 4546 may receive classification information and metadata information that may be authored with a classification and metadata tool. The processing module 4546 may publish the classification information and metadata information to backend servers that may host the query engine 4552, the search index engine 4554, and the classification service engine 4548.

The classification service engine 4548 may apply domain rules and aspect rules to data items. The classification service engine 4548 may apply domain rules to identify one or more domain-value pairs (e.g., Product Type=Women's Shoes) that may be associated with the data item. The classification service engine 48 may further apply the aspect rules to identify aspect-value pairs (Brand=Anne Klein) that may be associated with the data item. The classification service engine 4548 may apply the domain and aspect rules to data items or listings as they are added to the information storage and retrieval platform 12, or responsive to the publication of new rules (e.g., domain rules, aspect rules).

The scrubber module 4550 may process data items responsive to the information storage and retrieval platform 12 receiving the data items from the client machines 20, 22. For example, the scrubber module 4550 may use the services of the classification service engine 4548, as previously described, to apply domain rules and aspect rules to the data item. The scrubber module 4550 may further store the data item, with the associated domain-value pairs and aspect-value pairs in a database 36 as item search information. Further, the scrubber module 4550 pushes or publishes item search information over a bus in real time to the search index engine 4554.

The query engine 4552 includes an aspect extractor module 4558, classification information 49, metadata service module 4560, and metadata information 62. The aspect extractor module 4558 may receive a query from the communication module 4540 and apply aspect rules to extract aspect-value pairs from the query. The aspect extractor module 4558 may further communicate the aspect-value pairs to the communication module 4540.

The metadata service module 4560 may communicate metadata information to the communication module 4540 based on the query that is received from the communication module 4540. The metadata information may include metadata that the communication module 4540 may use to format and generate the user interface.

The search index engine 4554 may include search indexes 64, data item search information 66 (e.g., including data items and associated domain-value pairs and aspect-value pairs), and a supply work area 4568. The search index engine 54 may receive the transformed query from the communication module 4540 and utilize the search indexes 64 to identify data items based on the transformed query. The search index engine 4554 may further communicate the found data items to the communication module 4540. The search index engine 4554 is also shown to include a supply work area 4568 that may be used to generate histograms based on the data item search information 66 associated with the found data items.

The demand data engine 56 includes demand data indexes 4570 and a demand work area 4572. The demand data engine 4556 may receive a pretransformed query from the communication module 4540 and use the pretransformed query to search the demand data indexes 4570 to identify navigation data that may be associated with previously received queries with constraints that correspond to the constraints of the pretransformed query. For example, the navigation data may include a selection of a user interface that may be associated with a domain (e.g., product type=shoes) that preceded a selection of a data item thereby suggesting a preferred domain to view the data item. The demand data engine 4556 may further generate demand histograms based on the navigation data.

The listing module 4574 may receive information from a client machine 20 or 22 and store the information as a data item in the database 36.

Figure 46:
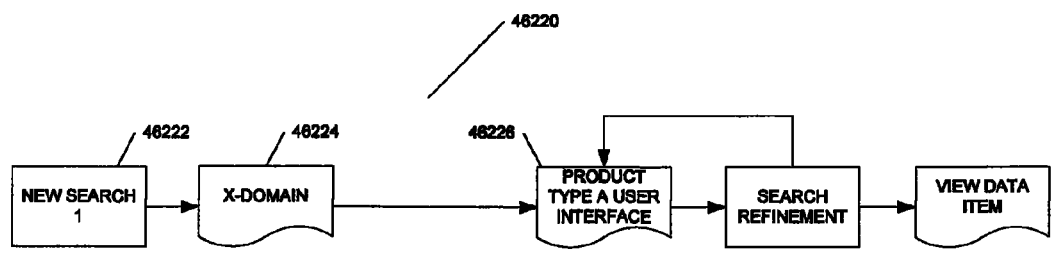
FIG. 46 is a diagram illustrating a set of requests, according to one embodiment, that may cause the storage of navigation information.

FIG. 46 is a diagram illustrating a set of requests 46220, according to one embodiment. The set of requests 46220 may cause the demand data engine 4556 to store navigation information in the demand data indexes 4570. The set of requests 46220 may originate at the client machines 20, 22 and may be received by the demand data engine 4556 at the information storage and retrieval platform 12 that may register the occurrence of the set of requests 46220. The set of requests 46220 may include a query that may include one or more constraints (e.g., keywords, categories, item-specifics, etc.), a request to view a domain (e.g., product domain 132, aisle domain 130 or department domain 128) that may be received by the demand data engine 4556 prior to receiving a request to view a data item, and the request to view the data item 65. For example, at operation 46222, the demand data engine 4556 may receive navigation information in the form of a query (e.g., "iPod"). At operation 46224, the demand data engine 4556 may receive a request to view a cross domain page (e.g., including multiple product types). At operation 46226, the demand data engine 4556 may receive a request to view the product domain 132 "Portable Audio." At operation 46228, the demand data engine 4556 may receive a request to view a data item 65. Responsive to receiving the request to view the data item 65, the demand data engine 4556 may register the request to view the data item 65 in the demand data indexes 4570 (e.g., increment a view data item count) according to the query "iPod" and the product domain 132 "Portable Audio".

Figure 47:
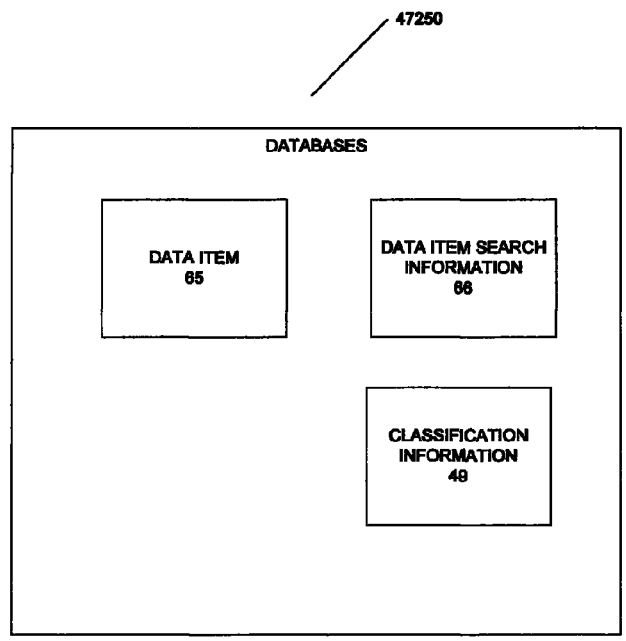
FIG. 47 is a block diagram illustrating databases, according to an embodiment.

FIG. 47 is a block diagram illustrating databases 47250, according to an embodiment. The databases 47250 may include the data item 65, the classification information 49 and the data item search information 66. The data item 65 may include information from the author of a listing or data item 65 as entered from the client machine 22, 20. The data item search information 66 includes the data item 65, and domain-value pairs 301 and aspect-value pairs 304 that have been associated with the data item 65. The classification information 49 includes rules that may be applied to queries and data items 65.

Figure 48:
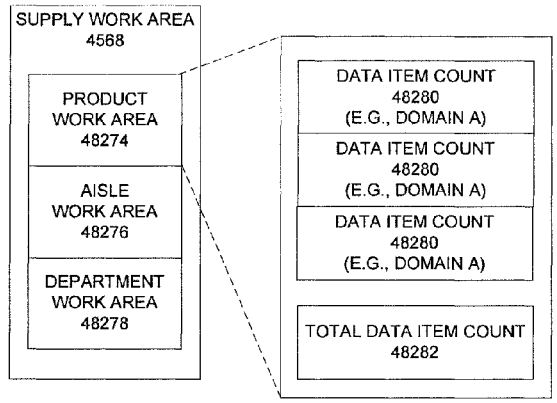
FIG. 48 is a block diagram illustrating a supply work area, according to an embodiment.

FIG. 48 is a block diagram illustrating the supply work area 4568, according to an embodiment. The search index engine 4554 may utilize the supply work area 4568 to build supply histograms. The supply work area 4568 is shown to include a product work area 48274 that may be used to build the supply histograms for all product domains 132 in the information storage and retrieval platform 12, an aisle work area 48276 that may be used to build aisle supply histograms for all aisle domains 130 in the information storage and retrieval platform 12, and a department work area 48278 that may be used to build department supply histograms for all department domains 128 in the information storage and retrieval platform 12. Each of the work areas 48274, 48276, 48278 may include data item counts 48280 and a total data item count 48282, as illustrated with respect to the product work area 48274. The data item count 48280 may represent the number of data items 65 found that may be associated with the corresponding domain 305. The data item count 48280 may be used by the search index engine 4554 to count the number of found data items 65 that may be associated with the respective product type, aisle type or department type domains 305. The search index engine 4554 may sum or accumulate data item counts 48280 in the supply work area 4568 (e.g., product work area 48274, aisle work area 48276, department work area 48278) to generate the total data item counts 48282 for the respective work areas 48274, 48276, 48278.

Figure 49:
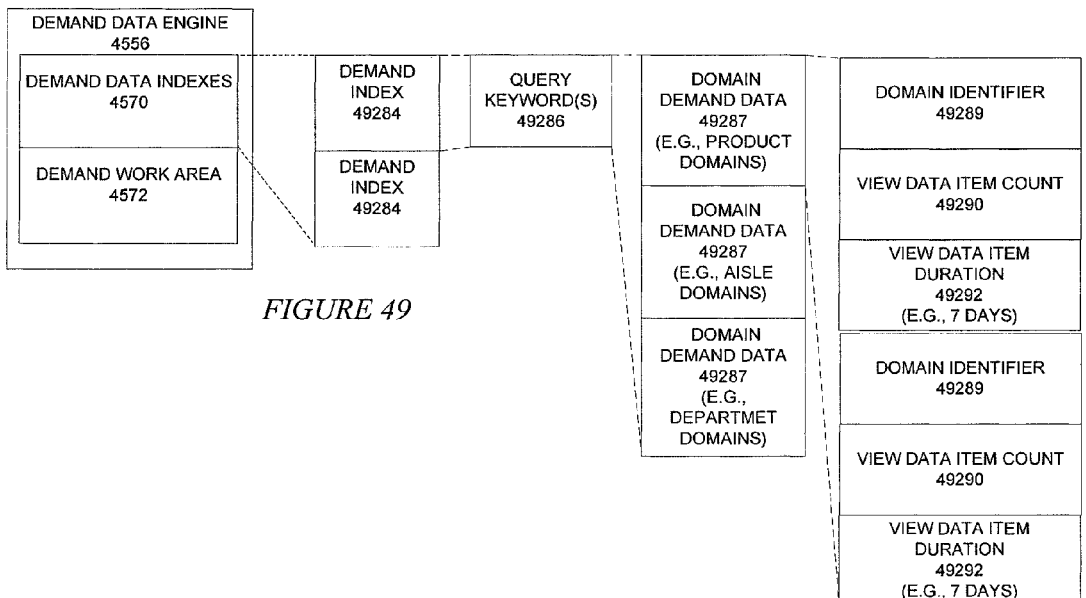
FIG. 49 is a block diagram illustrating demand data indexes, according to an embodiment.

FIG. 49 is a block diagram illustrating the demand data indexes 4570, according to an embodiment. The demand data indexes 4570 may be used to store navigation information and may include multiple demand indexes 49284. Each demand index 49284 is shown to include a second query in the form of query keyword(s) 49286. The query keywords 49286 may be matched against the keywords contained in a query as received from the client machine 20, 22. Each query keyword(s) 49286 entry may be associated with multiple domain demand data 49287 entries. Each domain demand data 49287 entry may be associated with a domain type (e.g., product domain 132, aisle domain 130, and department domain 128) that supports entries for all domains 305 associated with the domain type. Each entry within the domain demand data 49287 includes a domain identifier 49289, a view data item count 49290, a view data item duration 49292. The appropriate view data item count 49290 may be incremented by the demand data engine 4556 responsive to the detection of a set of requests 46220 that may include a query that matches the query keywords 49286, a request to view the domain 305 (e.g., product domain 132, aisle domain 130 or department domain 128), and a request to view a data item 65. The specific view data item count 49290 that may be incremented corresponds to the domain 305 associated with the request to view the domain that preceded the request to view the data item 65. Further, the view data item duration 49292 may be a period of time over which the view data item counts 49290 are recorded. Accordingly, clearing the view data item counts 49290 may also result in clearing the corresponding view data item counts 49290.

Figure 50:
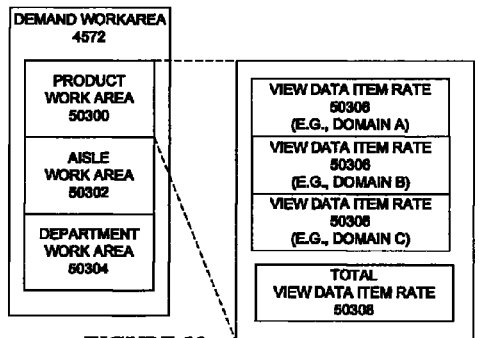
FIG. 50 is a block diagram illustrating the demand work area, according to an embodiment.

FIG. 50 is a block diagram illustrating the demand work area 4572, according to an embodiment. The demand data engine 4556 may utilize the demand work area 4572 to build demand histograms. The demand work area 4572 is shown to include a product work area 50300 that may be used to build demand histograms for all product domains 132 in the information storage and retrieval platform 12, an aisle work area 50302 that may be used to build aisle demand histograms for all aisle domains 130 in the information storage and retrieval platform 12, and a department work area 50304 that may be used to build department demand histograms for all department domains 128 in the information storage and retrieval platform 12. Each of the work areas 50300, 50302, 50304 may include view data item rates 50306 and a total view data item rate 50308, as illustrated with respect to the product work area 50300. The view data item rate 50306 may represent the view data item count 49290 divided by the view data item duration 49292 for the corresponding entry in the demand data indexes 4570, as previously described. The view data item rate 50306 may be used by the demand data engine 4556 to generate the total view data item rates 50308 that may be associated with the respective product type, aisle type or department type domains 305. For example, the demand data engine 4556 may sum or accumulate all of the view data item rates 50306 within a work area 50300, 50302, 50304 to generate the total view data item rate 50308 for the respective work areas 50300, 50302, 50304. Further, the total view data item rate 50308 may be used to generate demand information in the form of a percent demand coverage that may be stored in a demand histogram according to domain 305 (e.g., view data item rate 50306/total view data item rate 50308).

Histograms

Figure 51:
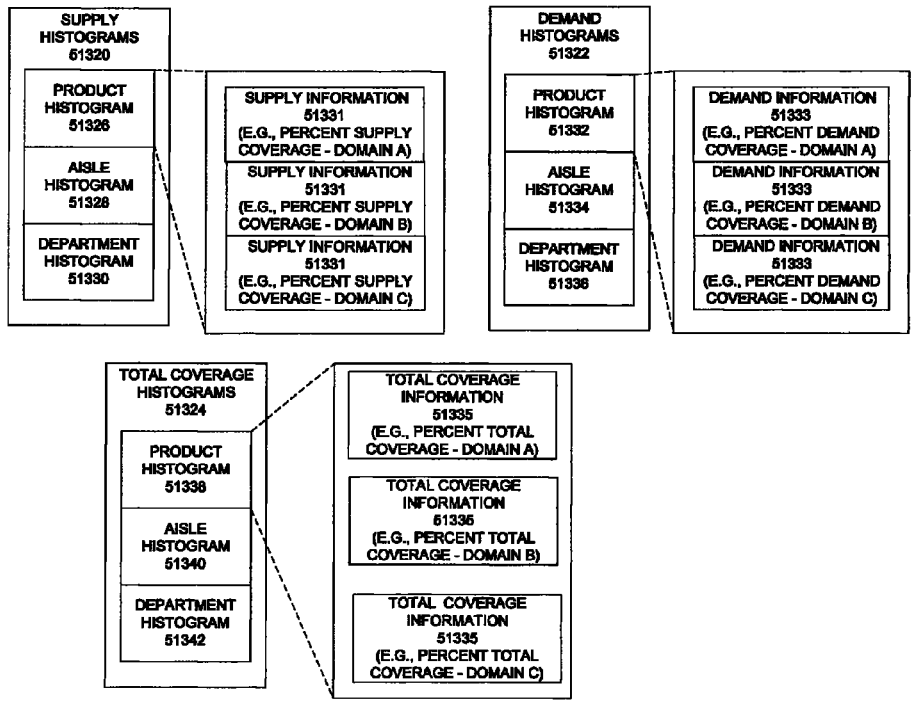
FIG. 51 is a block diagram illustrating supply histograms, demand histograms and total coverage histograms.

FIG. 51 is a block diagram illustrating supply histograms 51320, demand histograms 51322 and total coverage histograms 51324.

Supply Histograms

The supply histograms 51320 may include a first distribution in the form of a product histogram 51326, an aisle histogram 51328 or a department histogram 51330. For example, the product histogram 51326 may include the supply information 51331 (e.g., percent supply coverage) distributed across the product domains 132 in the information storage and retrieval platform 12. The aisle histogram 51328 may include supply information 51331 (e.g., percent supply coverage) distributed across the aisle domains 130 in the information storage and retrieval platform 12. The department histogram 51330 may include the supply information 51331 (e.g., percent supply coverage) distributed across the department domains 128 in the information storage and retrieval platform 12.

Demand Histograms

The demand histograms 51322 may include a second distribution in the form of a product histogram 51332, an aisle histogram 51334, or a department histogram 51336. The product histogram 51332 may include demand information 51333 (e.g., percent demand coverage) distributed across the product domains 132 in the information storage and retrieval platform 12. The aisle histogram 51334 may include the demand information 51333 (e.g., percent demand coverage) distributed across the aisle domains 130 in the information storage and retrieval platform 12. The department histogram 51336 may include the demand information 51333 (e.g., percent demand coverage) distributed across the domains 128 in the information storage and retrieval platform 12.

Total Coverage Histograms

The total coverage histograms 51324 may include a third distribution in the form of a product histogram 51338, an aisle histogram 51340 or a department histogram 51342. The product histogram 51338 includes may include total coverage information 51335 (e.g., percent total coverage) distributed across the product domains 132 in the information storage and retrieval platform 12. The aisle histogram 51340 may include the total coverage information 51335 (e.g., percent total coverage) distributed across the aisle domains 130 in the information storage and retrieval platform 12. The department histogram 51336 may include the total coverage information 51335 (e.g., percent total coverage) distributed across the department domains 128 in the information storage and retrieval platform 12.

Figure 52:
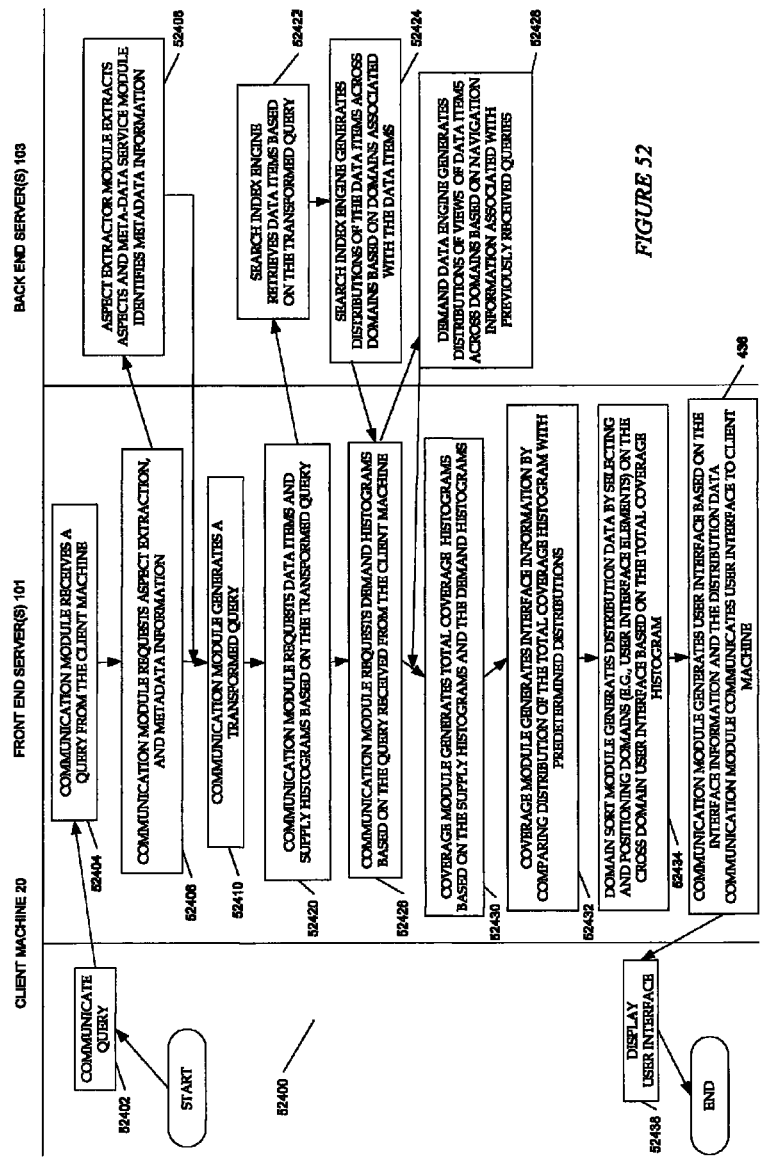
FIG. 52 is a flow chart illustrating a method to communicate information, according to an embodiment.

FIG. 52 is a flow chart illustrating a method 52400 to communicate information, according to an embodiment. Illustrated on the left is the client machine 20; illustrated in the middle are operations performed by the front-end servers 101; and illustrated on the right are operations performed by the backend servers 103. The method 52400 commences at operation 52402 with the web client 16 at the client machine 20 communicating a query that may be entered by a user. The query may contain one or more constraints that may include keyword constraints, category constraints, and item-specific constraints. For example, the user may enter the query with the following keywords 302, "AK shoes ruby."

At operation 52404, at the front-end servers 101, the communication module 4540 may receive the query from the client machine 20 and at operation 52406 the communication module 4540 may request aspect extraction and metadata information 62 based on the query.

At operation 52408, the aspect extractor module 4558 receives the query and extracts aspect-value pairs from the query based on aspect rules 296. For example, the aspect extractor module 4558 may extract the aspect-value pairs 304 "Brand=Anne Klein" and "Color=ruby." Note that aspect extractor module 4558 has generated canonical aspect-value pairs 304 based on the query "AK shoes ruby." In addition, the metadata service module 4560 may identify metadata information 62 based on the query "AK shoes ruby." Finally, the aspect extractor module 4558 may communicate the aspect-value pairs 304 "Brand=Anne Klein" and "Color=ruby" to the communication module 4540 on the front-end server 101 and the metadata service module 4560 may communicate the appropriate metadata information 62 to the communication module 4540 on the front-end server 101.

At operation 52410, at the front-end server 101, the communication module 4540 may generate a transformed query based on the query and extract aspect-value pairs 304. For example, the communication module 40 may generate the transformed query ["AK" AND "shoes" AND "ruby"] OR ["Brand=Anne Klein" AND "Color=ruby"].

At operation 52420, the communication module 4540 may request data items 65 and supply histograms 51320 based on the transformed query by communicating the transformed query to the search index engine 4554.

At operation 52422, the search index engine 4554 may retrieve the data items 65 based on the transformed query. Specifically, the search index engine 4554 may search the search indexes 64 based on the aspect-value pairs 304 (e.g., "Brand=Anne Klein" AND "Color=ruby") to identify matching data items 65 (e.g., found data items). Note that a matching data item 65 may include both aspect-value pairs 304 to be considered a match. Further, the search index engine may identify a matching data item based on the keywords in the transformed query (e.g., "AK" AND "shoes" AND "ruby"). Note that a matching data item 65 may be required to include all three keywords 302 to be considered a match.

At operation 52424, the search index engine 54 may generate supply histograms 51320 (e.g., distributions) based on the found data items 65 using the domains 305 that may be used to identify the data items 65, as described further below. For example, the domains 305 may include the product, aisle and department domains 132, 130, 128 that may be navigated by buyers to find the data items 65. In addition, the search index engine 4554 may communicate the distributions and the found data items 65 to the communication module 4540 at the front-end server 101.

At operation 52426, the communication module 4540 may request demand histograms 51322 based on the query received from the client machine. For example, the communication module 40 may communicate the query "AK shoes ruby."

At operation 52428, the demand data engine 4556 may generate demand histograms 51322 (e.g., distributions) of requests to view data items 65 across domains based on navigation information associated with the query. For example, the demand data engine 4556 may identify a demand index 49284 that may include an query keyword 49286 entry with constraints (e.g., query keywords 49286) that correspond to the constraints (e.g., keywords) in the query "AK shoes ruby", as described further below. Responsive to identifying the demand index 49284, the demand data engine 4556 may generate view data item rates 50306 for all domains in the information storage and retrieval platform 12 that may be stored in the demand work area 4572. Further the demand data engine may generate total view data item rates 50308 that may be stored in the appropriate demand work area 4572 (e.g., product work area 50300, aisle work area 50302, department work area 50304). Finally, the demand data engine 4556 may communicate the demand histograms 51322 to the coverage module 4542 on the front-end servers 101.

At operation 430, the coverage module 4542 may generate total coverage histograms 51324 based on the corresponding supply histograms 51320 and the corresponding demand histograms 51322. In one embodiment, the coverage module 4542 may generate an average for each domain 305 in the total coverage histogram 51324, as previously described. Other embodiments may generate the total coverage histogram 51324 in a different manner. In another embodiment, the coverage module 4542 may scale each of the demand information 51333 entries (e.g., percent demand coverage) in the demand histograms 51322 before generating averages for each domain 305. For example, the percent demand coverage entries in the demand histogram 51322 may be scaled by a factor of 1.2 before combining (e.g., averaging) the entries of the supply histogram 51320 with the respective entries of the demand histogram 51322. Likewise the percent demand coverage entries in the supply histogram 51320 may also be scaled. In another embodiment the following equation may be used to generate the total coverage histogram:

Total Coverage Information(X)=Demand Information (X)*[DEMAND WEIGHT]+Supply Information (X)*(1−DEMAND WEIGHT))

For example, the "Total Coverage Information" may include the total coverage information 51335 for the domain 305 "X"; the "X" may include a specific domain that may be a product domain 132, an aisle domain 130, or a department domain 128; the "Demand Information" may include the demand information 51333 for the domain "X"; the "DEMAND WEIGHT" may include a weight between 0 and 1; and the "Supply Information" may include the supply information 51331 for the domain "X".

At operation 52432, the coverage module 4542 generates interface information. The coverage module may generate interface information by comparing the total coverage histograms 51324 (e.g., product histogram 51338, aisle histogram 51340, department histogram 51342) with predetermined distributions 4202, 4304, 4306 to determine the type of interface information to generate, as described further below.

At operation 52434, the domain sort module 4544 may generate distribution data if the coverage module 4542 generated (e.g., operations 52432, 55498) cross-domain user information (e.g., multiple product domains or multiple aisle domains or multiple department domains). The domain sort module 4544 may generate the distribution data by selecting and positioning user interface elements that may represent domains 305 (e.g., product domains) on the user interface based on the total coverage histograms 51324 that may be associated with a cross-domain user interface (e.g., displaying multiple domains based on a hills distribution), as described further below.

At operation 52436, the communication module 4540 may use the interface information and may use the distribution data to generate the user interface. For example, the communication module 4540 may use product user interface information to generate a product user interface or cross product user interface information to generate a cross product user interface or aisle user interface information to generate an aisle user interface or cross aisle user interface information to generate a cross aisle user interface or department user interface information to generate a department user interface or cross-department user interface information to generate a cross-department user interface. In addition, the communication module 4540 may use the distribution data to generate a cross-product or cross-aisle or cross-department user interface. Finally, the communication module 4540 may communicate the generated user interface to the client machine 20.

At operation 52438, at the client machine 20, the web client 16 receives and displays the user interface.

While the above described example embodiment includes the generation and communication of a user interface, it will readily be appreciated that other embodiments may merely generate and communicate information to be presented to a user, for example via a graphical user interface generated at the client side, or in some other manner (e.g., an audio interface or any other media interface). As such, the communicated information may comprise, for example, eXtensible Markup Language (XML) data that is processed and communicated to a user via an interface.

Further, while the presentation of information has been described in the context of a client-server network environment, embodiments may be deployed in a standalone computer system environment, or in a peer-to-peer network environment.

Figure 53:
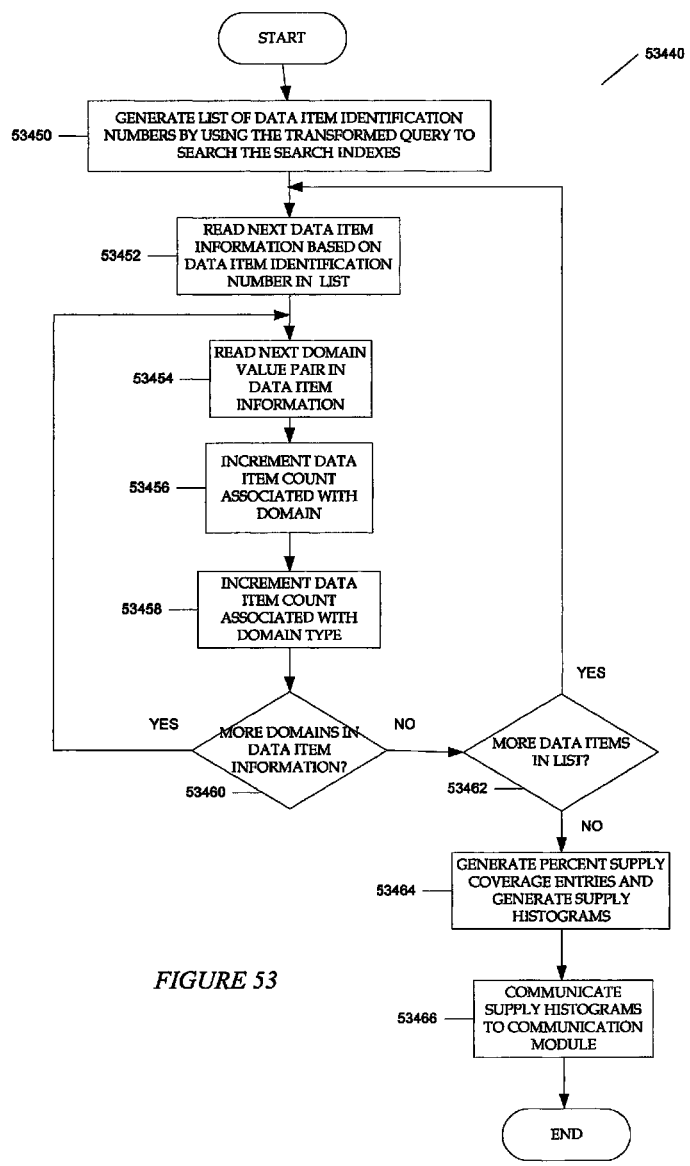
FIG. 53 is a flowchart illustrating a method, according to an embodiment to generate supply histograms.

FIG. 53 is a flowchart illustrating a method 53440, according to an embodiment, to generate supply histograms 51320. The method 53440 commences at operation 53450 with the search index engine 4554 generating a list of data item identification numbers 328 based on the transformed query. For example, all data items identification numbers 328 associated with the aspect-value pairs 304 "Brand=Anne Klein" or "Color=ruby" in the search index 64 may be included on the list.

In addition, all data item identification numbers 328 associated with the keywords "AK AND "shoes" AND "ruby" in the search index 64 may be also be included on the list.

At operation 53452, the search index engine 4554 may read the next data item information 340 from the data item search information 66 based on the data item identification number 328 in the list.

At operation 53454 the search index engine 4554 reads the next domain-value pair 301 in the data item information 340.

At operation 53456, the search index engine 4554 increments the data item count 48280 that may be associated with the current domain 305 and at operation 53458 the search index engine 4554 may increment a total data item count 48282 associated with the domain type. For example, the domain type may include a product, aisle, or department.

At decision operation 53460, the search index engine 4554 may determine whether there are more domain-value pairs 301 in the data item information 340. If there are more domain-value pairs 301, a branch is made to operation 53454. Otherwise a branch is made to decision operation 53462.

At decision operation 53462, the search index engine 4554 may determine if there are more data item identification numbers 328 in the list. If there are more data item identification numbers 328, a branch is made to operation 53452. Otherwise a branch is made to operation 53464.

At operation 53464, the search index engine 4554 may generate and store supply information 51331 in the form of percent supply coverage entries in the supply histograms 51320. For example, the search index engine 4554 may divide the data item count 48280 for each of the domains 305 in the respective work areas 48274, 48276, 48278 by the appropriate total data item count 48282 (e.g., product, aisle, department) to generate a percent supply coverage that may be stored according to domain 305 in the supply histograms 51320 (e.g., product histogram 51326, the aisle histogram 51328 and department histogram 51330).

At operation 53466, the demand data engine 4556 communicates the supply histograms 51326, 51328, 51330 to the communication module 4540 and the process ends.

Figure 54:
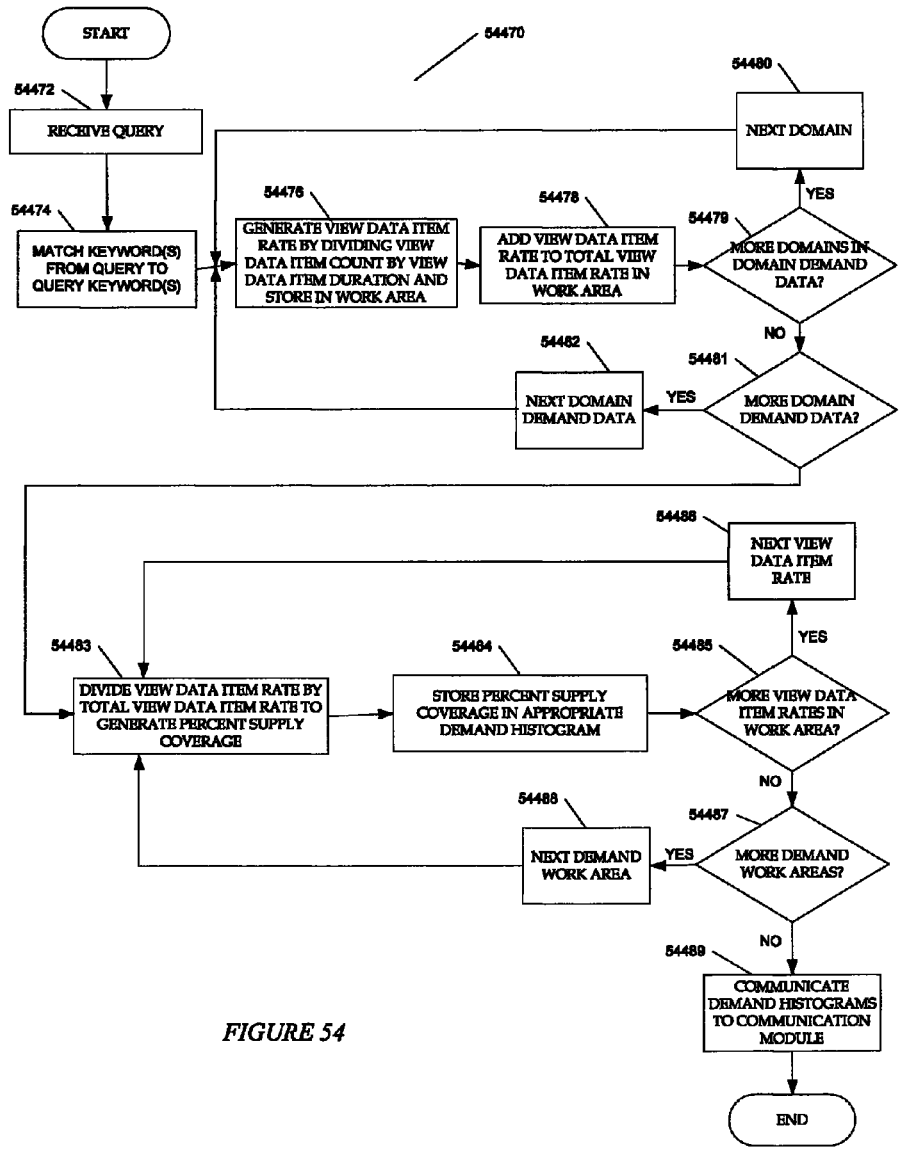
FIG. 54 is a flowchart illustrating a method, according to an embodiment, to generate demand histograms.

FIG. 54 is a flowchart illustrating a method 54470, according to an embodiment, to generate demand histograms 51322. The method 54470 commences at operation 54472 with the demand data engine 4556 receiving the query as entered at the client machine 20. For example, the demand data engine 4556 may receive the query "AK shoes ruby." At operation 54474, the demand data engine 4556 may compare the constraints (e.g., keywords) in the query with the constraints (e.g., query keywords 49286) in the demand indexes 49284 to determine whether there may be corresponding constraints. In one embodiment the demand index 49284 may include query keywords 49286 that match the keywords "AK shoes ruby." In another embodiment, multiple demand indexes 49284 may be used to match each query keyword 49286 in the query (e.g., "AK" and "shoes" and "ruby").

At operation 54476, the demand data engine 4556 reads the view data item count 49290 and the appropriate view data item duration 49292 from the domain demand data 49287 and generates a view data item rate 50306 by the dividing view data item count 49290 with the view data item duration 49292.

At operation 54478, the demand data engine 4556 stores the generated view data item rate 50306 in the appropriate entry in the demand work area 4572. For example, the demand data engine 4556 may store the view data item rate 50306 according to domain 305 in the product work area 50300 when processing a product domain. At decision operation 54479, the demand data engine 4556 determines if there are more domains 305 to process in the domain demand data 49287. If there are more domains 305, a branch is made to 54480. Otherwise a branch is made to decision operation 54481.

At operation 54480, the demand data engine 4556 reads the next entry in the domain demand data 49287 (e.g., next domain). At decision operation 54481, the demand data engine 4556 determines if there is more domain demand data 49287 (e.g., product domains, aisle domain, or department domains.

At operation 54483, the demand data engine 4556 generates demand information 51333 in the form of percent demand coverage by dividing the view data item rate 50306 by the appropriate total view data item rate 50308 (e.g., product work area 50300, aisle work area 50302, department work area 50304). At operation 54484, the demand data engine 4556 may store the demand information 51333 according to the associated domain 305 in the appropriate demand histogram 51322. For example, the demand data engine 4556 may store the demand information 51333 according to the associated domain 305 in the product histogram 51332 aisle histogram 51334 or department histogram 51336.

At decision operation 54485, the demand data engine 4556 determines if there are more view data item rates 50306 in the current work area (e.g., product work area 50300, aisle work area 50302 or department work area 50304). If there are more view data item rates 50306, a branch is made to operation 54486. Otherwise, a branch is made to decision operation 54487. At operation 54486, the demand data engine 4556 reads the next view data item rate 50306 from the demand work area 4572 (e.g., product work area 50300, aisle work area 50302 or department work area 50304).

At decision operation 54487, the demand data engine 4556 determines if there are more demand work areas (e.g., product work area 50300, aisle work area 50302 or department work area 50304) to process. If there are more demand work areas to process a branch is made to operation 54488. Otherwise, a branch is made to operation 54489.

At operation 54489, the demand data engine 4556 communicates the demand histograms 51322 to the communication module 4540 at the front-end servers 101.

Figure 55:
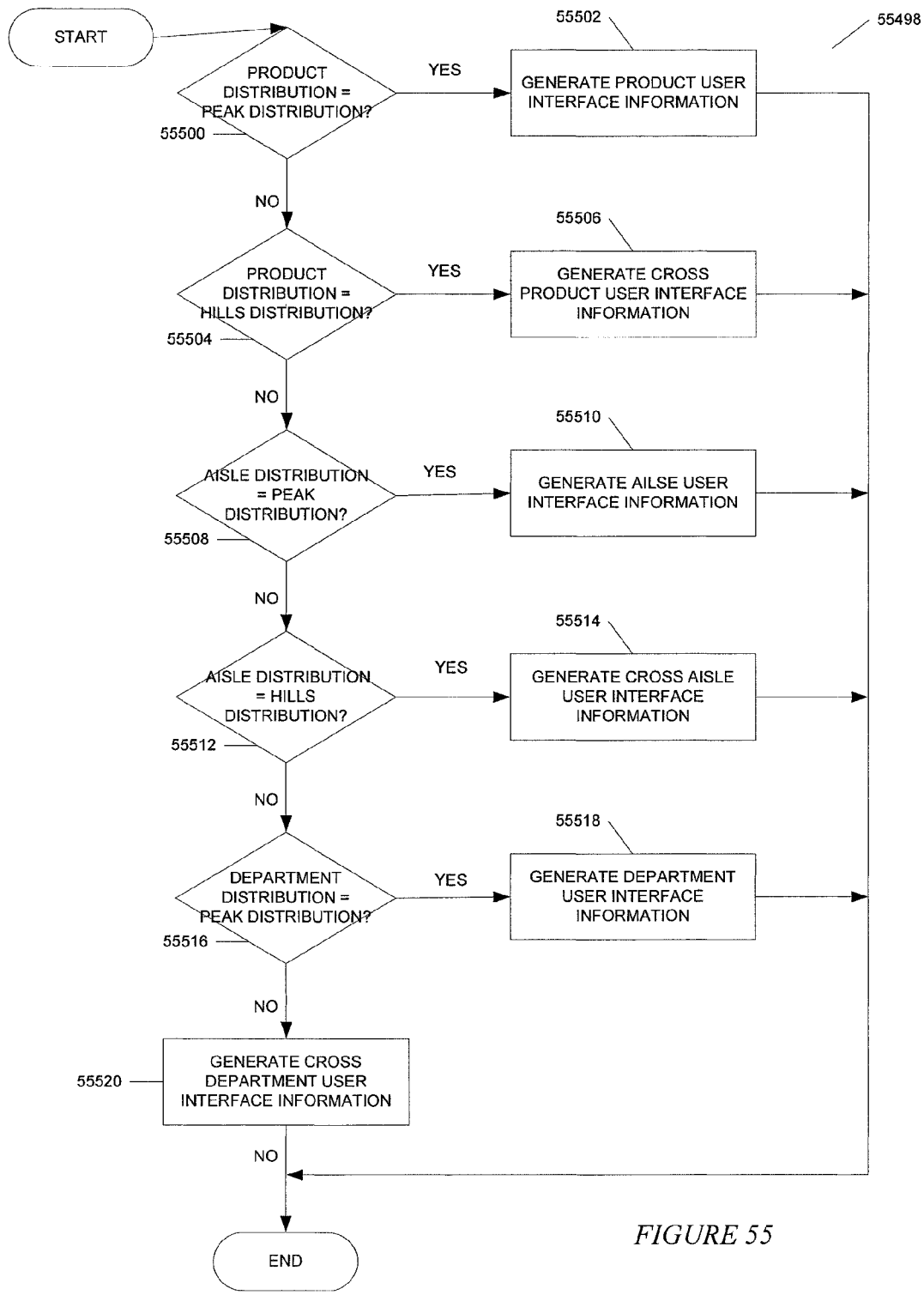
FIG. 55 is a flowchart illustrating a method, according to an embodiment, to generate interface information.

FIG. 55 is a flowchart illustrating a method 55498, according to an embodiment, to generate interface information. In the present example the interface information generated is user interface information; however, it will be appreciated by those skilled in the art that interface information may also include machine interface information (e.g., SGML) to interface with a machine (e.g., client, server, peer to peer), audio interface information to interface to another with sound, or some other type of interface. The method 55498 commences at decision operation 55500 with the communication module 4540 determining if the product histogram 51338 exhibits the peak distribution 4202. For example, the communication module 4540 may compare the product histogram 51338 (e.g., percent total coverage) to a predetermined peak distribution 4202. If the product histogram 51338 matches the peak distribution 4202, then a branch is made to operation 55502. Otherwise, a branch is made to decision operation 55504.

At operation 55502, the communication module 4540 generates product user interface information based on the position of the peak in the product histogram 51338. For example, if product domains 132 A, B, and C were respectively associated with percent total coverage of 10%, 80%, and 10% then product user interface information for product domain B may be generated.

At decision operation 55504, the communication module 4540 determines if the product histogram 51338 exhibits the hills distribution 4304. For example, the communication module 4540 may compare the product histogram 51338 (e.g., percent total coverage) to the hills distribution 4304. If the product histogram 51338 matches the hills distribution 4304 then, a branch is made to operation 55506. Otherwise, a branch is made to decision operation 55508.

At operation 55506, the communication module 4540 generates cross-product user interface information based on the position of the hills in the product histogram 51338. For example, if the product domains 132 A, B, C, D, E, F were respectively associated with percent total coverage of 3%, 30%, 3%, 30%, 4%, 30% then cross-product user interface information for product domains B, D, and F may be generated.

At decision operation 55508, the communication module 4540 may determine if the aisle histogram 51340 exhibits the peak distribution. For example, the communication module 4540 may compare the aisle histogram 51340 (e.g., percent total coverage) to the predetermined peak distribution 4202. If the aisle histogram 51340 matches the peak distribution 4202, then a branch is made to operation 55510. Otherwise, a branch is made to decision operation 55512.

At operation 55510, the communication module 4540 generates aisle user interface information based on the position of the peak in the aisle histogram 51340. For example, if the aisle domains 130 A, B, and C were respectively associated with percent total coverage of 10%, 80%, and 10% then the aisle user interface information for aisle domain B may be generated.

At decision operation 55512, the communication module 4540 determines if the aisle histogram 51340 exhibits the hills aisle distribution 4304. For example, the communication module 4540 may compare the aisle histogram 51340 (e.g., percent total coverage) to the hills distribution 4304. If the aisle histogram 51340 matches the hills distribution 4 then, a branch is made to operation 55514. Otherwise, a branch is made to decision operation 55516.

At operation 55514, the communication module 4540 generates cross-aisle user interface information. For example, if the product domains 132 A, B, C, D, E, F were respectively associated with the percent total coverages of 3%, 30%, 3%, 30%, 4%, 30%, then cross aisle user interface information for aisle domains B, D, and F may be generated.

At decision operation 55516, the communication module 4540 determines if the department histogram 51342 exhibits the peak distribution 4202. For example, the communication module 4540 may compare the department histogram 51342 (e.g., percent total coverage) to the peak distribution 4202. If the department histogram 51342 matches the peak distribution 4202 then a branch is made to operation 55518. Otherwise, a branch is made to operation 55520.

At operation 55518, the communication module 4540 generates department user interface information based on the position of the peak as determined from the department histogram 51342. For example, if the department domains 128 A, B, and C were respectively associated with percent total coverage of 10%, 80%, and 10%, then department user interface information for department domain B may be generated.

At operation 55520, the communication module 4540 generates cross-aisle domain information user interface information and the process ends. For example, if the department domains 128 A, B, C, D, E, F were respectively associated with percent total coverage of 3%, 30%, 3%, 30%, 4%, 30%, then cross department user interface information for department domains B, D, and F may be generated.

Figure 56:
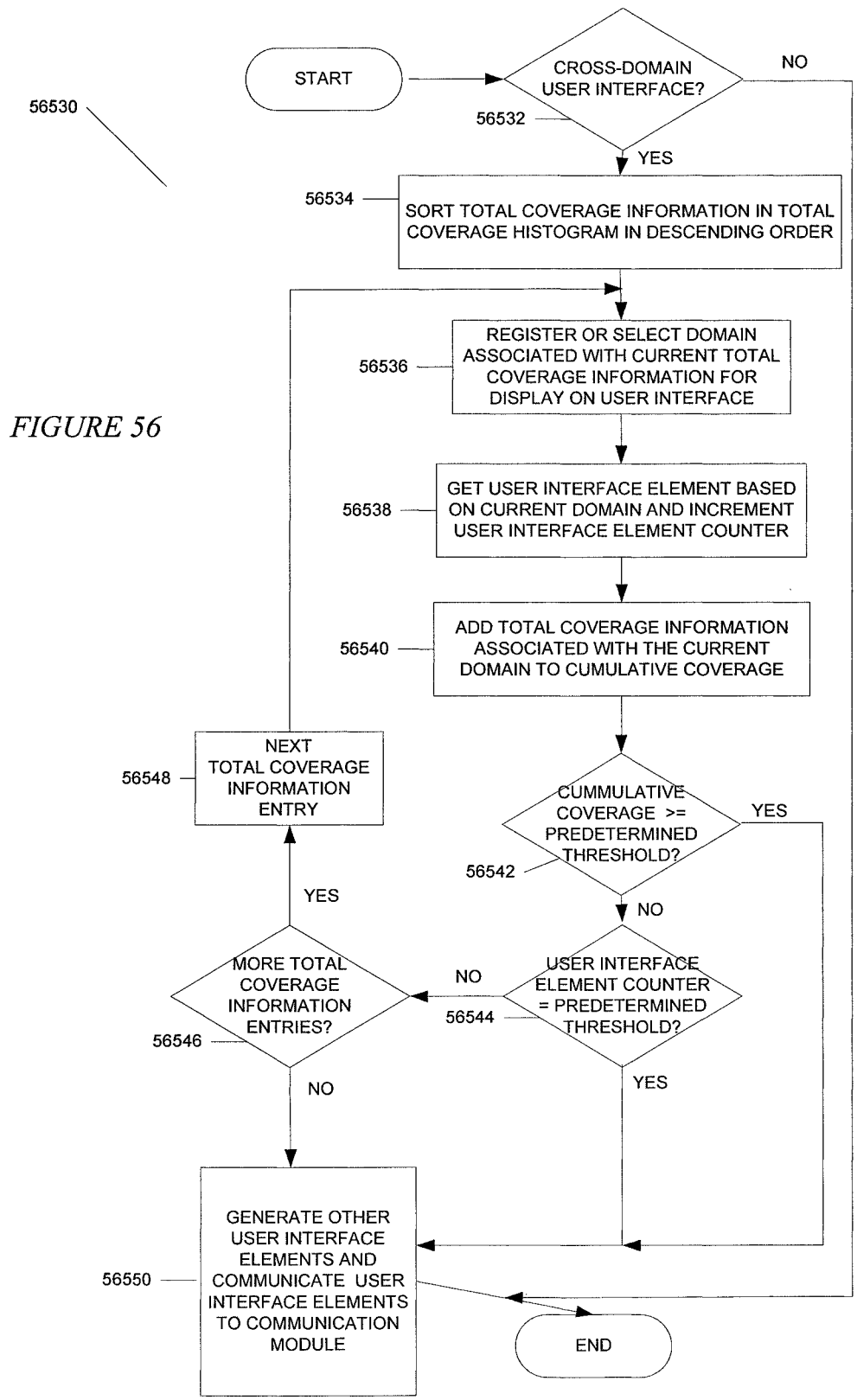
FIG. 56 is a flowchart illustrating a method to generate distribution data.

FIG. 56 is a flowchart illustrating a method 56530 to generate distribution data, according to an embodiment. In the present example the distribution data is used to select and position user interface elements on a user interface; however, it will be appreciated by those skilled in the art that distribution data may be generated to select and position elements for a machine interface (e.g., SGML), an audio interface, or some other type of interface. The method 56530 commences at decision operation 56532 with the domain sort module 4544 determining if a cross-domain user interface (e.g., cross product user interface or cross aisle user interface or cross department user interface) has been identified by the communication module 4540 to be generated. If a cross-domain user interface has been identified, a branch is made to operation 56534. Otherwise, the process ends.

At operation 56534, the domain sort module 4544 sorts the total coverage information 51335 entries in the total coverage histogram 51324 (e.g., product histogram 51338 or aisle histogram 51340, or department histogram 51342) into descending order (e.g., high to low). Each total coverage information 51335 entry is associated with a domain 305. The domain sort module 4544 maintains the association between the total coverage information 51335 entry and the domain 305 while sorting. In one embodiment, the total coverage information 51335 entries may be represented as percent total coverage, as previously described.

At operation 56536, the domain sort module 4544 registers the domain 305 associated with the current total coverage information 51335 for display on the user interface. For example, the product domain 132 "Shoes" may be associated with the current total coverage information 51335.

At operation 56538, the domain sort module 4544 gets a user interface element based on the current domain and increments a user interface element counter. At operation 56540, the domain sort module 4544 adds the total coverage information 51335 associated with the current domain to a register that records cumulative coverage.

At decision operation 56542, the domain sort module 4544 determines if the cumulative coverage is greater than or equal to a predetermined threshold. If the cumulative coverage is greater or equal to the predetermined threshold, then a branch is made to operation 56550. Otherwise, a branch is made to decision operation 56544. For example, the predetermined threshold may be eighty percent.

At decision operation 56544, the domain sort module 4544 determines if the user interface element counter is equal to a predetermined threshold (e.g., maximum user interface elements on a cross-domain user interface). In one embodiment the maximum user interface elements may be ten. If the user interface element counter is equal to the predetermined threshold, then a branch is made to operation 56550. Otherwise, a branch is made to decision operation 56546.

At decision operation 56546, the domain sort module 4544 determines if there is another total coverage information 51335 entry in the total coverage histogram 51324 (e.g., product histogram 51338 or aisle histogram 51340 or department histogram 51342). If there is more total coverage information 51335, then a branch is made to operation 56548. Otherwise, a branch is made to operation 56550. At operation 56548, the domain sort module 4544 reads the next total coverage information 51335 entry from the total coverage histogram 51324 (e.g., product histogram 51338 or aisle histogram 51340 or department histogram 51342).

At operation 56550, the domain sort module generates other user interface elements for the user interface and communicates the user interface elements to the communication module 4540.

Figure 57:
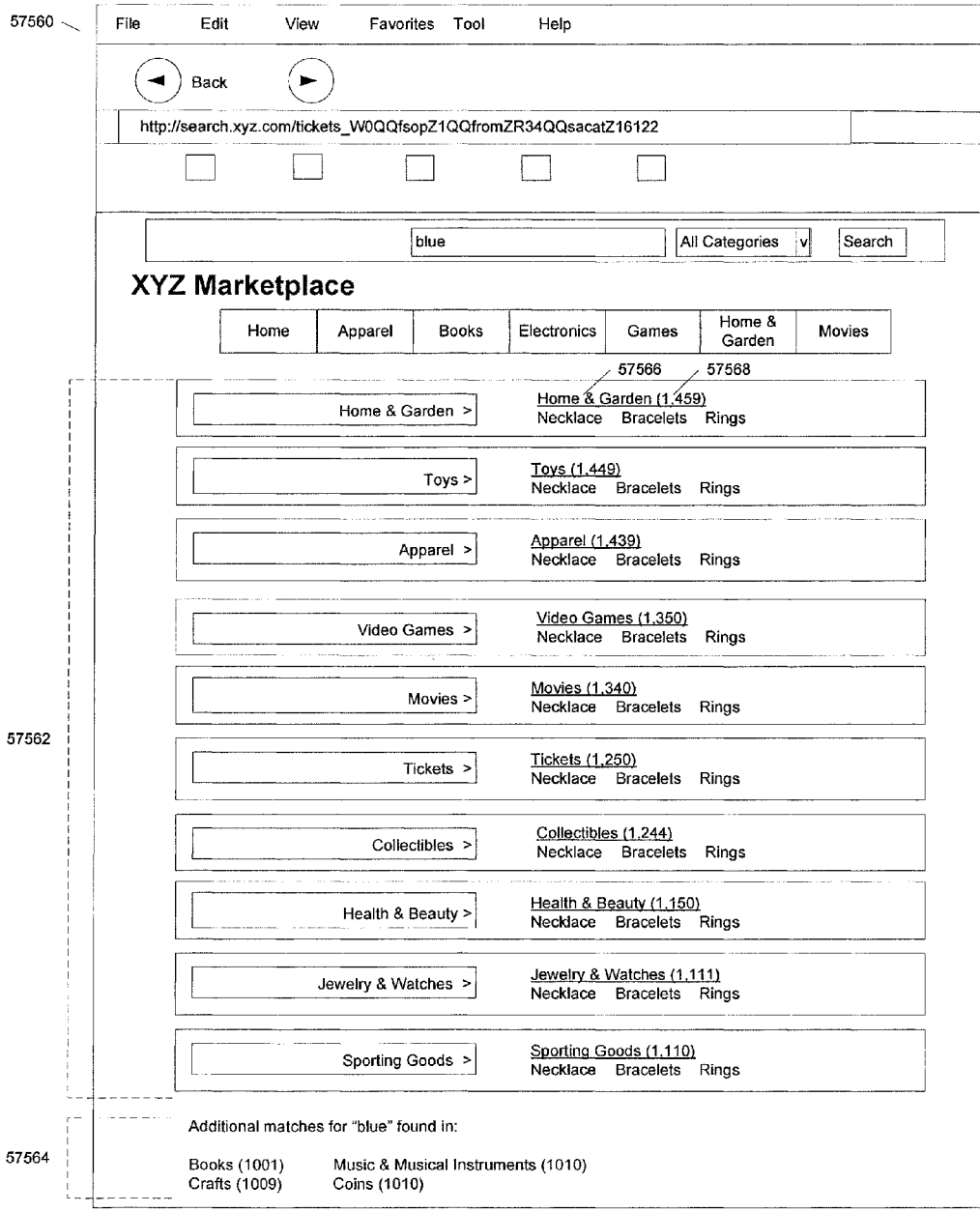
FIGS. 57-60 are diagrams illustrating user interfaces, according to an embodiment.

FIG. 57 is a diagram illustrating a cross department user interface 57560, according to an embodiment. The cross department user interface 57560 may be generated based on a hills distribution 4304 and is shown to include user interface elements 57562, 57564, 57566, and 57568. The ten user interface elements 57562 represent ten department domains 128 (e.g., Home & Garden, Toys, Apparel, etc.) that may appear on the user interface 57560 from top to bottom according to descending and respectively associated total coverage information 51335. The ten department domains 128 equal the predetermined threshold of maximum user interface elements that may be defined for a cross-domain user interface. Other embodiments may include other predetermined thresholds. The user interface 57560 illustrates that the predetermined threshold for maximum user interface elements (e.g., ten) was reached before the predetermined threshold for cumulative coverage information. The user interface elements 57564 represent department domains 128 that were respectively associated with total coverage information 51335 entries that were lower than the total coverage information 51335 entries respectively associated with the user interface elements 57562. The above remarks may also apply to the cross aisle user interface and the cross product user interface. The user interface elements 57562 and 57564 representing the aisle domains 130 on the cross aisle user interface 57560 and the user interface elements 57562 and 57564 representing the product domains 132 on the cross aisle user interface 57560.

Figure 58:
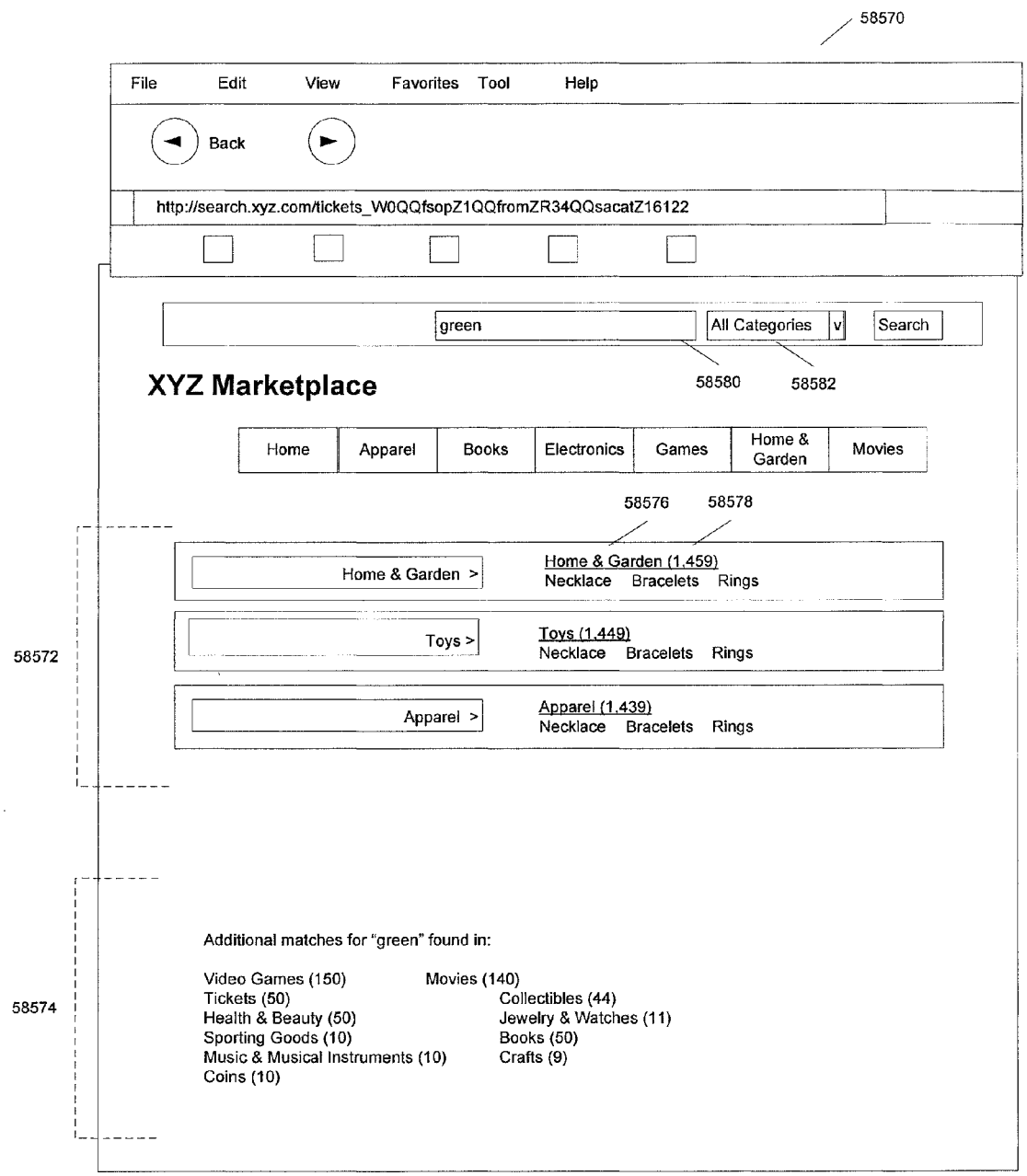

FIG. 58 is a diagram illustrating a cross department user interface 58570, according to an embodiment. The user interface 58570 is shown to include user interface elements 58572, 58574, 58576, 58578, 58580 and 58582. The three user interface elements 58572 respectively representing the Home & Garden, Toys, Apparel department domains 128. The three user interface elements 58572 appear on the user interface 58570 from top to bottom according to a descending sort of respectively associated total coverage information 51335. The cross-department user interface 58570 illustrates that the predetermined threshold for maximum cumulative coverage was reached before the predetermined threshold for maximum user interface elements. For example, the department domains 128 "Home & Garden", "Toys" and "Apparel" may be respectively associated the total coverage information 51335 of 30%, 30%, 28%. The above remarks may also apply to the cross aisle user interface and the cross product user interface. The user interface elements 58572 and 58574 representing the aisle domains 130 on the cross aisle user interface 58570 and the user interface elements 57562 and 57564 representing the product domains 132 on the cross aisle user interface 58570.

The eleven user interface elements 58574 represent the "Video Games", "Tickets", "Health & Beauty", "Sporting Goods", "Music & Musical Instruments", "Coins", "Movies", "Collectibles", "Jewelry & Watches", "Books", and "Crafts" department domains 128. The user interface elements 57564 may be associated to total coverage information 51335 of 3%, 1%, etc. The user interface element 58580 represents a query dialog box that includes a query "green" that may have been entered by a user thereby requesting the information storage and retrieval platform 12 to search for data items 65 that contain the keyword "green." The user interface element 58582 represents a category selector 58582 which is set to search "All Categories" for data items 65. The user interface element 58576 represents a domain name (e.g., "Home & Garden", "Toys", etc.) and the user interface element 58578 represents the number data items 65 found by the information storage and retrieval platform 12 based on the query "green" in "All categories."

The above remarks may also apply to the cross aisle user interface and the cross product user interface. The user interface elements 58572 and 58574 representing the aisle domains 130 on the cross aisle user interface 57560 and the user interface elements 58572 and 58574 representing the product domains 132 on the cross product user interface.

Figure 59:
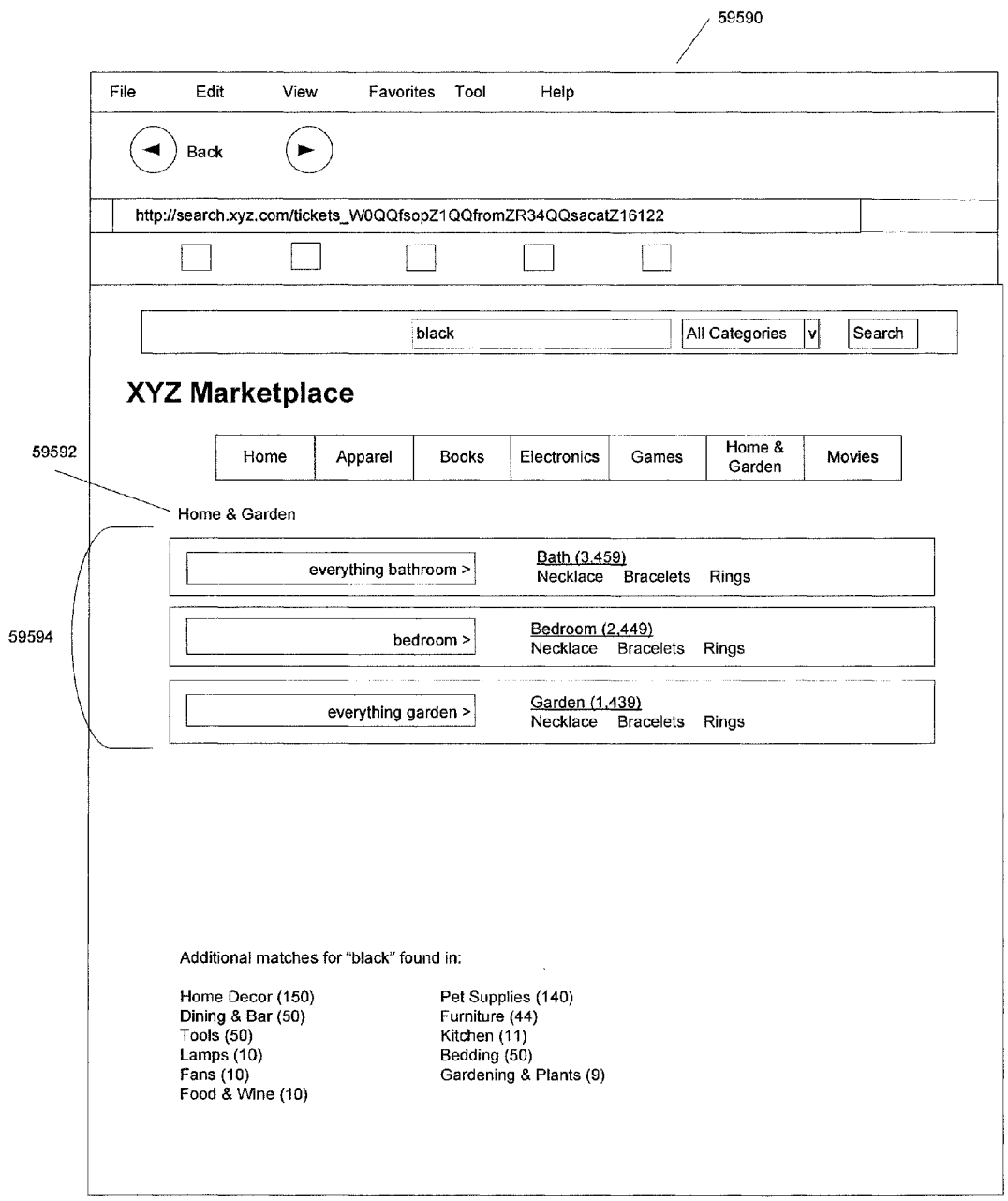

FIG. 59 is a diagram illustrating a department user interface 59590, according to an embodiment. The department user interface 59590 may be generated based on the peak distribution 4202 and includes a user interface element 59592 representing the "Home & Garden" department domain 128. The user interface 59590 further includes user interface elements 59594 representing aisle domains 130 that may be organized under the "Home & Garden" department domain 128. The above remarks may also apply to the aisle user interface, the user interface element 59592 representing the aisle domain 130 and the user interface elements 59594 representing the product domains 132.

Figure 60:
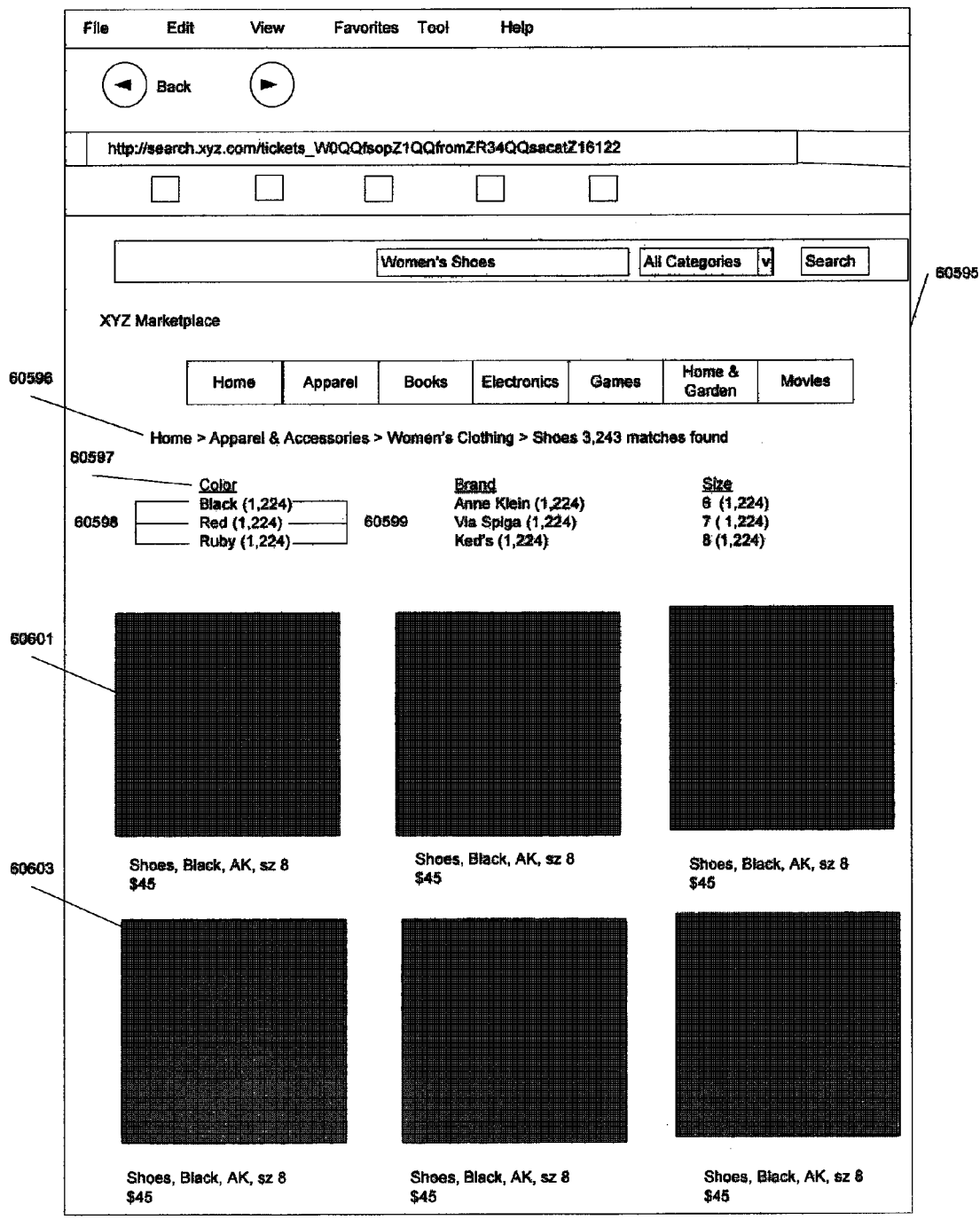

FIG. 60 is a diagram illustrating a product user interface 60595, according to an embodiment. The product user interface 60595 is shown to include user interface elements 60596, 60597, 60598, 60599, 60601, and 60603. The user interface element 60596 represents a domain path that includes the "Apparel & Accessories" department domain 128, the "Women's Clothing" aisle domain 130, the "Shoes" product domain 132 and the number of data items 65 found based on the query "Women's Shoes." The user interface element 60597 represents the aspect 306 "color." The user interface elements 60598 represent the values 308 "Black", "Red", and "Ruby" that may be associated with the aspect 306 "Color." The user interface elements 60599 represent counts of data items 65 that may be associated with the corresponding color. The user interface element 60601 is a picture or graphic for a data item 65 that was found with the query. The user interface element 60603 includes information that may be stored in the data item 65 that was found with the query. The above remarks may also apply to the aisle user interface and the product user interface.

Thus, methods and systems to identify a preferred domain of a plurality of domains corresponding to a query are disclosed. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A method of identifying a preferred domain of a plurality of domains corresponding to a query, the method comprising:
   receiving the query;
   accessing demand information corresponding to the query, the demand information including navigation information associated with the query;
   accessing supply information corresponding to the query, the supply information including a plurality of data item counts corresponding to respective ones of the plurality of domains that match the query; and
   identifying the preferred domain based on the demand information and the supply information, the identifying being performed by a processor of a machine.

2. The method of claim 1, wherein the query includes a constraint, and wherein the method further comprises:
   receiving a request to view a requested domain; and
   incrementing a view data item count corresponding to the constraint and the requested domain.

3. The method of claim 2, wherein the incrementing is based on detecting that a user viewed the requested domain over a view data item duration, the view data item duration being a period of time over which the view data item count corresponding to the requested domain is recorded.

4. The method of claim 3, further comprising, based on a view data item rate, updating a total view data item rate corresponding to one of a product work area, an aisle work area, and a department work area, the view data item rate representing the view data item count divided by the view data item duration.

5. The method of claim 1, wherein:
   the query includes a constraint;
   the preferred domain is one of a plurality of domains;
   the navigation information includes a plurality of view data item counts corresponding to the constraint and the plurality of domains, each of the plurality of view data item counts representing a number of times a plurality of users, subsequent to entering a query having an additional constraint, viewed a data item in one of the plurality of domains over a view data item duration, the additional constraint corresponding to the constraint; and
   the identifying of the preferred domain is based on a view data item count corresponding to the preferred domain being greater than a view data item count corresponding to another one of the plurality of domains.

6. The method of claim 1, further comprising:
   determining that a data item matching the query corresponds to each of a plurality of domains organized into a hierarchy; and
   based on the determining, incrementing a plurality of view data item counts, each of the plurality of view data item counts corresponding to one of the plurality of domains.

7. The method of claim 1, wherein the demand information is weighted relative to the supply information.

8. A system of identifying a preferred domain of a plurality of domains corresponding to a query, the system comprising:
a demand data engine to receive the query;
the demand data engine to access demand information corresponding to the query, the demand information including, navigation information associated with the query;
a search index engine to access supply information corresponding to the query, the supply information including a plurality of data item counts corresponding to respective ones of the plurality of domains that match the query; and
a processor configured by a coverage module to identify the preferred domain based on the demand information and the supply information.

9. The system of claim 8, wherein the query includes a constraint, and wherein the method further comprises:
the demand data engine to receive a request to view a requested domain; and
the demand data engine to increment a view data item count corresponding to the constraint and the requested domain.

10. The system of claim 9, wherein the incrementing is based on the demand data engine detecting that a user viewed the requested domain over a view data item duration, the view data item duration being a period of time over which the view data item count corresponding to the requested domain is recorded.

11. The system of claim 10, wherein the demand data engine updates, based on a view data item rate, a total view data item rate corresponding to one of a product work area, an aisle work area, and a department work area, the view data item rate representing the view data item count divided by the view data item duration.

12. The system of claim 8, wherein:
the query includes a constraint;
the preferred domain is one of a plurality of domains;
the navigation information includes a plurality of view data item counts corresponding to the constraint and the plurality of domains, each of the plurality of view data item counts representing a number of times a plurality of users, subsequent to entering a query having an additional constraint, viewed a data item in one of the plurality of domains over a view data item duration, the additional constraint corresponding to the constraint; and
the coverage module identifies the preferred domain based on a view data item count corresponding to the preferred domain being greater than a view data item count corresponding to another one of the plurality of domains.

13. The system of claim 8, wherein the demand information is weighted relative to the supply information.

14. A non-transitory machine-readable medium embodying a set of instructions that, when executed by one or more processors, cause the one or more processors to perform operations, the operations comprising:
receiving the query;
accessing demand information corresponding to the query, the demand information including navigation information associated with the query;
accessing supply information corresponding to the query, the supply information including a plurality of data item counts corresponding to respective ones of the plurality of domains that match the query; and
identifying the preferred domain based on the demand information and the supply information.

15. The non-transitory machine-readable medium of claim 14, the operations further comprising:
receiving a request to view a requested domain; and
incrementing a view data item count corresponding to the constraint and the requested domain.

16. The non-transitory machine-readable medium of claim 15, wherein the incrementing is based on detecting that a user viewed the requested domain over a view data item duration, the view data item duration being a period of time over which the view data item count corresponding to the requested domain is recorded.

17. The non transitory machine-readable medium of claim 16, the operations further comprising, based on a view data item rate, updating a total view data item rate corresponding to one of a product work area, an aisle work area, and a department work area, the view data item rate representing the view data item count divided by the view data item duration.

18. The non-transitory machine-readable medium of claim 14, wherein:
the query includes a constraint;
the preferred domain is one of a plurality of domains;
the navigation information includes a plurality of view data item counts corresponding to the constraint and the plurality of domains, each of the plurality of view data item counts representing a number of times a plurality of users, subsequent to entering a query having an additional constraint, viewed a data its in one of the plurality of domains over a view data item duration, the additional constraint corresponding to the constraint; and
the identifying of the preferred domain is based on a view data item count corresponding to the preferred domain being greater than a view data item count corresponding to another one of the plurality of domains.

19. The non-transitory machine-readable medium of claim 14, the operations further comprising:
determining that a data item matching the query corresponds to each of a plurality of domains organized into a hierarchy; and
based on the determining, incrementing, a plurality of view data item counts, each of the plurality of view data item counts corresponding to one of the plurality of domains.

20. The non-transitory machine-readable medium of claim 14, wherein the demand information is weighted relative to the supply information.

* * * * *

UNITED STATES PATENT AND TRADEMARK OFFICE
CERTIFICATE OF CORRECTION

PATENT NO. : 8,688,623 B2
APPLICATION NO. : 13/152862
DATED : April 1, 2014
INVENTOR(S) : Shah et al.

It is certified that error appears in the above-identified patent and that said Letters Patent is hereby corrected as shown below:

In the Claims

In column 54, line 39, in Claim 18, delete "its" and insert --item--, therefor

Signed and Sealed this
Second Day of December, 2014

Michelle K. Lee
*Deputy Director of the United States Patent and Trademark Office*